(12) United States Patent
Hayashi et al.

(10) Patent No.: US 11,922,904 B2
(45) Date of Patent: Mar. 5, 2024

(54) INFORMATION PROCESSING APPARATUS AND INFORMATION PROCESSING METHOD TO CONTROL DISPLAY OF A CONTENT IMAGE

(71) Applicant: SONY GROUP CORPORATION, Tokyo (JP)

(72) Inventors: Maho Hayashi, Tokyo (JP); Tetsuo Ikeda, Tokyo (JP); Eisuke Fujinawa, Tokyo (JP); Ryusei Koike, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 17/634,312

(22) PCT Filed: Aug. 7, 2020

(86) PCT No.: PCT/JP2020/030310
§ 371 (c)(1),
(2) Date: Feb. 10, 2022

(87) PCT Pub. No.: WO2021/033575
PCT Pub. Date: Feb. 25, 2021

(65) Prior Publication Data
US 2022/0293067 A1    Sep. 15, 2022

(30) Foreign Application Priority Data

Aug. 22, 2019 (JP) ................................ 2019-151959

(51) Int. Cl.
*G09G 5/38* (2006.01)
*G06F 3/04845* (2022.01)
(Continued)

(52) U.S. Cl.
CPC ........... *G09G 5/38* (2013.01); *G06F 3/04845* (2013.01); *G06T 7/73* (2017.01); *G09G 5/006* (2013.01)

(58) Field of Classification Search
None
See application file for complete search history.

(56) References Cited

U.S. PATENT DOCUMENTS 8,965,216 B2 * 2/2015 Oshima ................ H04N 25/531
398/118
9,622,326 B1 * 4/2017 Devyver .............. G09G 3/3406
(Continued)

FOREIGN PATENT DOCUMENTS

| JP | 2003-330615 A | 11/2003 |
|---|---|---|
| JP | 2015-090524 A | 5/2015 |

(Continued)

OTHER PUBLICATIONS

International Search Report and Written Opinion of PCT Application No. PCT/JP2020/030310, dated Oct. 27, 2020, 10 pages of ISRWO.

*Primary Examiner* — Edward Martello
(74) *Attorney, Agent, or Firm* — CHIP LAW GROUP

(57) ABSTRACT

The present disclosure relates to an information processing apparatus, an information processing method, and a program that allow for preventing a decrease in marker recognition rate.

Display of a content image that moves in a first display surface on which a marker image is displayed in a display form in which at least a part of the marker image is not shielded is controlled on the basis of first information regarding feature points of the marker image displayed on the first display surface of a terminal device; and second information regarding the feature points of the marker image on the first display surface in the display form is acquired (Continued)

from image data of a captured image obtained by imaging the first display surface, and a position and an orientation of the terminal device are detected on the basis of the image data. The present disclosure can be applied to, for example, an information processing apparatus, an image processing apparatus, an electronic device, an information processing method, a program, or the like.

19 Claims, 47 Drawing Sheets

(51) Int. Cl.
*G06T 7/73* (2017.01)
*G09G 5/00* (2006.01)

(56) References Cited

U.S. PATENT DOCUMENTS

| | | | |
|---|---|---|---|
| 2015/0221133 A1* | 8/2015 | Groten | G06T 11/00 |
| | | | 345/633 |
| 2015/0278636 A1* | 10/2015 | Chen | G06V 10/245 |
| | | | 382/195 |
| 2018/0095708 A1* | 4/2018 | Black | A63F 13/211 |
| 2019/0266408 A1* | 8/2019 | Wang | G06V 20/635 |
| 2020/0074962 A1* | 3/2020 | Norieda | G06T 7/70 |

FOREIGN PATENT DOCUMENTS

| | | |
|---|---|---|
| JP | 2015-179492 A | 10/2015 |
| JP | 2016-009434 A | 1/2016 |
| JP | 2016-126450 A | 7/2016 |
| JP | 2019-009684 A | 1/2019 |
| WO | 2015/129788 A1 | 9/2015 |

* cited by examiner

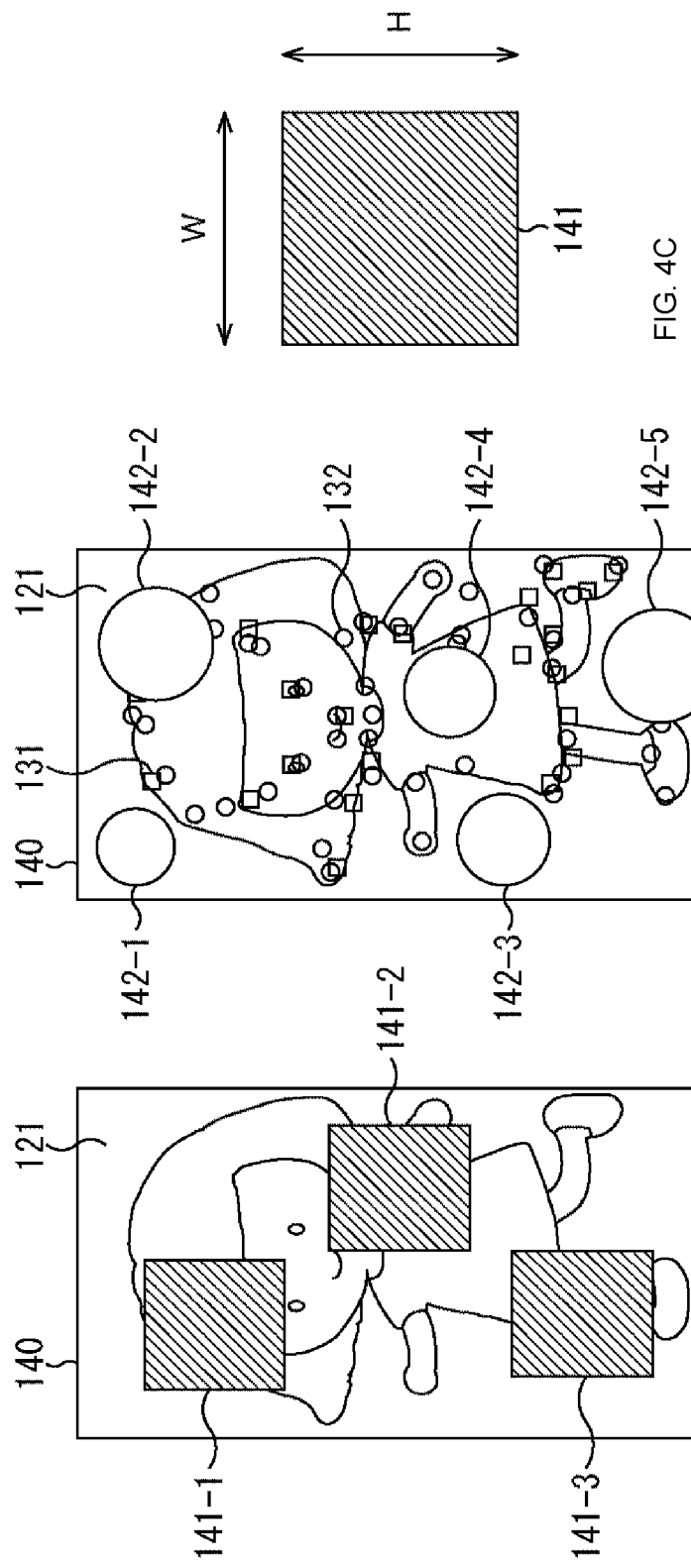

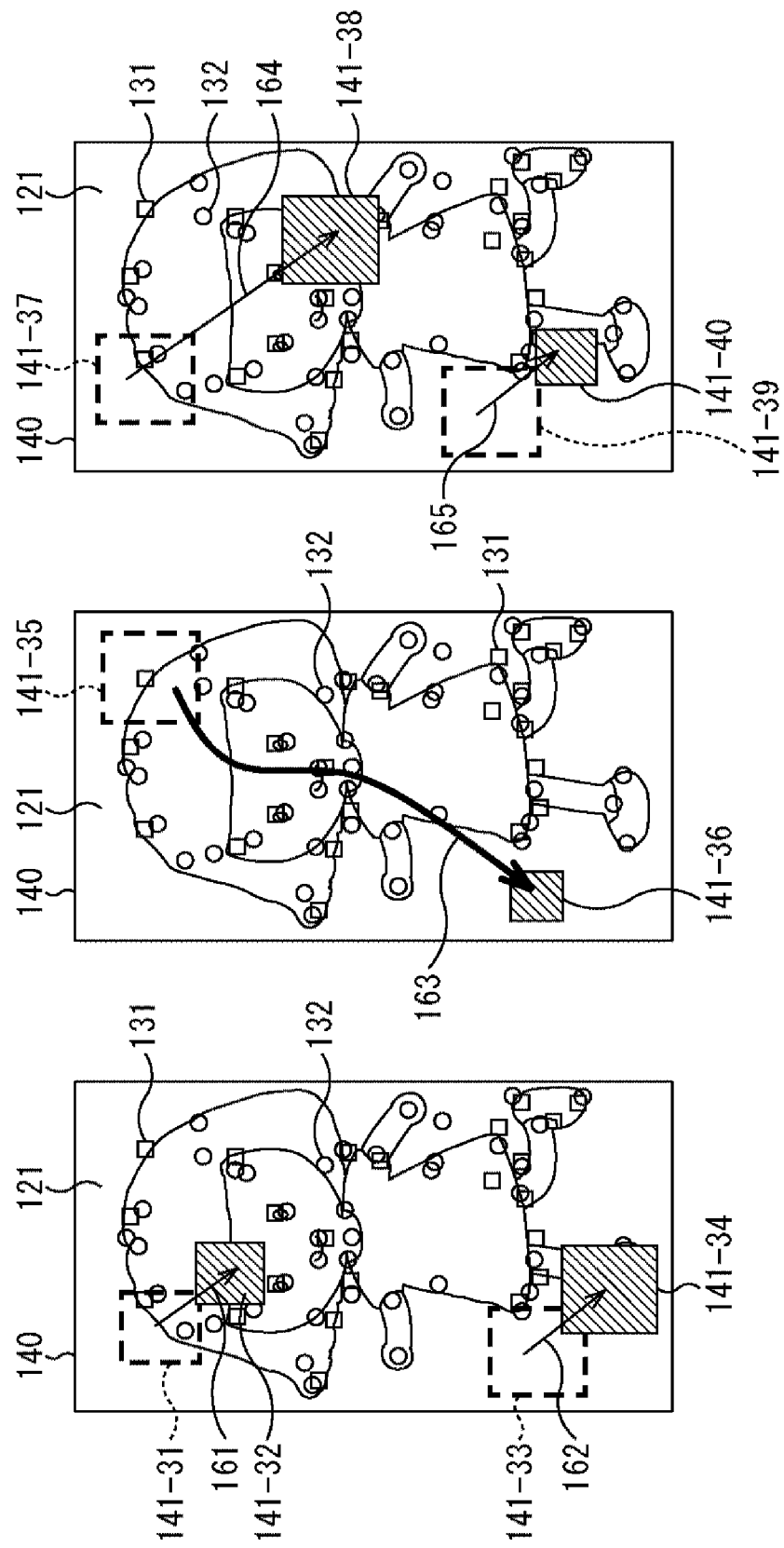

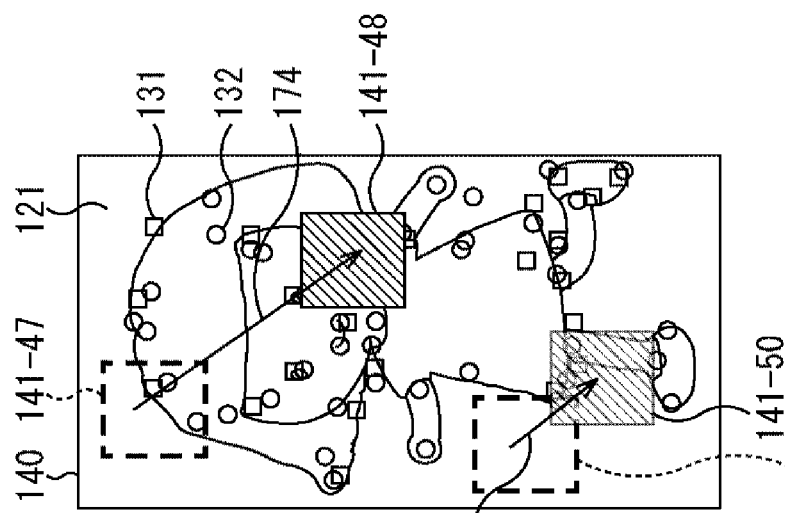
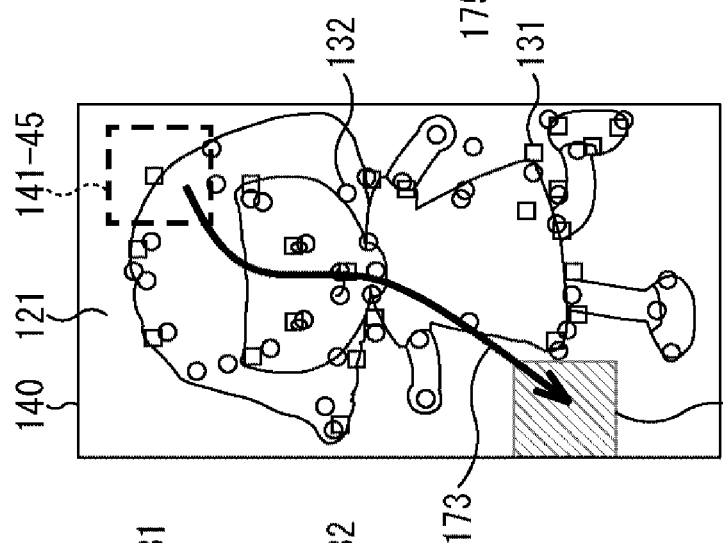
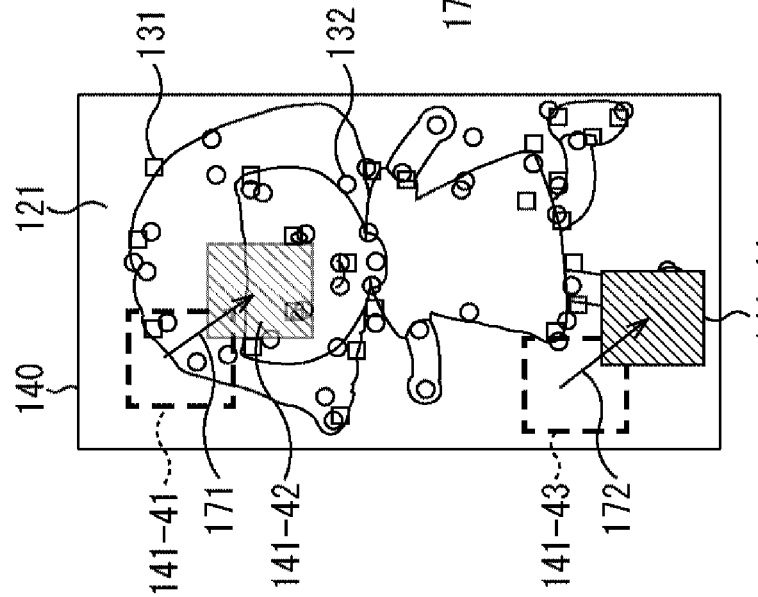

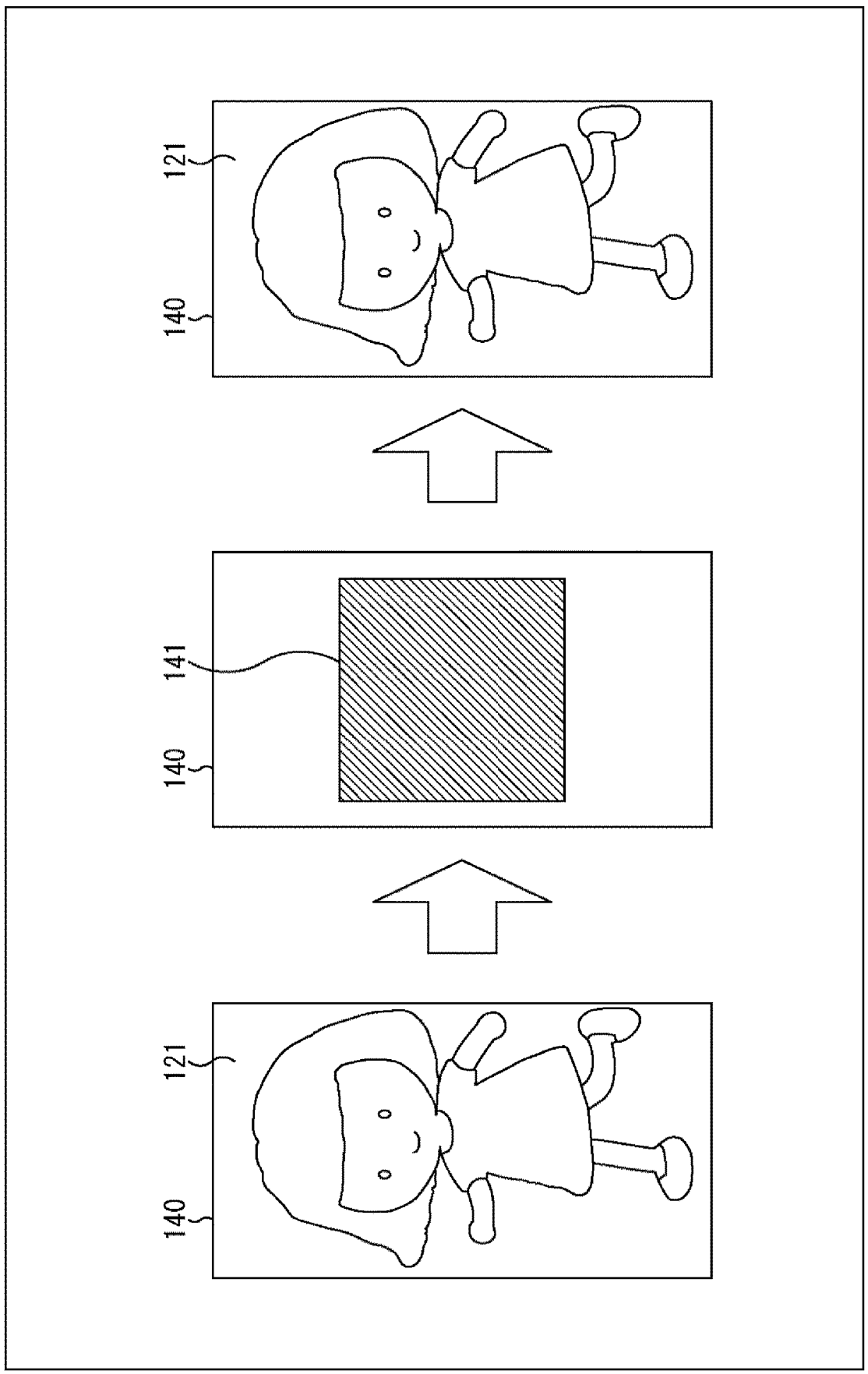

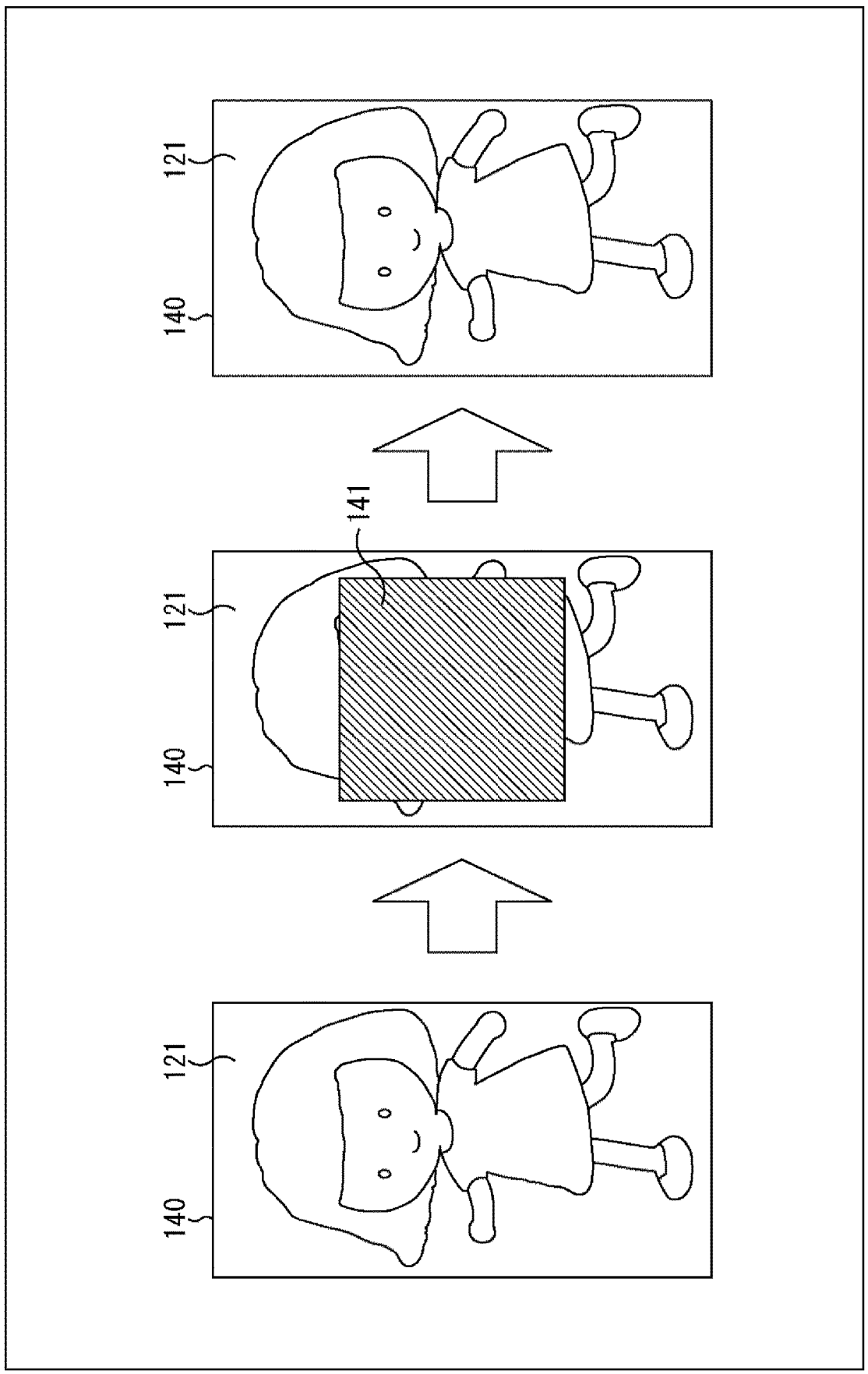

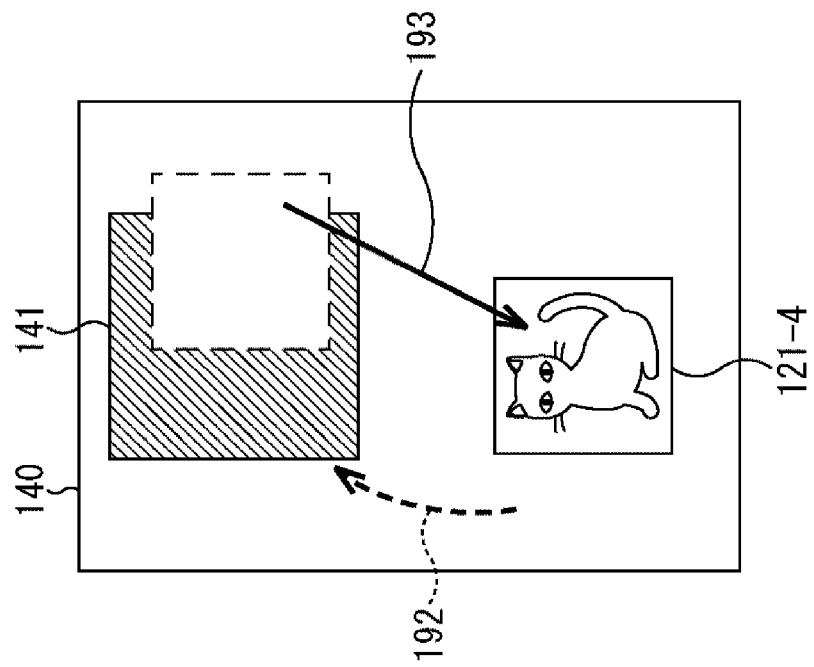
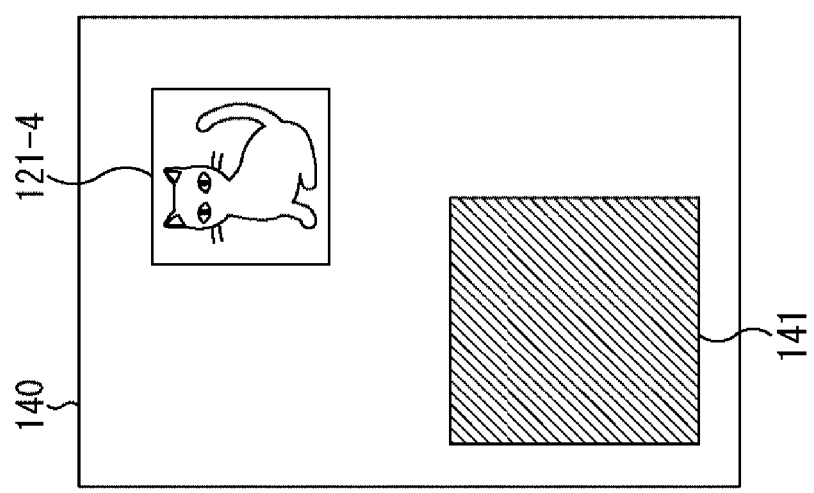

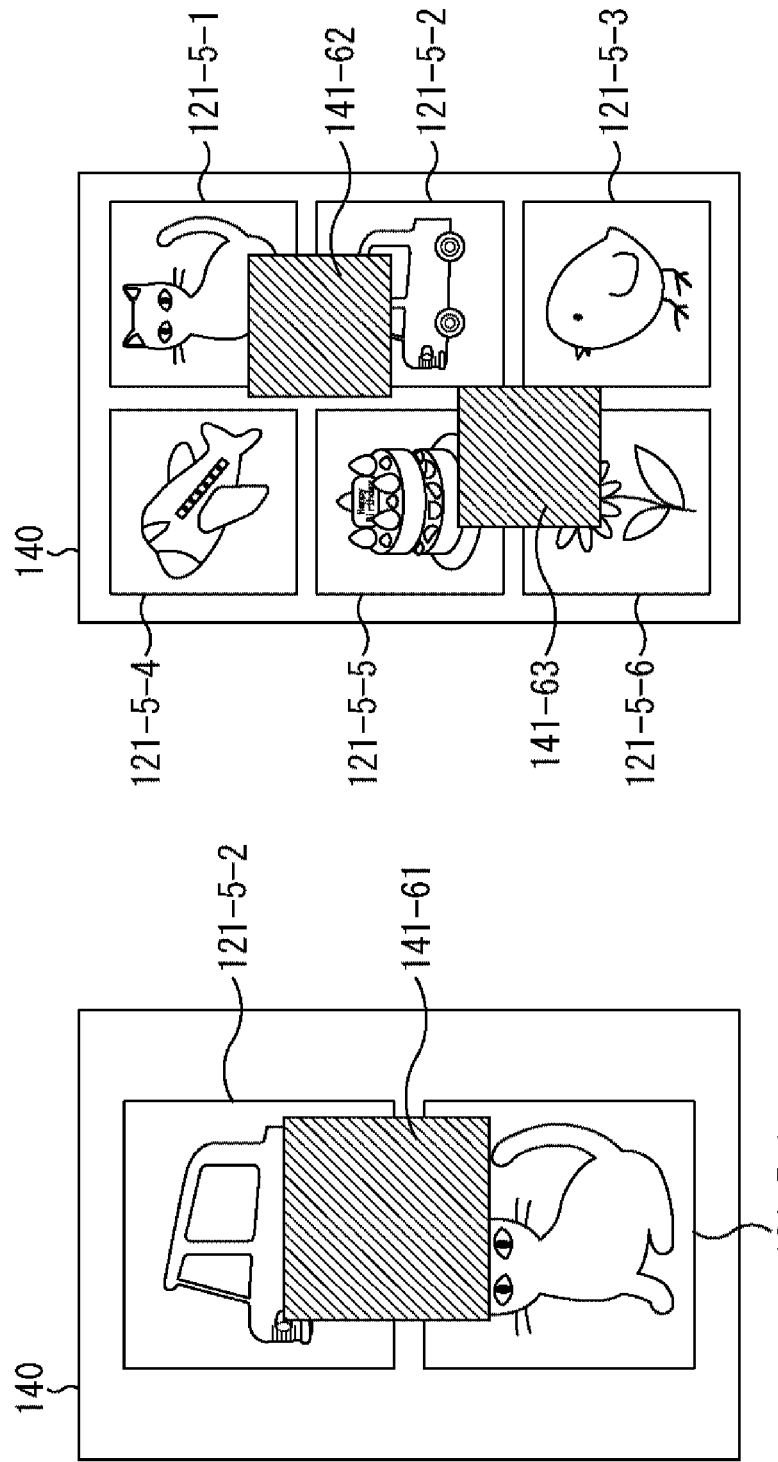

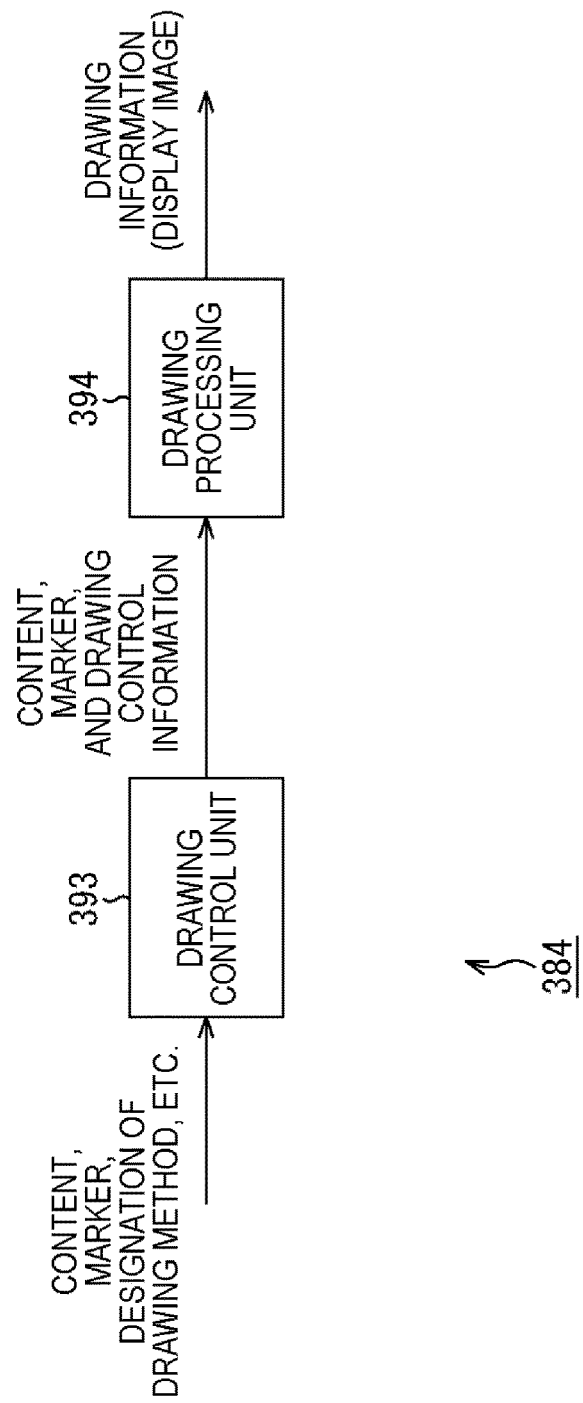

|  | REDUCTION | TRANSPARENT | MOVEMENT | TIME DIVISION |
|---|---|---|---|---|
| CONTENT DOES NOT ALLOW POSITION OF PRESENTATION TO BE CHANGED REGARDLESS OF USER'S INTENTION | 1 | 1 | 0 | 0 |
| CONTENT IS SEAMLESSLY DRAWN BETWEEN INDIVIDUAL TERMINAL AND INTEGRATED TERMINAL AT ALL TIMES | 0 | 1 | 1 | 1 |
| CONTENT IN INDIVIDUAL TERMINAL NEEDS TO BE GAZED AT AND OPERATED AT ALL TIME | 1 | 1 | 1 | 0 |

FIG. 34A

|  | FULL SCREEN | OUTSIDE | HALF SCREEN | MOVABLE | MULTIPLE |
|---|---|---|---|---|---|
| CONTENT IS SEAMLESSLY DRAWN BETWEEN INDIVIDUAL TERMINAL AND INTEGRATED TERMINAL AT ALL TIMES | 1 | 0 | 0 | 1 | 1 |
| INDIVIDUAL TERMINAL THAT IS SMALL IN IMAGE SIZE IS USED | 1 | 0 | 0 | 0 | 0 |
| TERMINAL LUMINANCE AND OUTSIDE LIGHT CANNOT BE ADJUSTED | 0 | 0 | 0 | 0 | 1 |
| SIZE OF CONTENT IS SUFFICIENTLY SMALL WITH RESPECT TO SCREEN SIZE OF INDIVIDUAL TERMINAL | 1 | 1 | 1 | 1 | 1 |

FIG. 34B

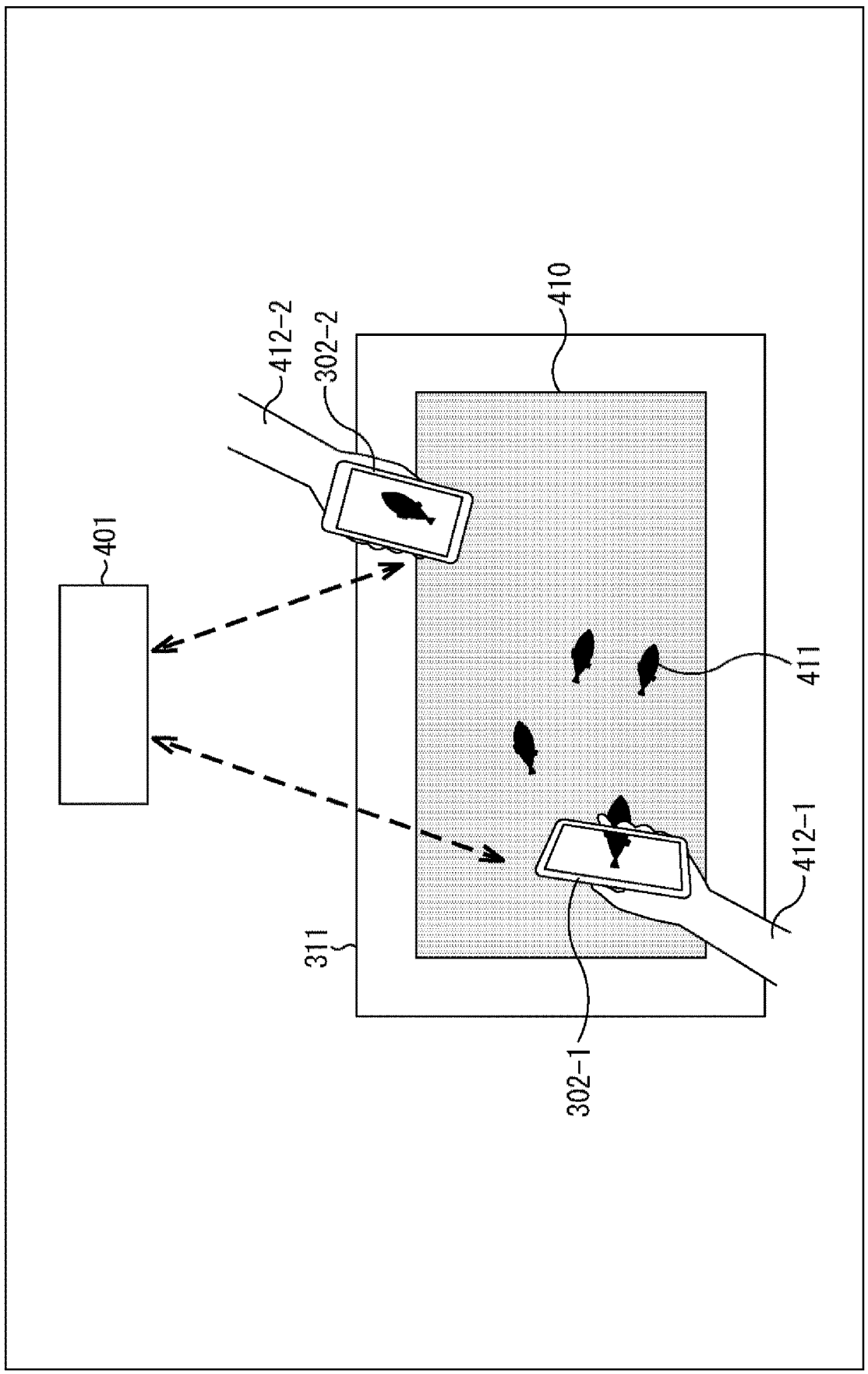

INFORMATION PROCESSING APPARATUS AND INFORMATION PROCESSING METHOD TO CONTROL DISPLAY OF A CONTENT IMAGE

CROSS REFERENCE TO RELATED APPLICATIONS

This application is a U.S. National Phase of International Patent Application No. PCT/JP2020/030310 filed on Aug. 7, 2020, which claims priority benefit of Japanese Patent Application No. JP 2019-151959 filed in the Japan Patent Office on Aug. 22, 2019. Each of the above-referenced applications is hereby incorporated herein by reference in its entirety.

TECHNICAL FIELD

The present disclosure relates to an information processing apparatus, an information processing method, and a program, and more particularly, to an information processing apparatus, an information processing method, and a program that allow for preventing a decrease in marker recognition rate.

BACKGROUND ART

A method has conventionally been conceived in which an appearance of a real object is recognized and a video is presented in the vicinity of the real object (e.g., see Patent Document 1). However, in the case of this method, it is difficult to distinguish between devices having the same appearance. Thus, a method for identifying each device by displaying markers as identification images on devices and recognizing the markers has been conceived.

CITATION LIST

Patent Document

Patent Document 1: Japanese Patent Application Laid-Open No. 2015-90524

SUMMARY OF THE INVENTION

Problems to be Solved by the Invention

However, there has been a possibility that, in a case where not only markers but also content images are displayed, the content images overlapping with feature points of the markers on a display surface causes a decrease in marker recognition rate.

The present disclosure has been made in view of such a situation, and is intended to allow for preventing a decrease in marker recognition rate.

Solutions to Problems

One aspect of the present technology provides an information processing apparatus including: a control unit that controls display of a content image that moves in a first display surface on which a marker image is displayed in a display form in which at least a part of the marker image is not shielded on the basis of first information regarding feature points of the marker image displayed on the first display surface of a terminal device; and a detection unit that acquires second information regarding the feature points of the marker image on the first display surface in the display form from image data of a captured image obtained by imaging the first display surface, and detects a position and an orientation of the terminal device on the basis of the image data.

One aspect of the present technology provides an information processing method including: controlling display of a content image that moves in a first display surface on which a marker image is displayed in a display form in which at least a part of the marker image is not shielded on the basis of first information regarding feature points of the marker image displayed on the first display surface of a terminal device; and acquiring second information regarding the feature points of the marker image on the first display surface in the display form from image data of a captured image obtained by imaging the first display surface, and detecting a position and an orientation of the terminal device on the basis of the image data.

One aspect of the present technology provides a program for causing a computer to function as: a control unit that controls display of a content image that moves in a first display surface on which a marker image is displayed in a display form in which at least a part of the marker image is not shielded on the basis of first information regarding feature points of the marker image displayed on the first display surface of a terminal device; and a detection unit that acquires second information regarding the feature points of the marker image on the first display surface in the display form from image data of a captured image obtained by imaging the first display surface, and detects a position and an orientation of the terminal device on the basis of the image data.

In the information processing apparatus, the information processing method, and the program according to the one aspect of the present technology, display of a content image that moves in a first display surface on which a marker image is displayed is controlled in a display form in which at least a part of the marker image is not shielded on the basis of first information regarding feature points of the marker image displayed on the first display surface of a terminal device.

BRIEF DESCRIPTION OF DRAWINGS

FIGS. 4A, 4B and 4C are diagrams illustrating an example of controlling a position and a size of a content image.

FIGS. 10A, 10B and 10C are diagrams illustrating an example of controlling a movement of a content image.

FIGS. 11A, 11B and 11C are diagrams illustrating an example of controlling a movement of a content image.

FIG. 13 is a diagram illustrating an example of intermittent display of a content image.

FIG. 14 is a diagram illustrating an example of intermittent display of a content image.

FIGS. 22A and 22B are diagrams illustrating an example of a movable marker.

FIGS. 23A and 23B are diagrams illustrating an example of a multiple marker.

FIG. 33 is a block diagram illustrating an example of a main configuration of a drawing information generation unit.

FIGS. 34A and 34B are diagrams illustrating an example of how a method of drawing a content image/marker is set.

FIG. 40 is a diagram illustrating an example of application software.

MODE FOR CARRYING OUT THE INVENTION

Figure 1:
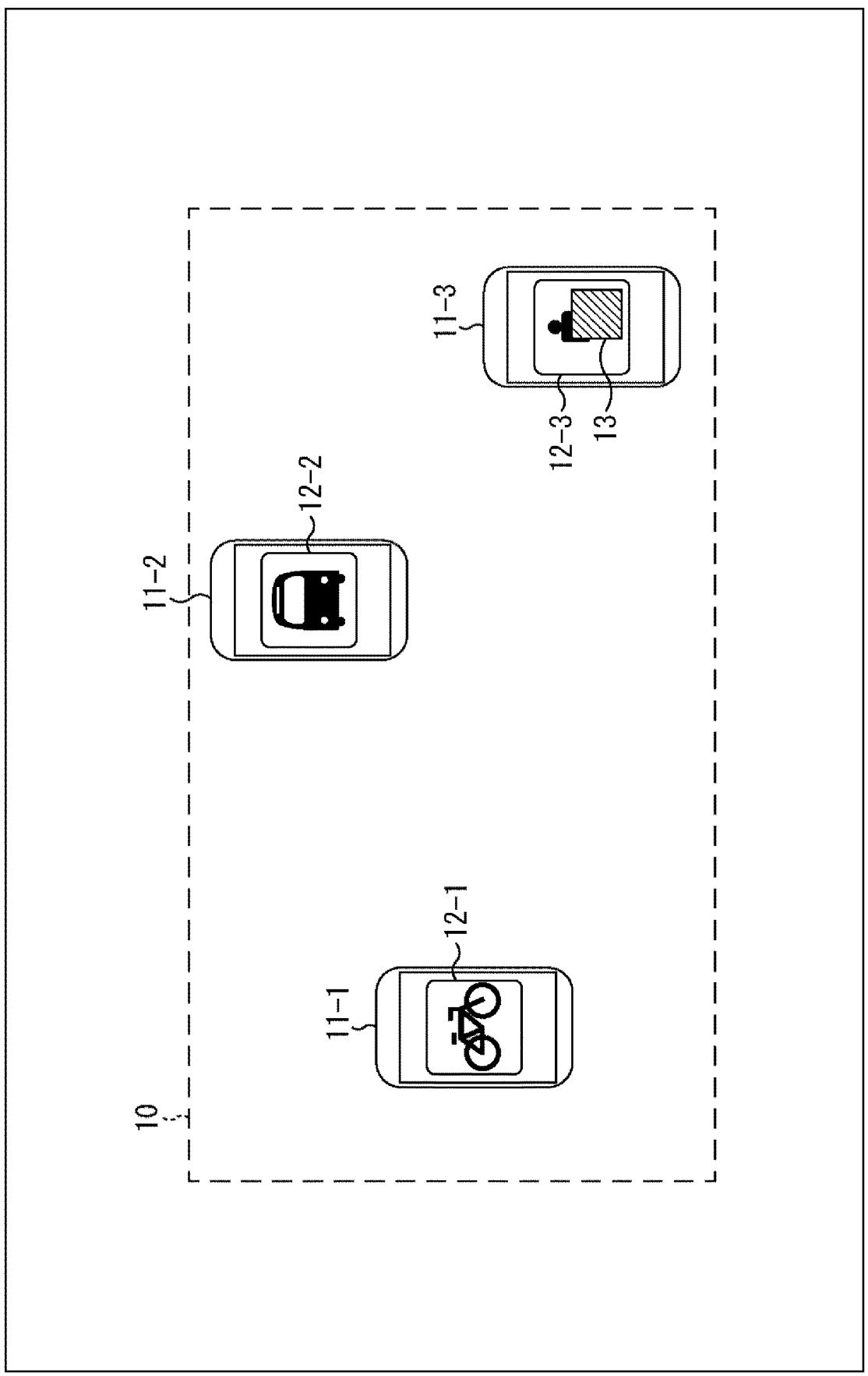
FIG. 1 is a diagram illustrating an example of how a device is identified with the use of a marker.

Modes for carrying out the present disclosure (hereinafter referred to as "embodiments") will be described below. Note that the description will be made in the order below.
1. Device identification using marker
2. First embodiment (drawing control device)
3. Second embodiment (information processing system)
4. Examples of application
5. Other configuration examples
6. Notes 1. Device Identification Using Marker <Recognition of Real Object>

A method has conventionally been conceived in which an appearance (design or the like) of a real object is recognized, the real object is identified on the basis of the appearance, and a video corresponding to the real object is presented in the vicinity of the real object as described in Patent Document 1. However, in the case of this method, it is difficult to distinguish between devices having the same appearance.

<Use of Marker>

Thus, a method for identifying each device by displaying markers as identification images (also referred to as marker images) on devices and recognizing the markers has been conceived. For example, in FIG. 1, a display device 11-1 and a display device 11-2 are installed in a predetermined region 10.

A marker 12-1, which is an image of a bicycle, is displayed on a display of the display device 11-1. A marker 12-2, which is an image of a car, is displayed on a display of the display device 11-2. The marker 12-1 is an identification image for identifying the display device 11-1. The marker 12-2 is an identification image for identifying the display device 11-2.

The marker 12-1 and the marker 12-2 are registered in advance in a recognition device (not illustrated) that recognizes a marker in the region 10. The marker 12-1 is associated with the display device 11-1, and the marker 12-2 is associated with the display device 11-2.

The recognition device detects a design displayed on the display of the display device 11-1 and recognizes that the design is the marker 12-1, thereby identifying the display device displaying the marker 12-1 as the display device 11-1 and grasping the position of the display device. With this arrangement, the recognition device can perform processing for the display device 11-1, such as displaying an image for the display device 11-1 around the display device 11-1.

Similarly, the recognition device detects a design displayed on the display of the display device 11-2 and recognizes that the design is the marker 12-2, thereby identifying the display device displaying the marker 12-2 as the display device 11-2 and grasping the position of the display device. With this arrangement, the recognition device can perform processing for the display device 11-2, such as displaying an image for the display device 11-2 around the display device 11-2.

Using markers as described above facilitates identification of devices without dependence on appearances of the devices. Note that the designs of the markers as identification images may be any designs as long as the designs can be detected by the recognition device.

Incidentally, it is conceivable to use the display of the display device not only for displaying the marker but also for other uses. For example, it is conceivable to display a content image (an optional image other than the marker) on the display when the display device executes an application software program. In that case, there has been a possibility that if, for example, the display of the marker is stopped and only the content image is displayed, the recognition device cannot recognize the marker during that time, and this makes it more difficult to identify the display device.

Furthermore, for example, in a case where both a marker 12-3, which is a human-shaped image, and a content image 13 are displayed on the display as in a display device 11-3 in FIG. 1, there is a possibility that the marker 12-3 and the content image 13 overlap with each other as in the example in FIG. 1 since the size of the screen is finite. The marker 12-3 is an identification image for identifying the display device 11-3.

In that case, in a case of overlapping with the content image 13 on the top as in the example in FIG. 1, a part or the whole of the marker 12-3 can no longer be displayed, and there has been a possibility that the recognition rate of the marker 12-3 is decreased (that is, recognition of the marker 12-3 is more likely to fail). That is, there has been a possibility that it becomes more difficult to identify the display device 11-3.

Note that, in a case of overlapping with the marker 12-3 on the top, a part or the whole of the content image 13 can no longer be displayed, and there has been a possibility that quality of the application is decreased. Furthermore, a method is also conceivable in which display regions, one for each of the marker 12-3 and the content image 13, on the display are separated so as not to overlap with the other. However, in that case, the region where the content image 13 can be displayed is restricted, and there has been a possibility that the quality of the application is decreased.

For example, since the region where the content image 13 can be displayed is restricted, there has been a possibility that it becomes difficult to seamlessly move the content image 13 between a display (display region) of the display device 11-3 and a display region other than the display device 11-3.

<Content Display Control Based on Marker>

Thus, on the basis of the identification image to be drawn, a form of the content image to be drawn together with the identification image is controlled. In other words, the display form of the content image on a display surface is controlled on the basis of the identification image on the display surface.

For example, information regarding an identification image and information regarding a content image are acquired, and the display form of the content image on the display surface is controlled on the basis of the identification image on the display surface. Furthermore, for example, display of a content image that moves in a first display surface on which a marker image is displayed is controlled in a display form in which at least a part of the marker image is not shielded on the basis of first information regarding feature points of the marker image displayed on the first display surface of a terminal device, second information regarding the feature points of the marker image on the first display surface in the display form is acquired from image data of a captured image obtained by imaging the first display surface, and a position and an orientation of the terminal device are detected on the basis of the image data.

For example, an information processing apparatus includes a display control unit that acquires information regarding an identification image and information regarding a content image, and controls the display form of the content image on a display surface on the basis of the identification image on the display surface. Furthermore, for example, an information processing apparatus includes: a control unit that controls display of a content image that moves in a first display surface on which a marker image is displayed in a display form in which at least a part of the marker image is not shielded on the basis of first information regarding feature points of the marker image displayed on the first display surface of a terminal device; and a detection unit that acquires second information regarding the feature points of the marker image on the first display surface in the display form from image data of a captured image obtained by imaging the first display surface, and detects a position and an orientation of the terminal device on the basis of the image data.

For example, a program is executed to cause a computer to function as a display control unit that acquires information regarding an identification image and information regarding a content image, and controls the display form of the content image on a display surface on the basis of the identification image on the display surface. Furthermore, for example, a program is executed to cause a computer to function as: a control unit that controls display of a content image that moves in a first display surface on which a marker image is displayed in a display form in which at least a part of the marker image is not shielded on the basis of first information regarding feature points of the marker image displayed on the first display surface of a terminal device; and a detection unit that acquires second information regarding the feature points of the marker image on the first display surface in the display form from image data of a captured image obtained by imaging the first display surface, and detects a position and an orientation of the terminal device on the basis of the image data.

This makes it possible to prevent a decrease in marker recognition rate while preventing an influence on display of the content image. It is therefore possible to prevent a decrease in marker recognition rate while preventing a decrease in quality of an application as described above, for example.

Note that, in the present specification, "display" includes all sorts of forms of image output. For example, "projection" of an image by a so-called projector or the like is also included in this "display". Furthermore, a "display surface" refers to a region where an image is displayed. This "display surface" includes, for example, both a display region of a display and a region on which an image is projected.

2. First Embodiment

<2-1: Drawing Control Device>

Figure 2:
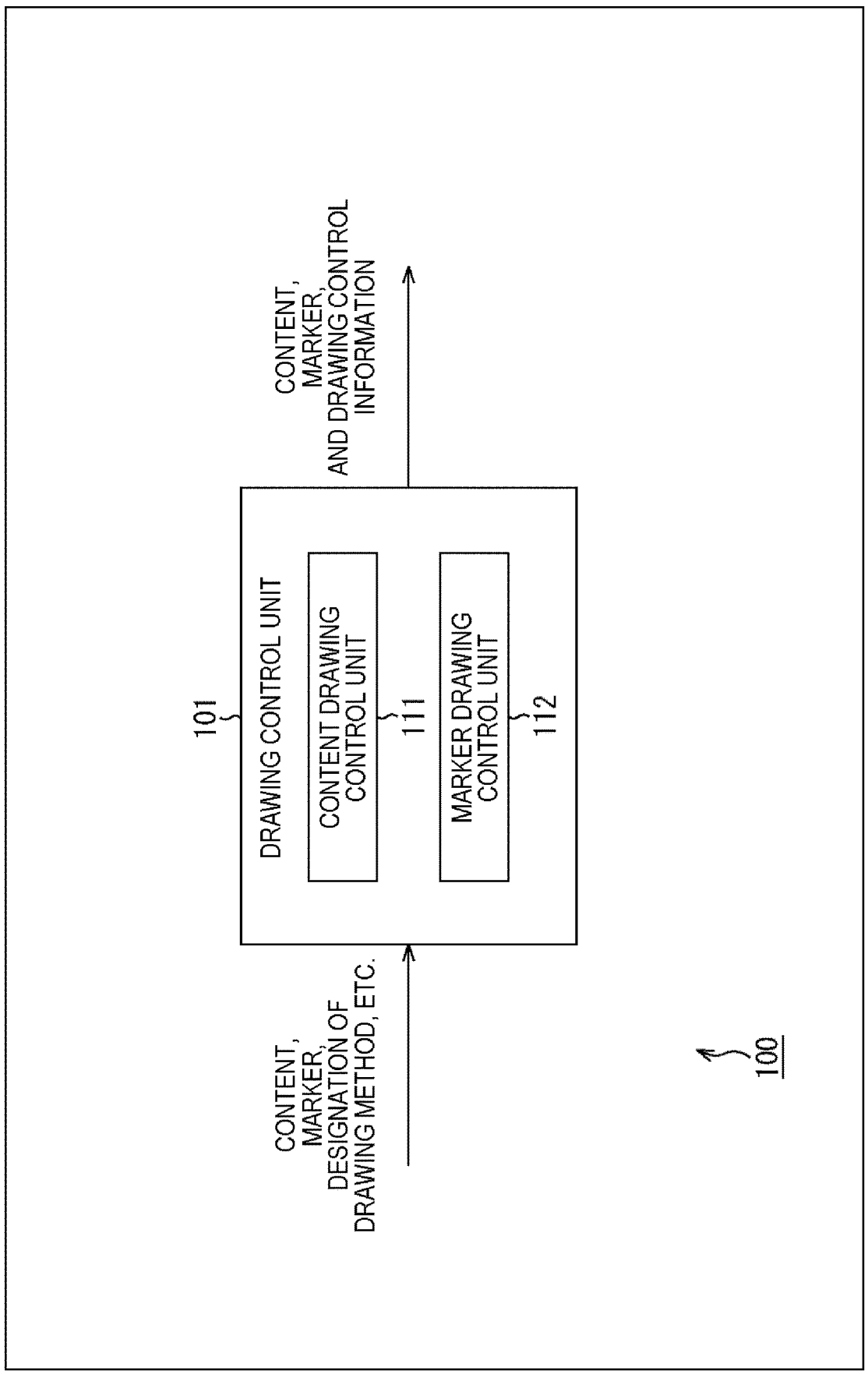
FIG. 2 is a block diagram illustrating an example of a main configuration of a drawing control device.

FIG. 2 is a block diagram illustrating an example of a configuration of a drawing control device, which is a mode of an information processing apparatus to which the present technology is applied. A drawing control device 100 illustrated in FIG. 2 controls drawing of a display image (that is, generation of a display image). In particular, the drawing control device 100 controls drawing of a marker, which is an identification image, and a content image, which is an image of an optional content, included in the display image. In other words, the drawing control device 100 is a display control device that controls display of the marker or the content image. As illustrated in FIG. 2, the drawing control device 100 includes a drawing control unit 101.

The drawing control unit 101 acquires a content image, a marker, designation of a drawing method (display method) thereof, and the like supplied to the drawing control device 100. The drawing control unit 101 generates drawing control information for controlling drawing of the content image and the marker on the basis of the acquired designation of the drawing method (display method). That is, the drawing control information is control information for drawing (generating) a display image by using the content image and the marker by the designated drawing method. In other words, the drawing control information is display control information for displaying the content image and the marker by the designated display method.

Then, the drawing control unit 101 outputs the generated drawing control information, content image, and marker. That is, the drawing control unit 101 controls drawing of the content image and the marker on the basis of the designated drawing method. In other words, the drawing control unit 101 controls display of the content image and the marker on the basis of the designated display method.

As illustrated in FIG. 2, the drawing control unit 101 includes a content drawing control unit 111 and a marker drawing control unit 112. The content drawing control unit 111 performs processing related to control of drawing (display) of a content image. The marker drawing control unit 112 performs processing related to control of drawing (display) of a marker.

Note that the drawing control unit 101 has an optional configuration. For example, this processing unit may be constituted by a logic circuit that implements the above-described processing. Furthermore, this processing unit may include, for example, a central processing unit (CPU), a read only memory (ROM), a random access memory (RAM), or the like, and execute a program by using the CPU, the ROM, the RAM, or the like to implement the above-described processing. As a matter of course, this processing unit may have both configurations, and implement the above-described processing in which a part of the above-described processing is implemented by the logic circuit and the rest is implemented by execution of the program.

Figure 3B:
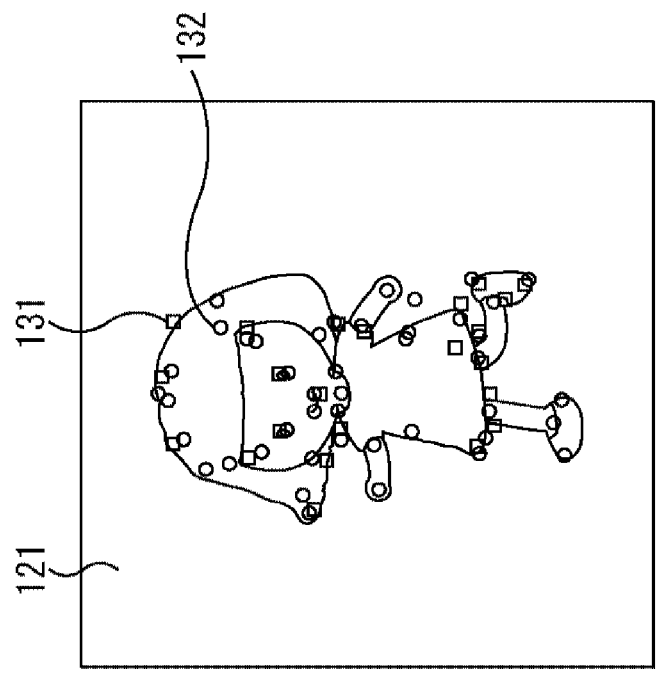
FIGS. 3A and 3B are diagrams illustrating an example of a marker.
Figure 3A:
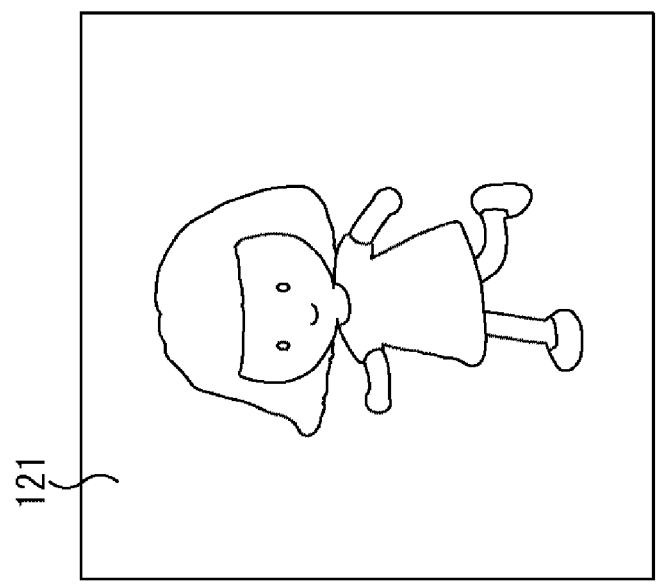

<2-2: Marker> Next, markers will be described. A marker is an identification image, and is constituted by an optional design. FIGS. 3A and 3B illustrate an example of the marker. As illustrated in FIG. 3A, a marker 121 is constituted by, for example, a natural image. As illustrated in FIG. 3B, the marker 121 is analyzed in advance, and a feature point thereof is extracted and registered in a recognition device (not illustrated) that recognizes the marker 121. This feature point may indicate any feature of the image. Furthermore, the number of feature points to be registered and the number of types are both optional.

In the case of the example in FIG. 3B, a feature point 131 (feature point indicated by a square in the drawing) used for tracking an object to be recognized and a feature point 132 (feature point indicated by a circle in the drawing) used for detecting the object to be recognized are extracted from a marker 121 and registered. Note that, in FIG. 3B, although only one feature point 131 is denoted by a reference sign, all feature points indicated by squares are the feature points 131 used for detecting the object to be recognized. Furthermore, in FIG. 3B, although only one feature point 132 is denoted by a reference sign, all feature points indicated by circles are the feature points 132 used for tracking the object to be recognized.

The drawing control unit 101 controls a form of drawing a content image on the basis of the positions of the feature points 131 and the feature points 132 of the marker 121 as described above on the display surface. For example, the drawing control unit 101 controls the form of drawing a content image on the basis of density of the feature points 131 and the feature points 132. This makes it possible to prioritize display of the feature points 131 and the feature points 132 necessary for recognition of the marker 121, and prevent a decrease in marker recognition rate.

<2-3: Method of drawing content image> <Reduction> Next, a method of controlling drawing of a content image will be described. First, "reduction", which is a control method for controlling a drawing size of a content image, will be described. In the case of "reduction", the content image is displayed so as to overlap with the marker 121. For example, in a case of FIG. 4A, the marker 121 is displayed on an entire display surface 140, and a content image 141-1, a content image 141-2, and a content image 141-3 are displayed so as to overlap with the marker 121 (on top of the marker 121). Hereinafter, a plurality of the content images 141-N(N is a natural number) will be referred to as content images 141 in a case where it is not necessary to distinguish the content images from each other in the description.

Then, each of these content images 141 is controlled to be displayed in a size equal to or smaller than the original size. That is, the drawing size (display size) of the content image 141 on the display surface 140 is controlled so that the content image 141 does not overlap with the feature points 131 and the feature points 132 of the marker 121 (that is, so as to avoid the feature points).

For example, as in FIG. 4B, the content drawing control unit 111 specifies the positions of the feature points 131 and the feature points 132 of the marker 121 on the display surface 140. Then, on the basis of the positions of the feature points, the content drawing control unit 111 sets the drawing size of the content image 141 to a maximum size (up to the original size) that allows for avoiding overlapping with these feature points.

With this control, the content image 141 can be drawn (displayed) so as to overlap with the marker 121 without overlapping with the feature points 131 and the feature points 132. It is therefore possible to prevent a decrease in marker recognition rate while preventing an influence on display of the content image. Furthermore, since the content image is displayed in a size as large as possible on the basis of the positions of the feature points, visibility of the content image on the display can be maintained.

Note that the maximum drawing size of the content image 141 may be larger than the original size. Furthermore, in a case where the position where the content image 141 is drawn can be changed, the drawing position may be set so as not to overlap with the feature points 131 and the feature points 132 (that is, so as to avoid the feature points) on the basis of the positions of the feature points 131 and the feature points 132. For example, the content drawing control unit 111 may specify a region (in the case of the example in FIG. 4B, a region 142-1 to a region 142-5) where the feature points 131 and the feature points 132 do not exist on the display surface 140, and the content image 141 may be draw in any of the regions.

Moreover, the content drawing control unit 111 may set a width W and a height H of the content image 141 (FIG. 4C) independently of each other. That is, an aspect ratio of the content image 141 may be set to be variable. As a matter of course, the aspect ratio of the content image 141 may be fixed.

Furthermore, the content drawing control unit 111 may set the drawing size of the content image 141 on the basis of the density of the feature points. For example, the content drawing control unit 111 may control the drawing size to be smaller in a region where the density of the feature points is higher, and control the drawing size to be larger in a region where the density of the feature points is lower.

<Flow of Content Drawing Control Processing (Reduction)>

Next, an example of a flow of content drawing control processing executed in the case of "reduction" will be described with reference to a flowchart in FIG. 5.

When the content drawing control processing is started, in step S101, the content drawing control unit 111 of the drawing control unit 101 of the drawing control device 100 sets the drawing size of a content image to a minimum.

In step S102, the content drawing control unit 111 determines whether or not there is a feature point of the marker in a drawing area of the content image. If it is determined that there is no feature point, the processing proceeds to step S103.

In step S103, the content drawing control unit 111 increases the drawing size of the content image. When the processing of step S103 ends, the processing returns to step S102. That is, the processing of step S102 and step S103 is repeated until the drawing area and a feature point overlap with each other, and the drawing size is gradually increased.

Then, if it is determined in step S102 that there is a feature point in the drawing area, the processing proceeds to step S104. In step S104, the content drawing control unit 111 determines the drawing size of the content image is to be the current setting.

In step S105, the content drawing control unit 111 generates and outputs drawing control information for drawing the content image in the drawing size determined by the processing of step S104.

When the processing of step S105 ends, the content drawing control processing ends.

By performing each piece of processing in this manner, the drawing control device 100 can draw (display) the content image 141 so that the content image 141 overlaps with the marker 121 without overlapping with the feature points 131 and the feature points 132. It is therefore possible to prevent a decrease in marker recognition rate while preventing an influence on display of the content image.

<Transparency>

Next, "transparency", which is a control method for controlling a transparency of a content image, will be described. In the case of the "transparency", the content image is displayed so as to overlap with the marker 121 in a state of being transparent with a predetermined transparency.

Figure 6B:
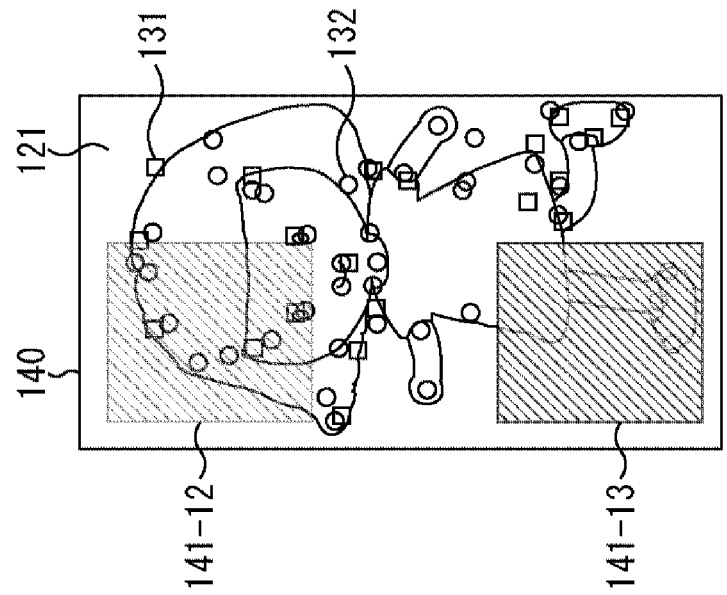
FIGS. 6A and 6B are diagrams illustrating an example of controlling a transparency of a content image.
Figure 6A:
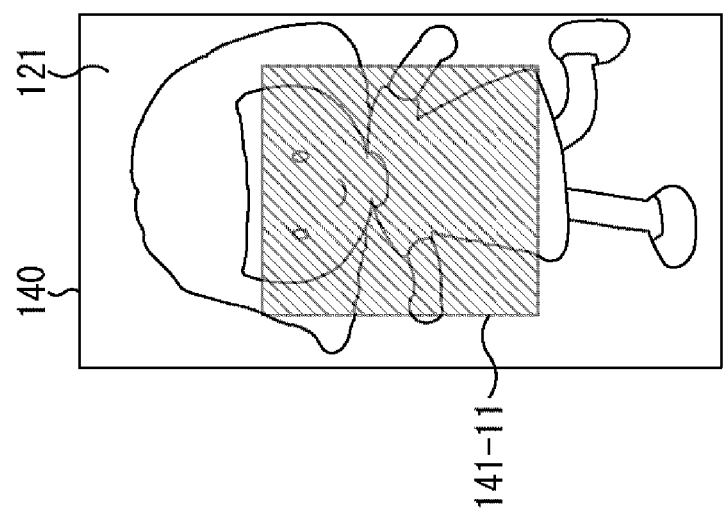

For example, in a case of FIG. 6A, the marker 121 is displayed on the entire display surface 140, and a content image 141-11 is displayed so as to overlap with the marker 121 (on top of the marker 121). Then, the content image 141-11 is transparent with a predetermined transparency. This makes it possible to detect a feature point (feature point displayed so as to overlap with the content image 141-11) in the drawing area (display area) of the content image 141-11. It is therefore possible to prevent a decrease in marker recognition rate.

Furthermore, the content drawing control unit 111 may control the transparency of the content image in accordance with the number of feature points of the marker overlapping with the content image on the display surface (that is, the number of feature points of the marker located in the drawing area of the content image). For example, the content drawing control unit 111 may set the transparency to be higher as the number of feature points that overlap with the content image is larger. In other words, the content drawing control unit 111 may lower the transparency as the number of feature points that overlap with the content image is smaller.

For example, in a case of FIG. 6B, on the display surface 140, the number of the feature points 131 and the feature points 132 located in the drawing area of a content image 141-12 is larger than the number of the feature points 131 and the feature points 132 located in the drawing area of a content image 141-13. The content drawing control unit 111 therefore sets the transparency of the content image 141-12 to be higher than that of the content image 141-13.

In this way, the marker 121 is made more visible in the region where there are more feature points of the marker 121. That is, it is possible to make it easier to detect (more) feature points of the marker 121. In general, a region containing more feature points is more useful for image identification (a region that can be more easily identified) than a region containing less feature points. It is therefore possible to further prevent a decrease in recognition rate of the marker 121 by control as described above.

In other words, control as described above makes the content images 141 more visible in a region containing less feature points of the marker 121. That is, control is performed such that the visibility of the content images 141 is improved in accordance with a decrease in usefulness of the marker 121 for recognition. It is therefore possible to further prevent a decrease in recognition rate of the marker 121 while preventing a decrease in the visibility of the content images 141.

Note that the content drawing control unit 111 may set the transparency of the content images 141 on the basis of the density of the feature points. For example, the content drawing control unit 111 may control the transparency of the content images 141 to be higher in a region where the density of the feature points is higher, and the transparency of the content images 141 to be lower in a region where the density of the feature points is lower.

<Flow of Content Drawing Control Processing (Transparency)>

Next, an example of a flow of content drawing control processing executed in the case of "transparency" will be described with reference to a flowchart in FIG. 7.

When the content drawing control processing is started, in step S121, the content drawing control unit 111 of the drawing control unit 101 of the drawing control device 100 sets a transparency of a content image in accordance with the number of feature points of a marker overlapping with the content image on the display surface. For example, the content drawing control unit 111 sets the transparency to be higher as the number of feature points that overlap with the content image is larger.

In step S122, the content drawing control unit 111 generates and outputs drawing control information for drawing the content image with the transparency set in step S121.

When the processing of step S122 ends, the content drawing control processing ends.

By performing each piece of processing in this manner, the drawing control device 100 can further prevent a decrease in marker recognition rate while preventing a decrease in visibility of the content image.

<Movement>

Next, "movement", which is a control method for controlling a movement of a content image, will be described. In the case of "movement", the content image is displayed while changing its position in the display surface. That is, the content drawing control unit 111 controls the content image to move on the display surface.

Figure 8C:
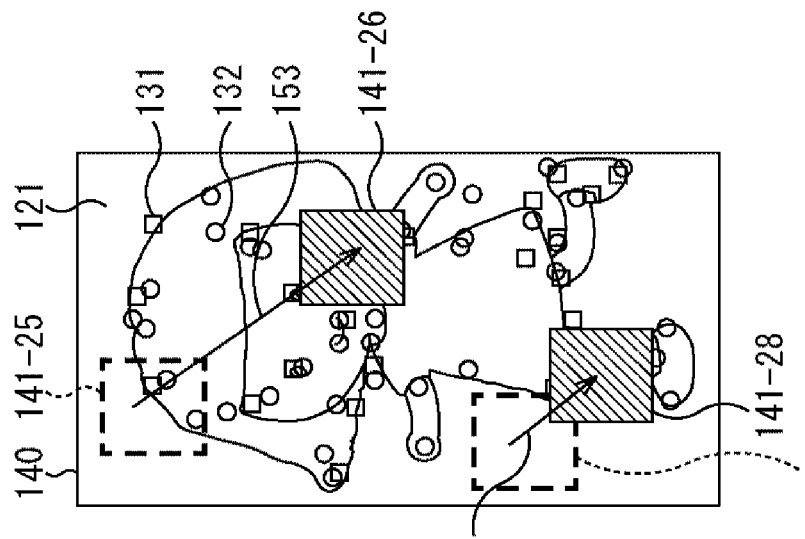
FIGS. 8A, 8B and 8C are diagrams illustrating an example of controlling a movement of a content image.
Figure 8B:
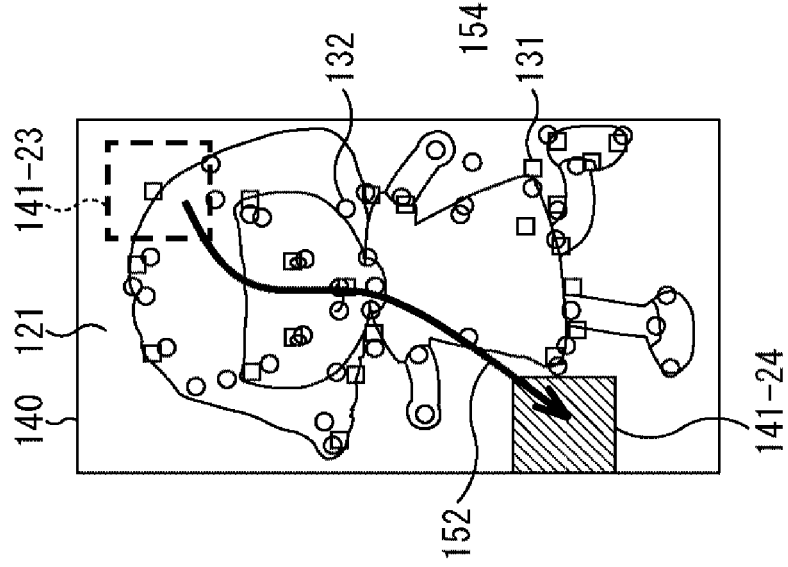
Figure 8A:
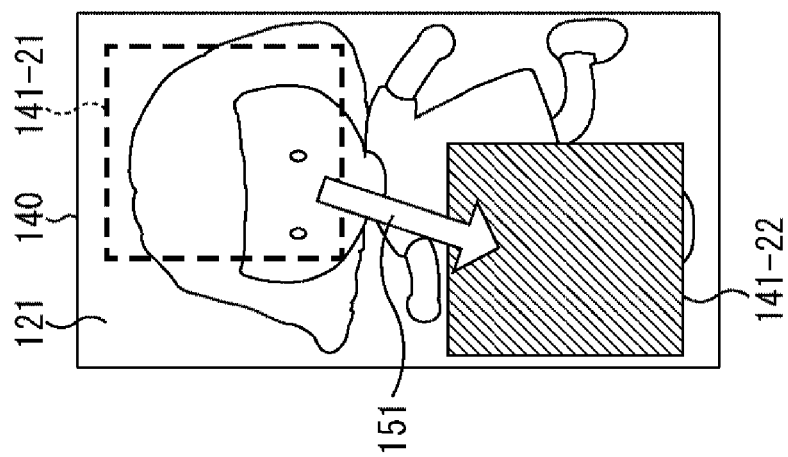

For example, in a case of FIG. 8A, the marker 121 is displayed on the entire display surface 140, and a content image 141-21 is displayed so as to overlap with the marker 121 (on top of the marker 121). Then, the content drawing control unit 111 moves the content image 141-21 to the position of a content image 141-22 as indicated by an arrow 151. This makes it possible to prevent a specific feature amount from being hidden at all times (that is, being continuously undetectable). It is therefore possible to increase the number of feature points detected in a case where feature point detection is performed a plurality of times over a predetermined period as compared with a case where the position of the content image 141 is fixed, for example. That is, by recognizing the marker 121 on the basis of results of the feature point detection during the predetermined period, it is possible to further prevent a decrease in recognition rate of the marker 121.

Furthermore, this movement may be controlled on the basis of the feature points. For example, the content drawing control unit 111 may control a movement route of the content image on the basis of the positions of the feature points on the display surface. In this case, for example, as illustrated in FIG. 8B, in a case where the content image passes over feature points, the content drawing control unit 111 performs control to change the route and cause the content image to move while avoiding the feature points. In the case of the example in FIG. 8B, the movement route (arrow 152) is set such that the number of the feature points 131 and the feature points 132 with which a content image 141-23 overlaps while the content image 141-23 moves to the position of a content image 141-24 is decreased as much as possible (such that the number of feature points over which the content image passes is decreased). This makes it possible to decrease the number of feature points hidden (made undetectable) by the content images 141, and further prevent a decrease in recognition rate of the marker 121.

Furthermore, for example, the content drawing control unit 111 may control the moving speed of the content image in accordance with the number of feature points that overlap with the content image on the display surface. In this case, for example, as illustrated in FIG. 8C, the content drawing control unit 111 performs control to increase the moving speed of the content image in a region containing more feature points and to decrease the moving speed of the content image in a region containing less feature points. In the case of the example in FIG. 8C, a content image 141-25 moves through a region containing more feature points than a content image 141-27. The content drawing control unit 111 therefore moves the content image 141-25 faster than the content image 141-27. That is, while the content image 141-27 moves to the position of a content image 141-28 as indicated by an arrow 154, the content image 141-25 moves to a position of a content image 141-26, which is farther, as indicated by an arrow 153. This makes it possible to further shorten the time during which the content images 141 are drawn over feature points (total time during which the content images 141 overlap with each feature point). It is therefore possible to allow more feature points to be detected for a longer time, and further prevent a decrease in recognition rate of the marker 121.

Note that the content drawing control unit 111 may set the movement routes and the moving speeds of the content images 141 on the basis of the density of the feature points. For example, the content drawing control unit 111 may control the movement routes of the content images 141 so as to avoid, as far as possible, passing through a region where the density of the feature points is higher. In other words, the content drawing control unit 111 may control the movement routes of the content images 141 so as to allow for, as far as possible, passing through a region where the density of the feature points is lower. Furthermore, for example, the content drawing control unit 111 may perform control such that the moving speeds of the content images 141 are increased in a region where the density of the feature points is higher, and the moving speeds of the content images 141 are decreased in a region where the density of the feature points is lower.

<Flow of Content Drawing Control Processing (Movement)>

Figure 9:
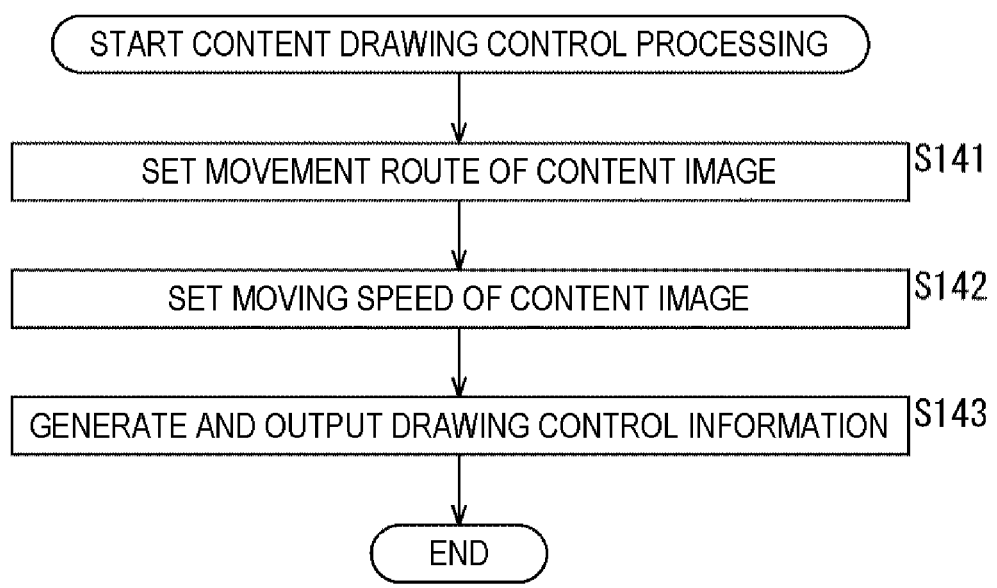
FIG. 9 is a flowchart illustrating an example of a flow of content drawing control processing.

Next, an example of a flow of content drawing control processing executed in the case of "movement" will be described with reference to a flowchart in FIG. 9.

When the content drawing control processing is started, in step S141, the content drawing control unit 111 of the drawing control unit 101 of the drawing control device 100 controls a content image to move on the display surface, and sets a movement route of the content image on the basis of the positions of the feature points on the display surface. For example, the content drawing control unit 111 sets the movement route so that the number of feature points that overlap with the content image while the content image moves is as small as possible.

In step S142, the content drawing control unit 111 sets a moving speed of the content image in accordance with the number of feature points that overlap with the content image while the content image is moving on the display surface. For example, the content drawing control unit 111 controls the moving speed of the content image so as to move the content image faster in a region containing more feature points and move the content image slower in a region containing less feature points.

In step S143, the content drawing control unit 111 generates and outputs drawing control information for drawing the content image so that the content image moves through the movement route set in step S141 at the moving speed set in step S142.

When the processing of step S143 ends, the content drawing control processing ends.

By performing each piece of processing in this manner, the drawing control device 100 can further prevent a decrease in marker recognition rate.

<Combination>

Note that the above-described "movement" may be applied in combination with another control method such as the above-described "reduction" or "transparency". That is, in addition to the movement of the content image, the content drawing control unit 111 may further control at least one of size or transparency of the content image.

<Reduce and move> For example, the content drawing control unit 111 may control drawing of a content image and move the content image with a reduced drawing size so that the content image does not overlap with any feature point as far as possible. In a case of an example in FIG. 10A, the content drawing control unit 111 moves a content image 141-31 to the position of a content image 141-32 as indicated by an arrow 161 while reducing the drawing size. With this control, it is possible to decrease the number of feature points that overlap with the content image (that is, detection becomes difficult) on the content image as compared with a case of moving the content image without changing the drawing size. It is therefore possible to further prevent a decrease in recognition rate of the marker 121.

Note that the content drawing control unit 111 moves a content image 141-33 to the position of a content image 141-34 as indicated by an arrow 162 without changing the drawing size. In a case where the content image does not overlap with any feature point, the content drawing control unit 111 can also move the content image without changing the drawing size in this manner. This makes it possible to prevent a decrease in visibility of unnecessary content images.

<Reduce and move while avoiding> For example, the content drawing control unit 111 may control drawing of a content image, set (update) a movement route of the content image so as to avoid the feature points, and also move the content image with a reduced drawing size so that the content image does not overlap with any feature point as far as possible. In a case of an example in FIG. 10B, the content drawing control unit 111 moves a content image 141-35 to the position of a content image 141-36 along a route indicated by an arrow 163 while reducing the drawing size so that the content image does not overlap with any feature point as far as possible. With this control, it is possible to decrease the number of feature points that overlap with the content image (that is, detection becomes difficult) as compared with a case of setting a movement route without changing the drawing size. It is therefore possible to further prevent a decrease in recognition rate of the marker 121.

<Reduce and move with acceleration> For example, the content drawing control unit 111 may control drawing of a content image so that the content image quickly passes through at an increased moving speed when the content image passes over a feature point, and also the content image moves with a reduced drawing size so as not to overlap with any feature point as far as possible. In a case of an example in FIG. 10C, the content drawing control unit 111 moves a content image 141-37 to the position of a content image 141-38 as indicated by an arrow 164 at high speed without changing the drawing size. Furthermore, the content drawing control unit 111 moves a content image 141-39 to the position of a content image 141-40 as indicated by an arrow 165 with a reduced drawing size at low speed.

As a matter of course, the content drawing control unit 111 can also move the content images 141 at high speed and with a reduced drawing size. With this control, it is possible to decrease the number of feature points that overlap with the content image (that is, detection becomes difficult) as compared with a case of setting a movement route without changing the drawing size. It is therefore possible to further prevent a decrease in recognition rate of the marker 121.

<Make transparent and move> For example, the content drawing control unit 111 may control drawing of a content image so as to make the content image transparent and move the content image. In a case of an example in FIG. 11A, the content drawing control unit 111 moves a content image 141-41 to the position of a content image 141-42 as indicated by an arrow 171 while making the content image transparent. With this control, it is possible to make it easier to detect feature points that overlap with the content image as compared with a case of moving the content image without making the content image transparent. It is therefore possible to further prevent a decrease in recognition rate of the marker 121.

Note that the content drawing control unit 111 moves a content image 141-43 to the position of a content image 141-44 as indicated by an arrow 172 without making the content image transparent. In a case where the content image does not overlap with any feature point, the content drawing control unit 111 can also move the content image without making the content image transparent in this manner. This makes it possible to prevent a decrease in visibility of unnecessary content images.

<Make transparent and move while avoiding> For example, the content drawing control unit 111 may control drawing of a content image, set (update) a movement route of the content image so as to avoid the feature points, and also increase the transparency as the number of feature points that overlap with the content image increases. In a case of an example in FIG. 11B, the content drawing control unit 111 moves a content image 141-45 to the position of a content image 141-36 along a route indicated by an arrow 173 while making the content image transparent in accordance with the number of feature points that overlap with the content image. With this control, an increase in the number of feature points that overlap with the content image is prevented, and it is nevertheless possible to make it easier to detect feature points that overlap with the content image. It is therefore possible to further prevent a decrease in recognition rate of the marker 121.

<Make transparent and move with acceleration> For example, the content drawing control unit 111 may control drawing of a content image so that the content image quickly passes through at an increased moving speed when the content image passes over a feature point, and also the transparency increases as the number of feature points that overlap with the content image increases. In a case of an example in FIG. 11C, the content drawing control unit 111 moves a content image 141-47 to the position of a content image 141-48 as indicated by an arrow 174 at high speed without making the content image transparent. Furthermore, the content drawing control unit 111 moves a content image 141-49 to the position of a content image 141-50 as indicated by an arrow 175 at low speed with the content image made transparent.

As a matter of course, the content drawing control unit 111 can also move the content images 141 at high speed with the content images made transparent. With this control, it is possible to decrease the time during which feature points overlap with the content images (that is, detection becomes difficult). Furthermore, it is possible to make it easier to detect feature points that overlap with the content images. It is therefore possible to further prevent a decrease in recognition rate of the marker 121.

<Other Combinations>

Note that it is possible to combine "reduction" and "transparent". Furthermore, it is possible to combine "reduction", "transparent", and "movement". Furthermore, it is possible to combine a movement route setting and a moving speed setting. Moreover, it is possible to combine a movement route setting, a moving speed setting, and another control ("reduction" or "transparent").

Furthermore, the content drawing control unit 111 may set these controls on the basis of the density of the feature points.

<Flow of Content Drawing Control Processing (Combination)>

Figure 12:
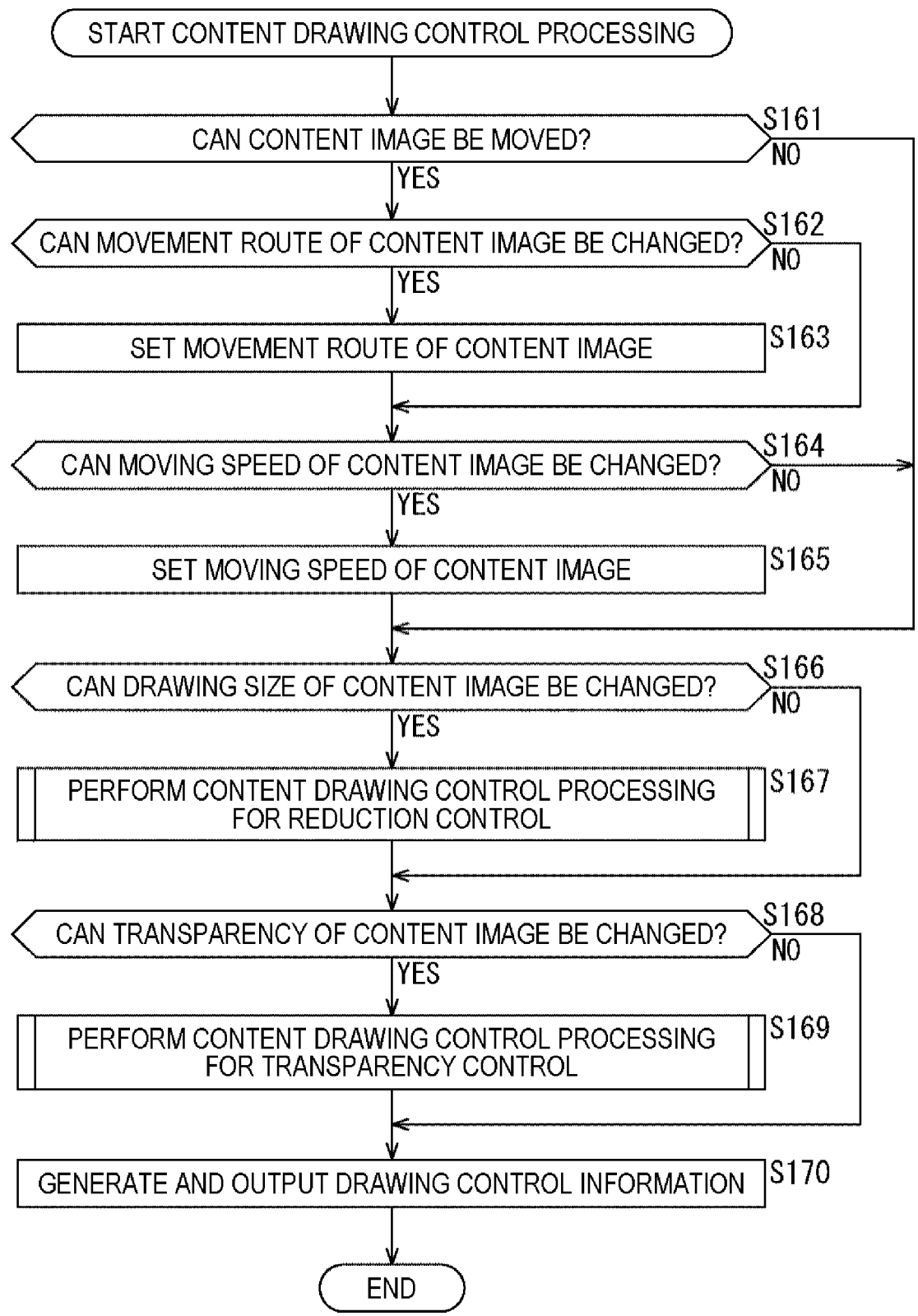
FIG. 12 is a flowchart illustrating an example of a flow of content drawing control processing.

Next, an example of a flow of content drawing control processing executed in the case of "combination" will be described with reference to a flowchart in FIG. 12.

When the content drawing control processing is started, in step S161, the content drawing control unit 111 of the drawing control unit 101 of the drawing control device 100 determines whether or not a content image can be moved. If it is determined that the content image can be moved, the processing proceeds to step S162.

In step S162, the content drawing control unit 111 determines whether or not a movement route of the content image can be changed. If it is determined that the movement route of the content image can be changed, the processing proceeds to step S163.

In step S163, the content drawing control unit 111 sets the movement route of the content image in accordance with the positions of the feature points. When the processing of step S163 ends, the processing proceeds to step S164. Furthermore, if it is determined in step S162 that the movement route of the content image cannot be changed, the processing proceeds to step S164.

In step S164, the content drawing control unit 111 determines whether or not a moving speed of the content image can be changed. If it is determined that the moving speed of the content image can be changed, the processing proceeds to step S165.

In step S165, the content drawing control unit 111 sets the moving speed of the content image in accordance with the number of feature points that overlap with the content image. When the processing of step S165 ends, the processing proceeds to step S166. Furthermore, if it is determined in step S164 that the moving speed of the content image cannot be changed, the processing proceeds to step S166. Moreover, if it is determined in step S161 that the content image cannot be moved, the processing proceeds to step S166.

In step S166, the content drawing control unit 111 determines whether or not the drawing size of the content image can be changed. If it is determined that the drawing size of the content image can be changed, the processing proceeds to step S167.

Figure 5:
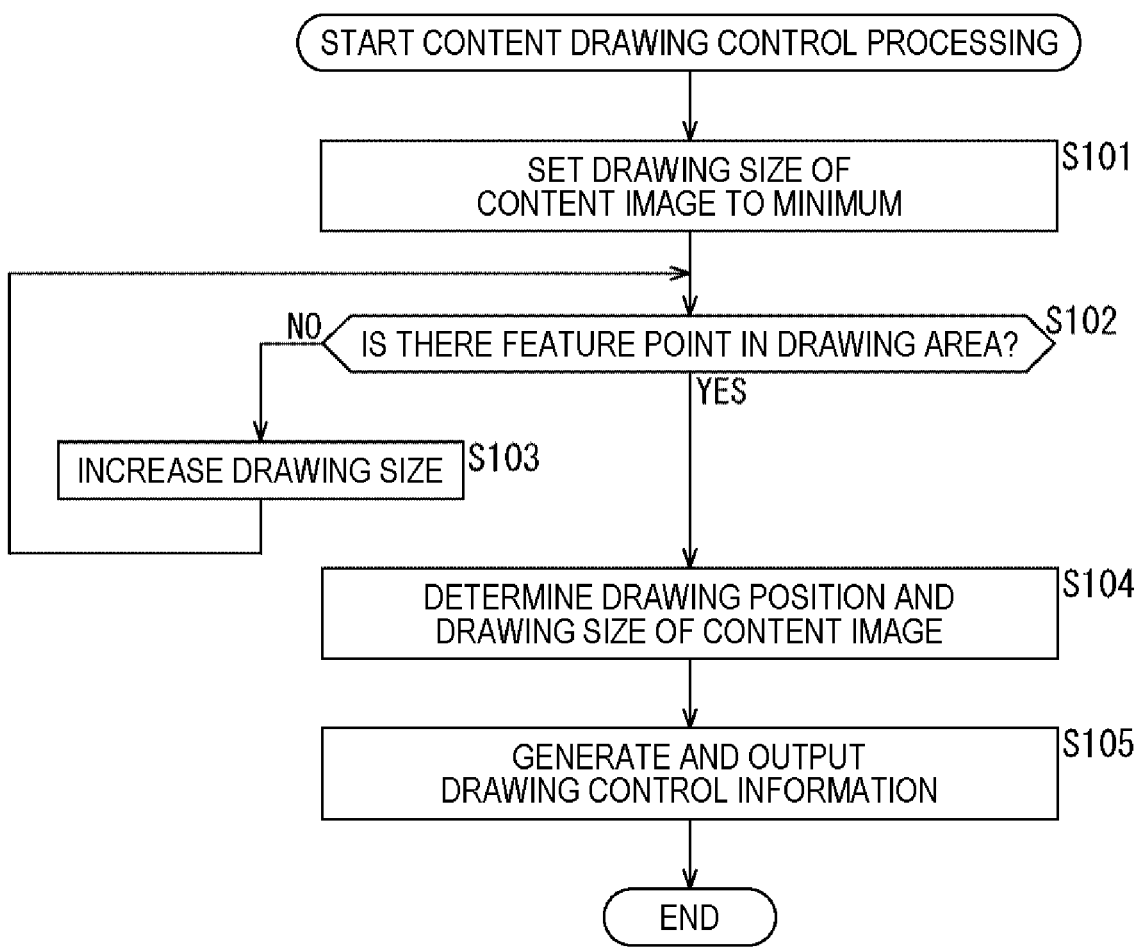
FIG. 5 is a flowchart illustrating an example of a flow of content drawing control processing.

In step S167, the content drawing control unit 111 performs content drawing control processing for "reduction" control (FIG. 5). When the content drawing control processing ends, the processing proceeds to step S168. Furthermore, if it is determined in step S166 that the drawing size of the content image cannot be changed, the processing proceeds to step S168.

In step S168, the content drawing control unit 111 determines whether or not the transparency of the content image can be changed. If it is determined that the transparency of the content image can be changed, the processing proceeds to step S169.

Figure 7:
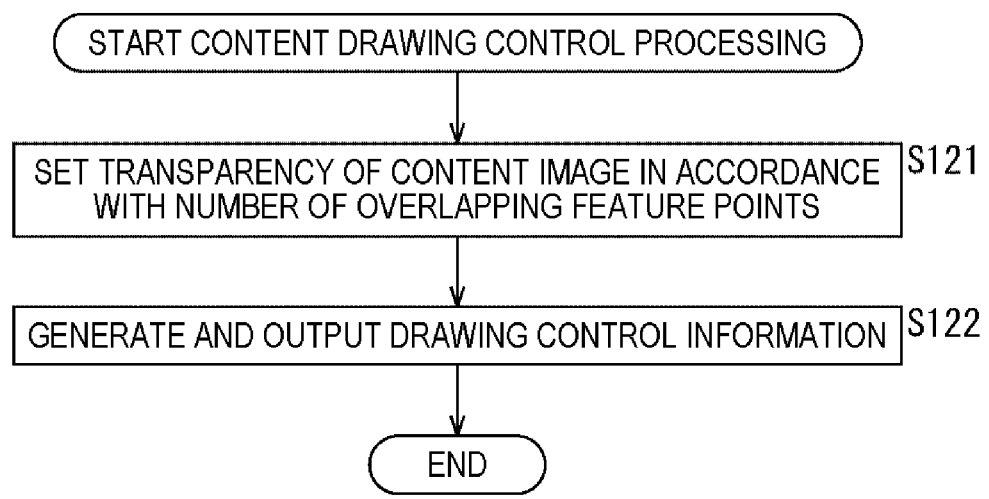
FIG. 7 is a flowchart illustrating an example of a flow of content drawing control processing.

In step S169, the content drawing control unit 111 performs content drawing control processing for "transparency" control (FIG. 7). When the content drawing control processing ends, the processing proceeds to step S170. Furthermore, if it is determined in step S168 that the transparency of the content image cannot be changed, the processing proceeds to step S170.

In step S170, the content drawing control unit 111 generates and outputs drawing control information for drawing the content image in accordance with these controls.

When the processing of step S170 ends, the content drawing control processing ends.

By performing each piece of processing in this manner, the drawing control device 100 can further prevent a decrease in marker recognition rate.

<Time Division>

Next, "time division", which is a control method for intermittently displaying a content image, will be described. In the case of "time division", the content image and a marker are alternately displayed. That is, the content drawing control unit 111 controls the content image to be intermittently displayed. The intermittent display is a display method for alternately repeating displaying and hiding (method for on-and-off display). Moreover, while the content image is hidden in the intermittent display, the content drawing control unit 111 performs control to display the marker in a state of not overlapping with the content image. With this control, the marker in a state of not overlapping with the content image is intermittently displayed. That is, since there is a period during which the feature points of the marker can be detected without being affected by the content image, the drawing control device 100 can further prevent a decrease in marker recognition rate.

When the content image is displayed in such intermittent display, the content drawing control unit 111 may perform control to display only the content image. That is, in this case, both the content image and the marker are intermittently displayed. For example, as illustrated in FIG. 13, control is performed so that either the content image 141 or the marker 121 is displayed. In the case of the example in FIG. 13, the display on the display surface 140 changes from the left to the center to the right. That is, on the display surface 140, the content image 141 and the marker 121 are alternately displayed in a state of not overlapping with each other.

Furthermore, when the content image is displayed, the content drawing control unit 111 may perform control to display the content image and the marker overlapping with each other. That is, in this case, the marker is always displayed, and the content image 141 is intermittently displayed. The content image 141 is therefore displayed on top of the marker 121 so as to overlap with the marker 121 as in the center of FIG. 14.

Furthermore, at that time, the content drawing control unit 111 may control a display time of the content image in accordance with a situation around the display surface 140 such as a line-of-sight of a user, an operation by the user, or a recognition situation of the marker 121.

Figure 15B:
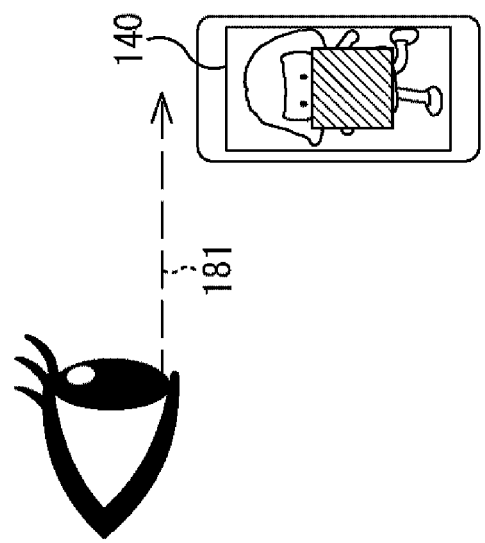
FIGS. 15A and 15B are diagrams illustrating an example of content image display time control.
Figure 15A:
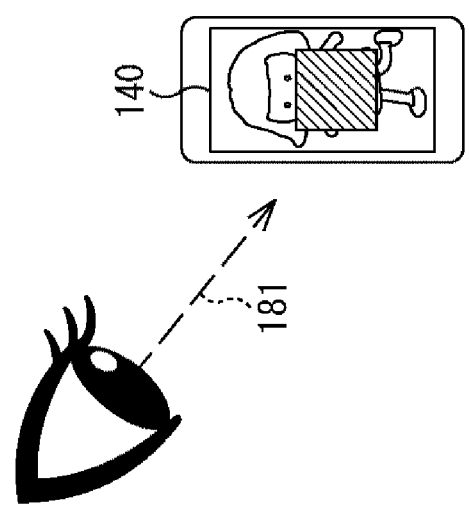

For example, as in FIGS. 15A and 15B, a line-of-sight direction (arrow 181) of a user is detected. In a case where the user is looking at the display surface 140 as in FIG. 15A, priority is given to drawing of the content image 141, and the content drawing control unit 111 performs control to lengthen the drawing time (display time) of the content image 141. Furthermore, in a case where the user's line-of-sight is directed away from the display surface 140 as in FIG. 15B, priority is given to improvement of the recognition rate of the marker 121, and the content drawing control unit 111 performs control to shorten the drawing time (display time) of the content image 141. With such control, the content drawing control unit 111 can prevent a decrease in marker recognition rate while preventing a decrease in visibility of the content image.

Figure 16B:
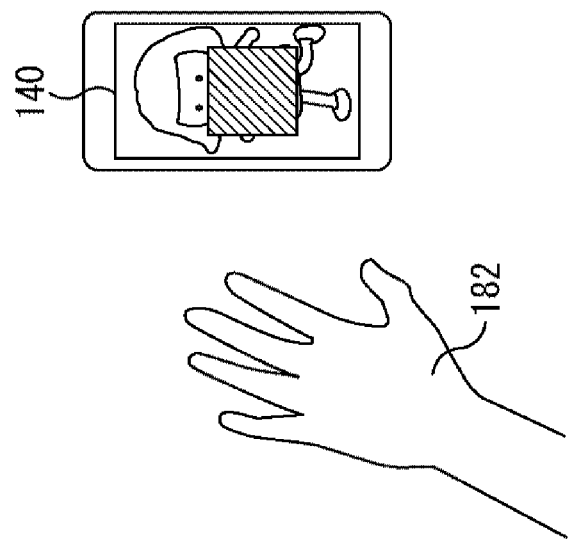
FIGS. 16A and 16B are diagrams illustrating an example of content image display time control.
Figure 16A:
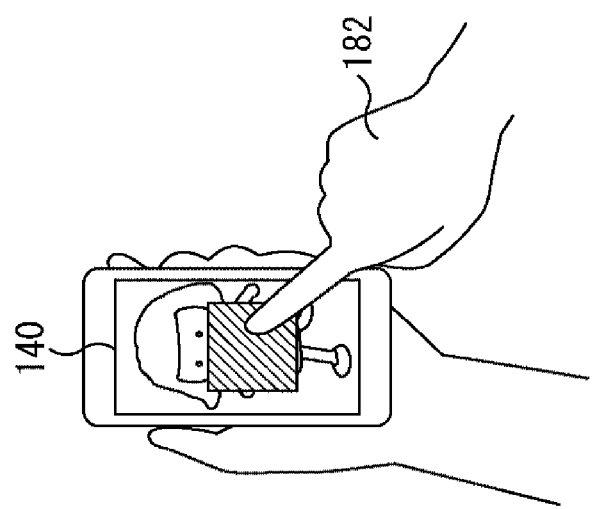

Furthermore, for example, in a case where a user's hand 182 is performing an operation on the display surface 140 as in FIG. 16A (e.g., in a case where the user's hand 182 is in contact with the display surface 140), it is considered that content is being operated. Thus, priority is given to operability of the content image, and the content drawing control unit 111 performs control to lengthen the drawing time (display time) of the content image 141. Furthermore, in a case where the user's hand 182 is not performing an operation on the display surface 140 as in FIG. 16B (e.g., in a case where the user's hand 182 is away from the display surface 140), priority is given to improvement of the recognition rate of the marker 121, and the content drawing control unit 111 performs control to shorten the drawing time (display time) of the content image 141. With such control, the content drawing control unit 111 can prevent a decrease in marker recognition rate while preventing a decrease in operability of the content image.

Figure 17B:
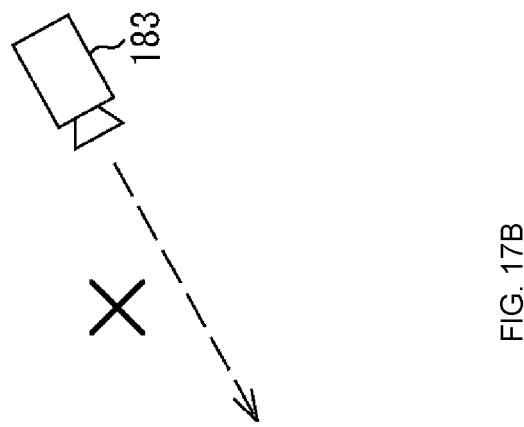
FIGS. 17A and 17B are diagrams illustrating an example of content image display time control.
Figure 17A:
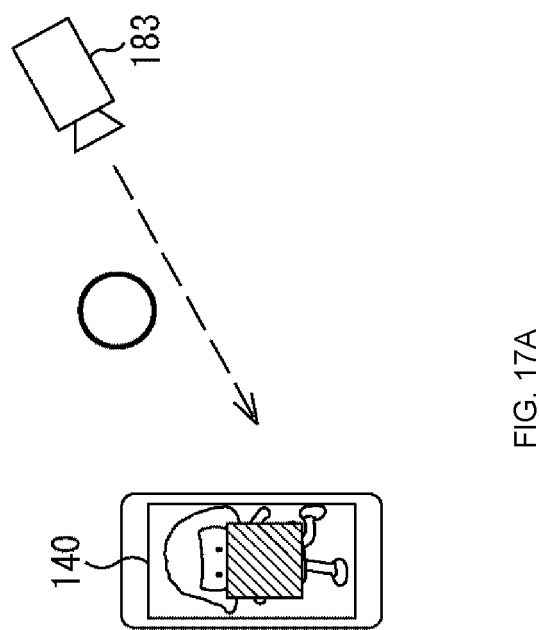

Moreover, for example, in a case where a recognition device 183 recognizes the marker 121 as in FIG. 17A, priority is given to display of the content image, and the content drawing control unit 111 performs control to lengthen the drawing time (display time) of the content image 141. Furthermore, in a case where the recognition device 183 has not recognized the marker 121 as in FIG. 17B, priority is given to recognition of the marker 121, and the content drawing control unit 111 performs control to shorten the drawing time (display time) of the content image 141. With such control, the content drawing control unit 111 can prevent a decrease in marker recognition rate while preventing a decrease in visibility of the content image.

<Flow of Content Drawing Control Processing (Time Division)>

Figure 18:
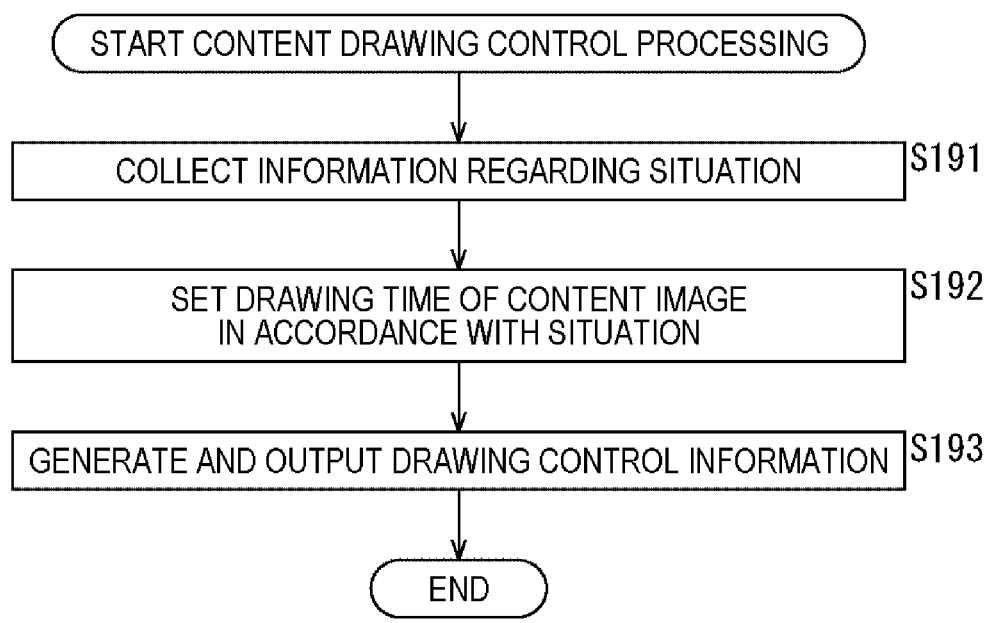
FIG. 18 is a flowchart illustrating an example of a flow of content drawing control processing.

Next, an example of a flow of content drawing control processing executed in the case of "time division" will be described with reference to a flowchart in FIG. 18.

When the content drawing control processing is started, in step S191, the content drawing control unit 111 of the drawing control unit 101 of the drawing control device 100 collects information regarding a situation around the display surface.

In step S192, the content drawing control unit 111 grasps the situation around the display surface on the basis of the information collected in step S191, and sets the drawing time (display time) of the content image in the intermittent display in accordance with the situation.

In step S193, the content drawing control unit 111 generates and outputs drawing control information for drawing the content image so that the content image is intermittently displayed with the drawing time set in step S192.

When the processing of step S193 ends, the content drawing control processing ends.

By performing each piece of processing in this manner, the drawing control device 100 can further prevent a decrease in marker recognition rate.

<2-4: Method of Drawing Marker>

Next, markers will be described. The markers include any marker as long as it is an identification image.

Figure 19B:
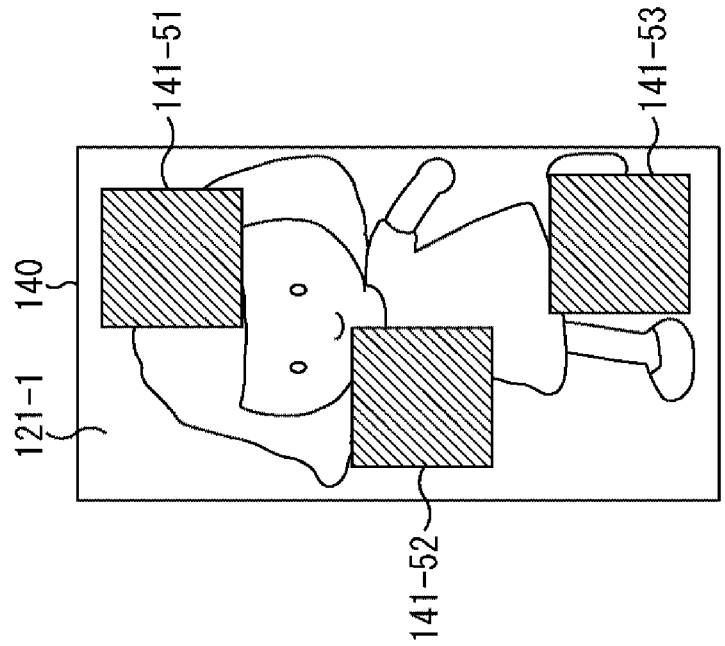
FIGS. 19A and 19B are diagrams illustrating an example of a full screen marker.
Figure 19A:
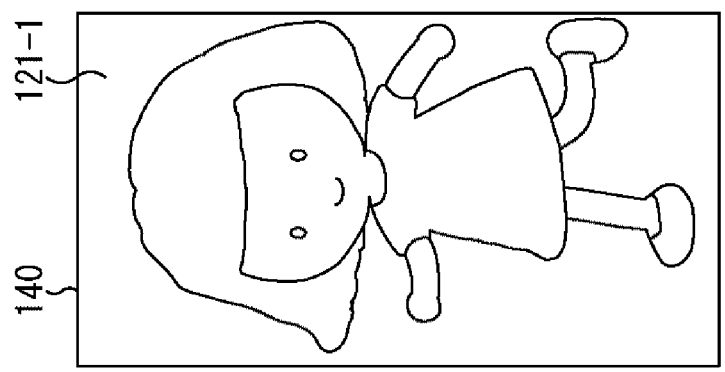

<Full screen marker> For example, it is possible to apply a full screen marker 121-1 drawn (displayed) on the entire display surface 140 as illustrated in FIG. 19A. In the case of the full screen marker 121-1, for example, as in FIG. 19B, the content images 141 are drawn so as to overlap on top of a part of the full screen marker 121-1 (a content image 141-51 to a content image 141-53). Note that, at this time, by performing control so as to draw the content images 141 where there are fewer feature points of the full screen marker 121-1, it is possible to prevent an increase in the number of feature points that become unrecognizable due to overlapping with the content images 141. It is therefore possible to prevent a decrease in marker recognition rate.

Figure 20B:
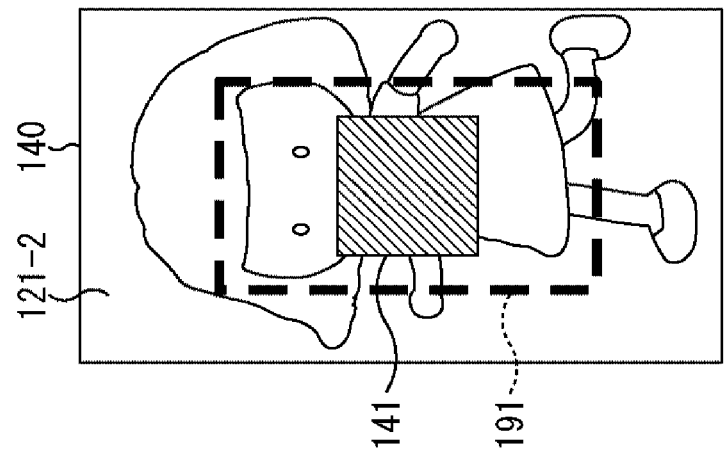
FIGS. 20A and 20B are diagrams illustrating an example of an outside marker.
Figure 20A:
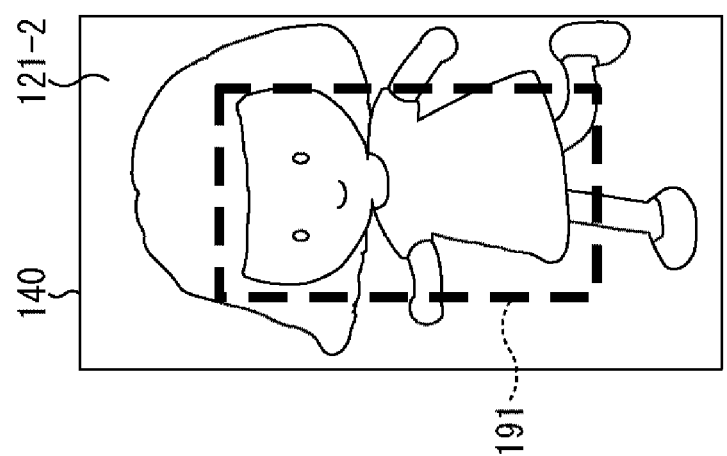

<Outside marker> Furthermore, it is possible to apply an outside marker 121-2 having feature points only outside a predetermined range at the center as illustrated in FIG. 20A, for example. The outside marker 121-2 has effective feature points used for marker recognition only outside the predetermined range, which is on the inner side indicated by a dotted line 191. That is, only the feature points outside the region surrounded by the dotted line 191 are registered as recognition targets in the recognition device. In other words, for the outside marker 121-2, a portion outside the region surrounded by the dotted line 191 is registered as a marker.

Then, the outside marker 121-2 is drawn on the entire display surface 140. That is, in this case, the recognition device detects the feature points outside the region surrounded by the dotted line 191 on the display surface 140, and recognizes the outside marker 121-2 on the basis of the feature points.

Note that the dotted line 191 is provided for the sake of explanation, and does not need to be actually drawn (as a matter of course, the design of the outside marker 121-2 may include a design indicating a boundary of the region like the dotted line 191). Furthermore, inside the region surrounded by the dotted line 191, feature points are not necessary. Thus, the region may not have any design. For example, nothing may be drawn, a solid color may be used, or another image may be drawn.

In the case of the outside marker 121-2, the content image 141 is drawn in the region surrounded by the dotted line 191 on the display surface 140 as in FIG. 20B, for example. With this control, (the feature points of) the outside marker 121-2 and the content image 141 can be drawn without overlapping with each other. It is therefore possible to prevent a decrease in marker recognition rate.

Figure 21B:
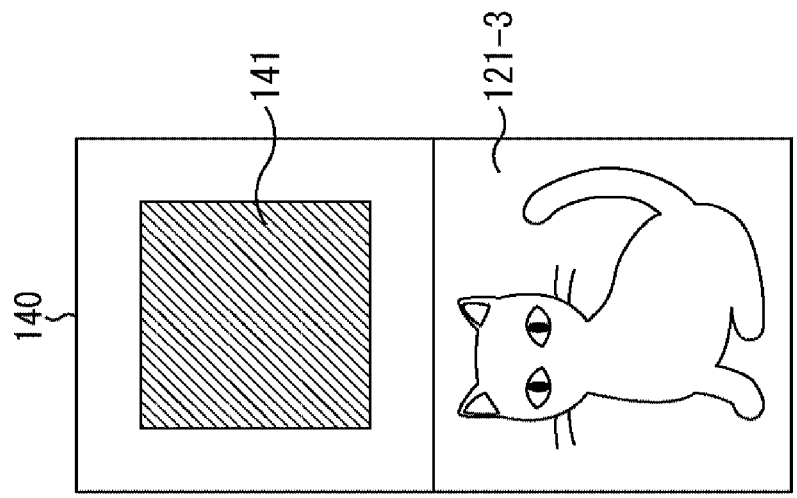
FIGS. 21A and 21B are diagrams illustrating an example of a half screen marker.
Figure 21A:
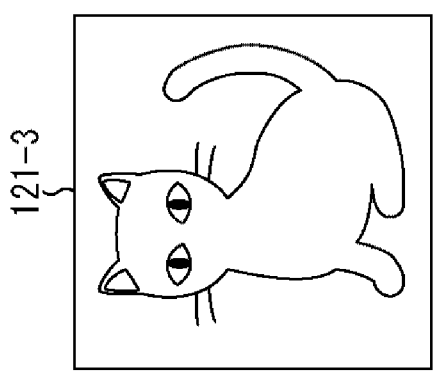

<Half screen marker> Furthermore, it is possible to apply a half screen marker 121-3 that is half the size of the display surface 140 as illustrated in FIG. 21A, for example. As illustrated in FIG. 21B, the half screen marker 121-3 is drawn in half the region of the display surface 140. Then, the content image 141 is drawn in the other half of the region of the display surface 140 (that is, a region where the half screen marker 121-3 is not drawn). With this control, the half screen marker 121-3 and the content image 141 can be drawn without overlapping with each other. It is therefore possible to prevent a decrease in marker recognition rate.

<Movable marker> Furthermore, it is possible to apply a movable marker 121-4 that is movable in the display surface 140 as illustrated in FIG. 22A, for example. The movable marker 121-4 has a drawing size smaller than the display surface 140, and can decrease a range overlapping with the content image 141 as compared with the case of the full screen marker 121-1. It is therefore possible to further prevent a decrease in marker recognition rate.

Moreover, the position where the movable marker 121-4 is drawn on the display surface 140 can be changed. For example, as illustrated in FIG. 22B, when the position where the content image 141 is drawn moves to the upper side of the display surface 140 as indicated by a dotted arrow 192, the position where the movable marker 121-4 is drawn moves to the lower side of the display surface 14 as indicated by an arrow 193. That is, the movable marker 121-4 is drawn at a position where the movable marker 121-4 and the content image 141 do not overlap with each other (or at a position where the range of overlapping becomes narrower).

With this control, it is possible to prevent an increase in the range in which the movable marker 121-4 and the content image 141 overlap with each other. It is therefore possible to prevent a decrease in marker recognition rate.

<Multiple marker> Furthermore, it is possible to apply a multiple marker 121-5 for drawing a plurality of markers in the display surface 140 as illustrated in FIG. 23A, for example. In the case of the example in FIG. 23A, a marker 121-5-1 and a marker 121-5-2 are displayed on the display surface 140. That is, in this case, the multiple marker 121-5 is constituted by two markers, the marker 121-5-1 and the marker 121-5-2. A content image 141-61 is drawn so as to overlap on top of the multiple marker 121-5 (that is, the marker 121-5-1 or the marker 121-5-2, or both).

The marker 121-5-1 and the marker 121-5-2 are identification images independent from each other. Each of the marker 121-5-1 and the marker 121-5-2 is associated with the same information (e.g., display device). That is, by recognizing either the marker 121-5-1 or the marker 121-5-2, the recognition device can recognize the information (e.g., display device) associated with the marker 121-5-1 and the marker 121-5-2.

Similarly, in a case of an example in FIG. 23B, the marker 121-5-1 to a marker 121-5-6 are displayed on the display surface 140. That is, in this case, the multiple marker 121-5 is constituted by six markers, the marker 121-5-1 to the marker 121-5-6. A content image 141-62 and a content image 141-63 are drawn so as to overlap on top of the multiple marker 121-5 (that is, at least one of the marker 121-5-1 to the marker 121-5-6).

The marker 121-5-1 to the marker 121-5-6 are identification images independent from each other. Each of the marker 121-5-1 to the marker 121-5-6 is associated with the same information (e.g., display device). That is, by recognizing at least one of the marker 121-5-1 to the marker 121-5-6, the recognition device can recognize the information (e.g., display device) associated with the marker 121-5-1 to the marker 121-5-6.

Each of the markers constituting the multiple marker 121-5 has an optional design. Each of the markers may have the same design, or a marker of a design different from others may be included. Alternatively, every marker may have a different design. For example, the multiple marker 121-5 may be constituted by markers, each having different luminance of outside light suitable for recognition. This allows for application for use under a wide variety of outside light environments. That is, it is possible to prevent a decrease in marker recognition rate under a wide variety of outside light environments.

Figure 24:
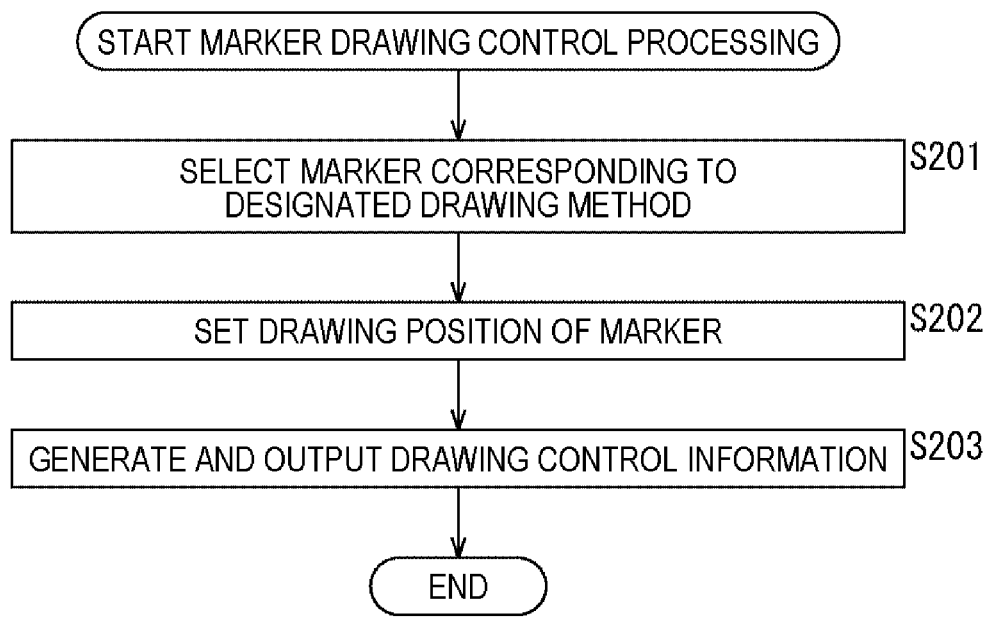
FIGS. 24 is a flowchart illustrating an example of a flow of marker drawing control processing.

<Flow of marker drawing control processing> The marker drawing control unit 112 of the drawing control unit 101 of the drawing control device 100 controls drawing of the markers described above. At that time, the marker drawing control unit 112 may control drawing of a designated marker corresponding to drawing control of at least two types of markers among these markers. An example of a flow of marker drawing control processing executed by the marker drawing control unit 112 in that case will be described with reference to a flowchart in FIG. 24.

When the marker drawing control processing is started, in step S201, the marker drawing control unit 112 acquires designation of a drawing method (display method), and selects a marker corresponding to the designated drawing method.

In step S202, the marker drawing control unit 112 sets a position where the marker selected in step S201 is to be drawn.

In step S203, the marker drawing control unit 112 generates and outputs drawing control information for drawing the marker selected in step S201 at the drawing position set in step S202.

When the processing of step S203 ends, the marker drawing control processing ends.

By performing each piece of processing in this manner, the drawing control device 100 can draw (display) a wide variety of markers. It is therefore possible to prevent a decrease in marker recognition rate in a wider variety of situations.

3. Second Embodiment

<3-1: Information Processing System>

Figure 25:
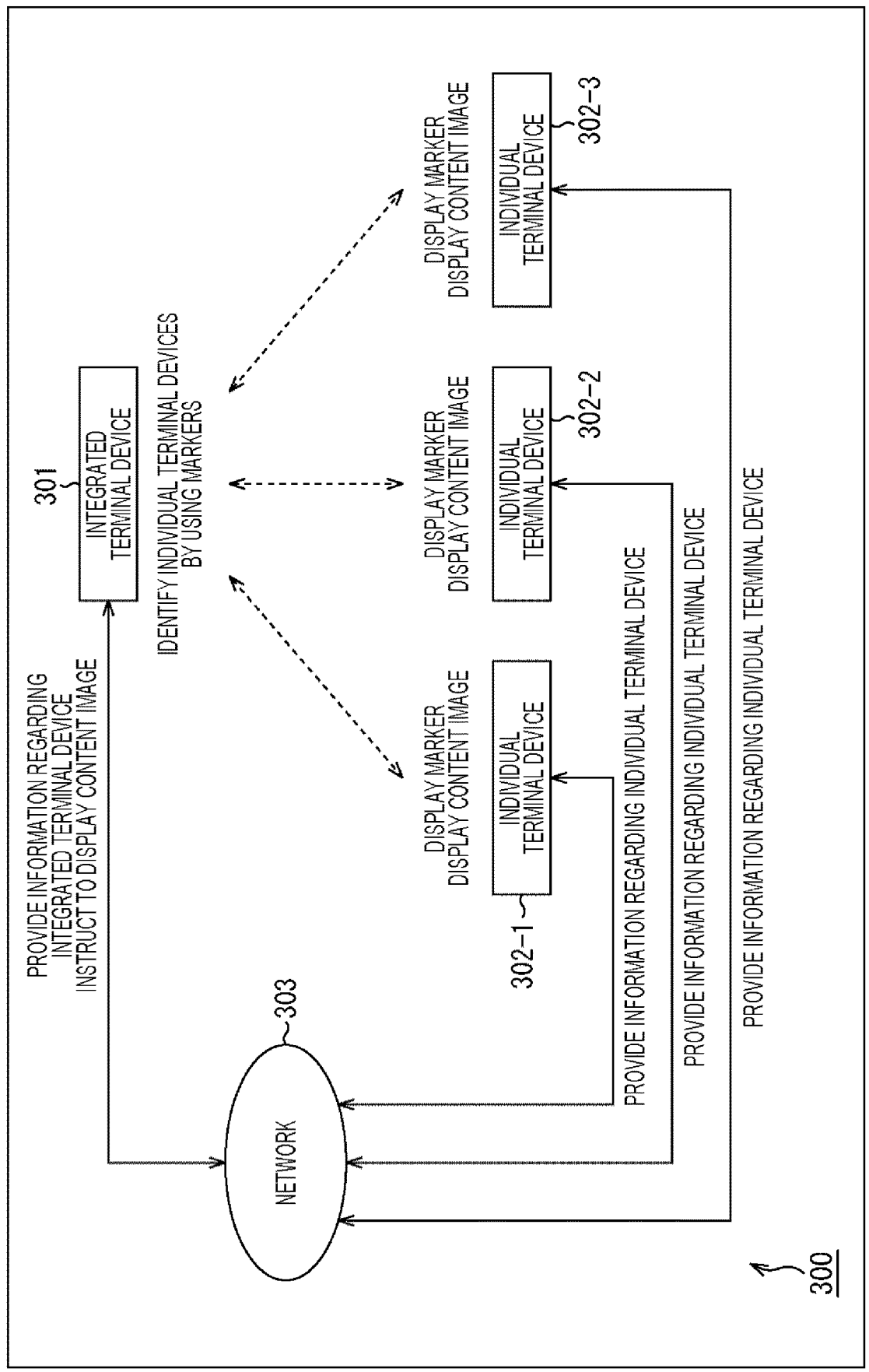
FIG. 25 is a diagram illustrating an example of a main configuration of an information processing system.

FIG. 25 is a block diagram illustrating an example of a configuration of an information processing system 300, which is a mode of an information processing system to which the present technology is applied. As illustrated in FIG. 25, the information processing system 300 includes an integrated terminal device 301 and an individual terminal device 302-1 to an individual terminal device 302-3. Hereinafter, the individual terminal device 302-1 to the individual terminal device 302-3 will be referred to as individual terminal devices 302 in a case where it is not necessary to distinguish the individual terminal devices from each other in the description.

The information processing system 300 is a system in which the integrated terminal device 301 provides a predetermined service (application) such as displaying a content image on the individual terminal devices 302. For example, the integrated terminal device 301 causes each of the individual terminal devices 302 to display a content image in accordance with the device, its position, movement, timing, situation, and the like. Furthermore, for example, the integrated terminal device 301 performs optional processing such as displaying a content image in response to a request from each of the individual terminal devices 302. In order to implement such a service (application), the integrated terminal device 301 identifies each of the individual terminal devices 302 by using markers. The present technology is applied to this identification of devices with the use of markers.

The integrated terminal device 301 is a mode of an information processing apparatus (e.g., above-described recognition device) to which the present technology is applied, and performs, for example, processing of recognizing (identifying) the individual terminal devices 302 by using markers and causing the individual terminal devices 302 to draw (display) content images. For example, the integrated terminal device 301 has a function of detecting markers drawn by the individual terminal devices 302, such as a camera. Furthermore, the integrated terminal device 301 has a function of recognizing (identifying) the individual terminal devices 302 by recognizing detected markers, such as a CPU, a RAM, or a ROM, a function of recognizing the positions and orientations of the individual terminal devices 302 (or the markers), a function of causing the recognized individual terminal devices 302 to draw content images, and the like. Moreover, the integrated terminal device 301 may have an image display function such as a monitor or a projector.

The individual terminal devices 302 are a mode of an information processing apparatus (e.g., above-described display device) to which the present technology is applied, and, for example, draw (display) markers to allow the integrated terminal device 301 to recognize (identify) the individual terminal devices 302, or draw (display) content images in accordance with an instruction from the integrated terminal device 301. For example, the individual terminal devices 302 have a function of drawing (displaying (including projecting)) a marker or a content image, such as a monitor or a projector. Furthermore, the individual terminal devices 302 have a function of controlling drawing thereof, such as a CPU, a RAM, or a ROM, a function of drawing a content image in accordance with an instruction from the integrated terminal device 301, or the like.

Furthermore, the integrated terminal device 301 and each of the individual terminal devices 302 are communicably connected to each other via a network 303. The network 303 is an optional network such as the Internet or a local area network. The network 303 is constituted by one or a plurality of networks configured in a wired manner or a wireless manner, or both. The integrated terminal device 301 and each of the individual terminal devices 302 are connected to the network 303 by, for example, wired communication or wireless communication, or both.

The integrated terminal device 301 has a function of communicating with each of the individual terminal devices 302 via the network 303, and, for example, provides information regarding the integrated terminal device 301 or gives an instruction to display a content image via the communication. The individual terminal devices 302 have a function of communicating with the integrated terminal device 301 via the network 303, and, for example, provide information regarding the individual terminal devices 302 or give an instruction to display a content image via the communication. Note that the individual terminal devices 302 may be communicably connected to each other.

Note that the configuration illustrated in FIG. 25 is an example, and the configuration of the information processing system 300 is not limited to this example. For example, the number of the integrated terminal devices 301 is optional, and the information processing system 300 may include a plurality of the integrated terminal devices 301. Furthermore, the number of the individual terminal devices 302 is also optional, and may be two or less, or may be four or more. Moreover, there may be a plurality of the networks 303.

<3-2: Integrated Terminal Device>

Appearance Example 1

Figure 26:
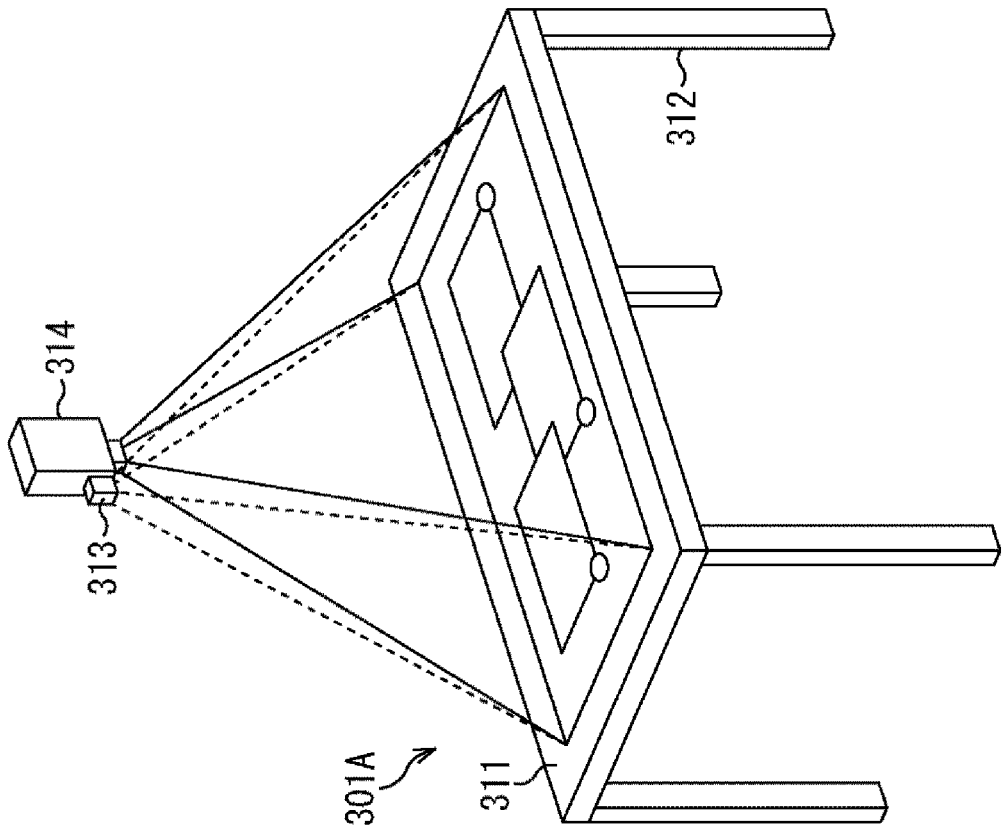
FIG. 26 is a diagram illustrating an example of an appearance of an integrated terminal device.

FIG. 26 is a diagram illustrating an example of an appearance of the integrated terminal device 301. In the case of the example in FIG. 26, the integrated terminal device 301 (referred to as an integrated terminal device 301A) is a projection type device, and includes a table 312 having a top surface 311, an input unit 313, and an output unit 314.

The output unit 314 displays various types of information on the top surface 311 of the table 312. The output unit 314 may include a projection unit (projector). For example, as illustrated in FIG. 26, the output unit 314 may be disposed above the table 312 at a position a predetermined distance away from the table 312 in a state of being suspended from a ceiling. In this case, the output unit 314 can project information on the top surface 311 of the table 312. For example, the output unit 314 may be a pendant light or a desk stand light. In this manner, in the projection type integrated terminal device 301A, the output unit 314 displays information on the top surface 311 of the table 312 from above. Furthermore, hereinafter, the top surface 311 of the table 312 is also referred to as a screen 311. The screen 311 includes a surface (display surface) to be a target of projection by the output unit 314.

For example, the output unit 314 displays a virtual display object. The display object is, for example, a window or a user interface (UI) object. The UI object is a predetermined image (a still image or a moving image) that accepts various operations (selection, input, and the like) by a user. For example, the UI object is an image including a graphical user interface (GUI) component (e.g., a button, a slider, a check box, a text box, or a software keyboard). Furthermore, the UI object may be disposed in a window.

Moreover, the output unit 314 may include a sound output device such as a speaker. For example, the output unit 314 uses the sound output device to output a sound.

The input unit 313 includes, for example, a camera that images the top surface 311 of the table 312 with one lens. Alternatively, the input unit 313 may include a stereo camera capable of recording depth direction information by imaging the table 312 with two lenses. The stereo camera used may be, for example, a visible light camera or an invisible light camera capable of detecting invisible light such as infrared rays. Furthermore, the input unit 313 may further include a sound input device such as a microphone that collects a voice emitted by a user or an ambient environmental sound.

In a case where such a camera is used as the input unit 313, the integrated terminal device 301A can analyze an image (captured image) captured by the camera to detect the position of an object (e.g., the individual terminal device 302, a user's hand, or an images (e.g., a marker or a content image) drawn by the individual terminal device 302) located on the screen 311. Furthermore, in a case where a stereo camera is used as the input unit 313, the integrated terminal device 301A can analyze an image captured by the stereo camera to acquire depth information of an object located on the screen 311 in addition to position information of the object. On the basis of the depth information, the integrated terminal device 301A can detect, for example, objects being in contact or proximity with each other, or an object and the screen 311 being in contact or proximity with each other.

Note that the input unit 313 may include a depth sensor (e.g., a time-of-flight sensor or a structured light sensor) instead of the stereo camera. In this case, the depth sensor can acquire depth information of an object located on the screen 311.

The integrated terminal device 301A detects the position of an operation body (e.g., a user's hand or various operation members such as a stylus) on the screen 311 on the basis of an image captured by the input unit 313, and then accepts inputs of various types of information on the basis of the detected position of the operation body. That is, a user can perform various operation inputs by moving the operation body on the screen 311. For example, when a touch of a user's hand on a window or a UI object is detected, an operation input to the window or the UI object is performed.

Furthermore, the camera included in the input unit 313 may image not only the top surface 311 of the table 312 but also a user who is around the table 312. In this case, the integrated terminal device 301A can detect the position of the user around the table 312 on the basis of the image captured by the input unit 313. Furthermore, the integrated terminal device 301A may perform personal recognition of the user by extracting physical characteristics (size of face, body, and the like) that can specify each individual user on the basis of the captured image.

Furthermore, another method may be used for a user's operation input. For example, the input unit 313 may be installed as a touch panel on the top surface 311 (screen 311) of the table 312, and a user's operation input may be detected on the basis of a user's finger or the like coming into contact of with the touch panel. Furthermore, a user's operation input may be detected on the basis of a gesture toward the camera included in the input unit 313.

Appearance Example 2

Figure 27:
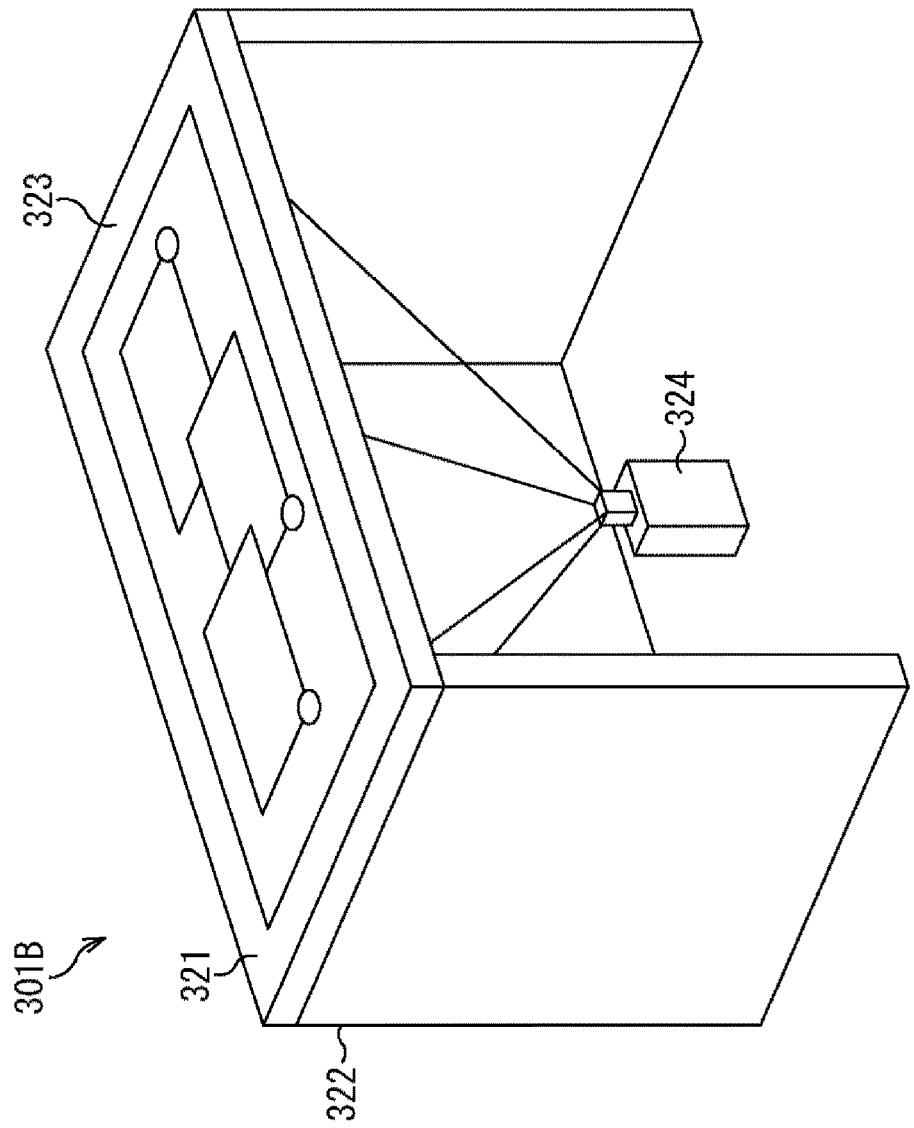
FIG. 27 is a diagram illustrating an example of the appearance of the integrated terminal device.

FIG. 27 is a diagram illustrating another example of the appearance of the integrated terminal device 301. In the case of the example in FIG. 27, the integrated terminal device 301 (referred to as an integrated terminal device 301B) is a rear-projection type device, and includes a table 322 having a top plate 321, an input unit 323, and an output unit 324.

The output unit 324 is disposed below the table 322. The output unit 324 is, for example, a projector, and projects information from below toward the top plate 321 of the table 322. For example, the top plate 321 of the table 322 is formed by using a transparent material such as a glass plate or a transparent plastic plate. Then, the information projected by the output unit 324 is displayed on the top surface (also referred to as a screen 321) of the table 322 (through the top plate 321). The rear-projection type integrated terminal device 301B displays information on the screen 321 by causing the output unit 324 to project the information from below the table 322 in this manner.

Furthermore, the input unit 323 is provided on the screen 321 (display surface). The input unit 323 is constituted by, for example, a touch panel. In this case, the touch panel detects an operation body coming into contact with the screen 321, and thus an operation input by a user is performed. However, such an example is not restrictive, and the input unit 323 may be installed below the table 322 away from the table 322, similarly to the example illustrated in FIG. 26 (the integrated terminal device 301A). In this case, the input unit 323 includes a camera, and the camera can image an operation body located on the screen 321 through the top plate 321 of the table 322. Then, the position of the operation body may be detected on the basis of the captured image.

Appearance Example 3

Figure 28:
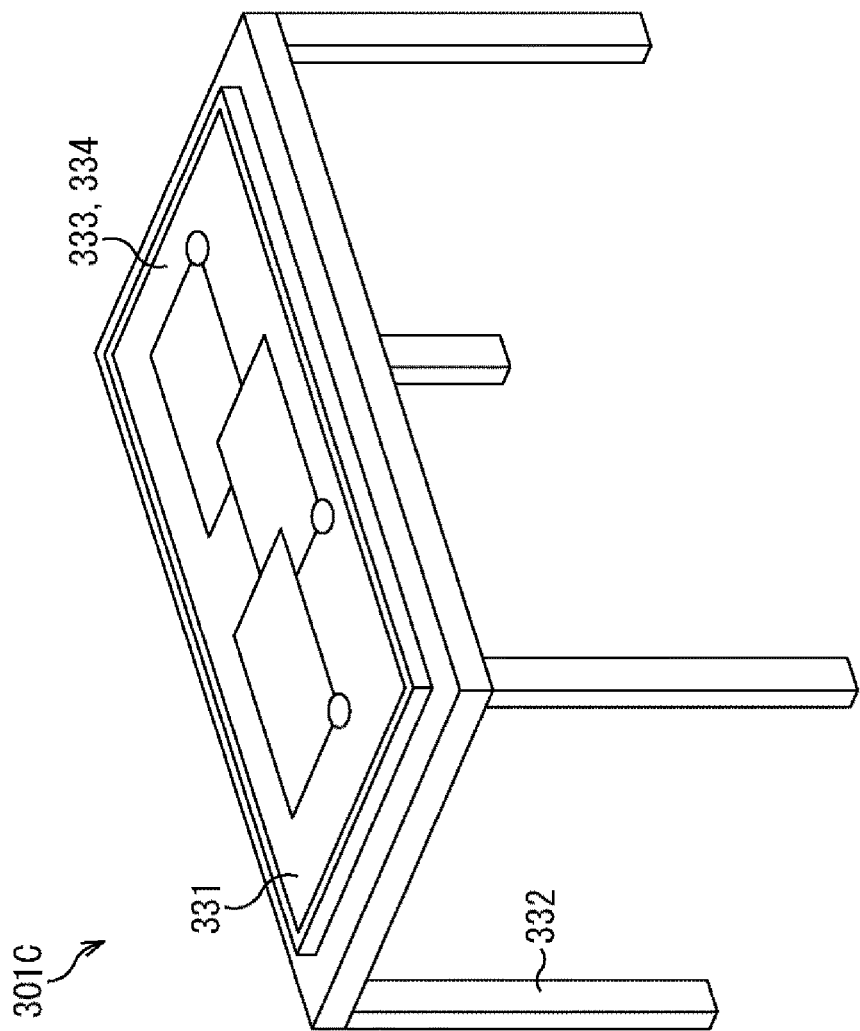
FIG. 28 is a diagram illustrating an example of the appearance of the integrated terminal device.

FIG. 28 is a diagram illustrating an example of the appearance of the integrated terminal device 301. In the case of the example in FIG. 28, the integrated terminal device 301 (referred to as an integrated terminal device 301C) includes a table 332 having a touch panel display 331 on the top surface.

The touch panel display 331 is installed on the top surface of the table 332 with its display surface facing upward. Furthermore, the touch panel display 331 includes a display and a touch panel mounted on the display. The touch panel display 331 displays various types of information on a display screen of the display, and the touch panel detects an operation body being in contact or proximity with the display screen of the display. Thus, an operation input by a user is accepted. That is, the touch panel display 331 is a device in which the touch panel, which is an input unit 333, and the display, which is an output unit 334, are integrally configured.

Note that, also in the case of the integrated terminal device 301C, similarly to the case of the integrated terminal device 301A illustrated in FIG. 26, a camera (an example of the input unit 333) may be installed above the output unit 334. In this case, the position and the like of each individual user located around the table 332 may be detected on the basis of an image captured by the camera.

Appearance Example 4

Figure 29:
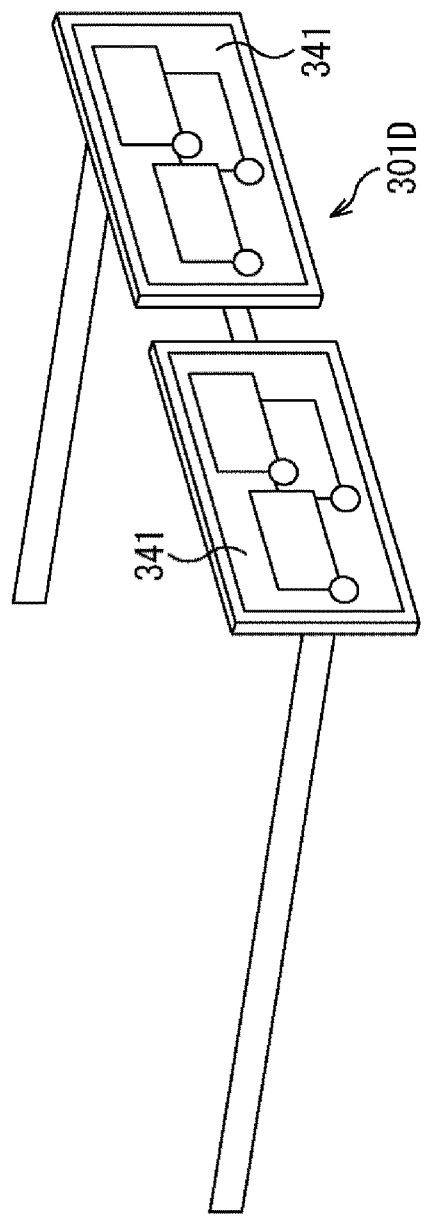
FIG. 29 is a diagram illustrating an example of the appearance of the integrated terminal device.

FIG. 29 is a diagram illustrating an example of the appearance of the integrated terminal device 301. In the case of the example in FIG. 29, the integrated terminal device 301 (referred to as an integrated terminal device 301D) may be configured as a head-worn device (e.g., a glasses-type device) such as a head mounted display (HMD). The head-worn device may include an input unit (not illustrated) and an output unit (not illustrated). The output unit may be configured as a transmission display unit. In this case, the output unit can project a video by using, as a display surface (screen 341), at least a partial region of each of a right-eye lens and a left-eye lens (or a goggle-type lens) included in the head-worn device.

Alternatively, the output unit may be configured as a non-transmission display unit. For example, the output unit may include a liquid crystal display (LCD), an organic light emitting diode (OLED), or the like. In this case, a camera included in the input unit may capture a video of what lies in front of a user wearing the head-worn device, and the output unit may sequentially display the captured video. With this arrangement, the user can see a scene in front of the user via the video displayed on the output unit.

Note that an operation body related to a user may be a hand of the user, or may be an operation device (e.g., a stylus, a mouse, a keyboard, or a touch panel) being used by the user. Furthermore, in the present specification and the drawings, the description "hand" is mainly used as an expression meaning a hand itself, but is not limited to such an example, and may be used as an expression meaning a finger, an arm, or two or more of these parts (e.g., upper limb).

Note that the appearance of the integrated terminal device 301 is optional, and is not limited to the above-described examples.

Configuration Example

Figure 30:
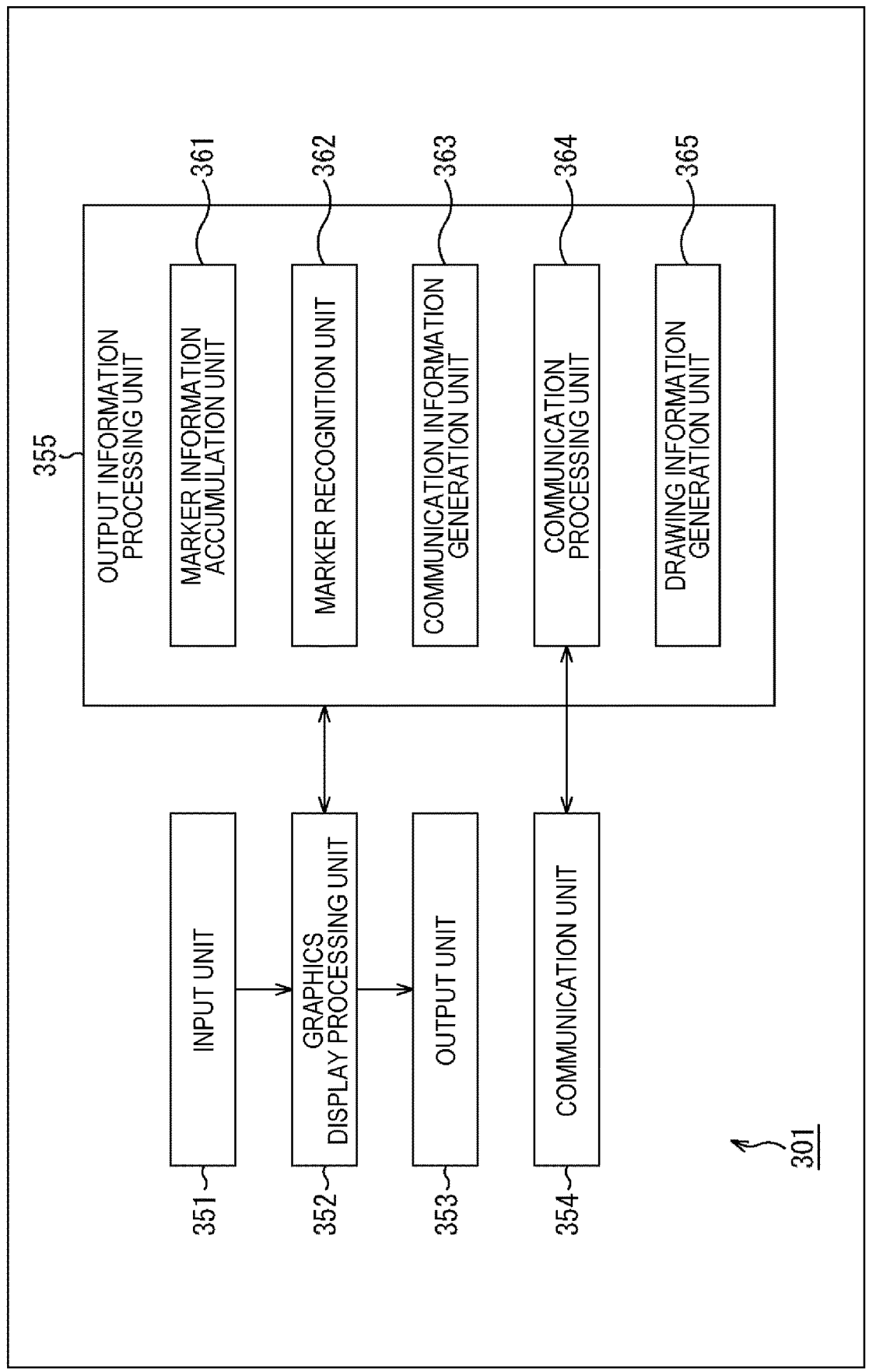
FIG. 30 is a block diagram illustrating an example of a main configuration of the integrated terminal device.

FIG. 30 is a block diagram illustrating an example of a main configuration of the integrated terminal device 301. As illustrated in FIG. 30, the integrated terminal device 301 includes an input unit 351, a graphics display processing unit 352, an output unit 353, a communication unit 354, and an output information processing unit 355.

The input unit 351 has an optional input device (detection device), and accepts an input of optional information via the input device. The input device may be, for example, an image sensor capable of acquiring a two-dimensional video, such as a visible light camera or an infrared camera. Furthermore, the input device may be, for example, a depth sensor capable of acquiring three-dimensional information to which a depth is added, such as a stereo camera, a time-of-flight sensor, or a structured light sensor. Moreover, the input device may be a touch sensor capable of acquiring a movement of a finger. Specifications of the touch sensor are optional. For example, the touch sensor may detect a movement of a finger with a depth sensor and a camera that captures an image from above or below, or may be a touch panel mounted on a display surface or the like. Furthermore, the input device may include a device that accepts a sound input such as a microphone, a device that is physically operated by a user such as a keyboard or a mouse, an external input terminal that acquires information supplied from another device, and a drive that reads information from a storage medium.

Furthermore, the number of input devices included in the input unit 351 is optional. For example, the input unit 351 may include a plurality of input devices, each input device detecting different information. The input unit 351 supplies the accepted information to the graphics display processing unit 352.

The graphics display processing unit 352 performs processing related to graphics display for a user. For example, the graphics display processing unit 352 performs processing of a control layer of a general operating system (OS) such as drawing control of multiple content such as a window for displaying an application, and distribution of events such as touching for each piece of content.

For example, the graphics display processing unit 352 acquires information supplied from the input unit 351. Furthermore, for example, the graphics display processing unit 352 acquires drawing information supplied by a drawing information generation unit 365 to be described later. The graphics display processing unit 352 generates an image (display image) to be output by the output unit 353 on the basis of these pieces of information. The graphics display processing unit 352 supplies the generated display image to the output unit 353.

Furthermore, the graphics display processing unit 352 can supply optional information such as information supplied from the input unit 351 to the output information processing unit 355 (a marker recognition unit 362, a communication information generation unit 363, the drawing information generation unit 365, and the like).

The output unit 353 has an optional output device, and presents visual information to a user via the output device. For example, the output unit 353 acquires the display image supplied from the graphics display processing unit 352, and causes the output device to display the display image. The output device may be, for example, a display such as a liquid crystal display (LCD) or an organic electro luminescence display (GELD) that displays an image, a projector or the like that projects an image, or may not be those devices. Furthermore, the number of output devices included in the output unit 353 is optional, and may be one, or may be two or more. For example, the output unit 353 may include a plurality of types of output devices such as an LCD and a projector. Furthermore, for example, the input device and the output device may be united as in a display with a touch panel.

The communication unit 354 has a communication interface, and communicates with another device (e.g., the individual terminal devices 302) via the communication interface. The communication method (standard) is optional, and may be wireless communication, wired communication, or both. For example, the communication unit 354 transmits information supplied from a communication processing unit 364 to be described later to the individual terminal devices 302 via the network 303. Furthermore, the communication unit 354 receives information transmitted from the individual terminal devices 302 via the network 303, and supplies the information to the communication processing unit 364.

The output information processing unit 355 performs processing related to output information in cooperation with processing units such as the graphics display processing unit 352 and the communication unit 354. For example, the output information processing unit 355 acquires, from the graphics display processing unit 352, input information input in the input unit 351, and generates information (communication information) to be supplied to the individual terminal devices 302, information (drawing information) to be output by the output unit 353, and the like on the basis of the input information. The output information processing unit 355 supplies the generated communication information to the communication unit 354. Furthermore, the output information processing unit 355 supplies the generated drawing information to the graphics display processing unit 352.

The output information processing unit 355 includes a marker information accumulation unit 361, the marker recognition unit 362, the communication information generation unit 363, the communication processing unit 364, and the drawing information generation unit 365.

The marker information accumulation unit 361 accumulates marker information, which is information regarding each marker. For example, the marker information is marker-specific information, and includes information for identifying a marker such as a feature point, and information regarding a target associated with the marker (a target to be identified with the use of the marker). That is, by referring to the marker information, it is possible to recognize the marker on the basis of the feature point. Furthermore, by referring to the marker information, it is possible to specify and recognize (identify) the target (e.g., individual terminal device 302) associated with the recognized marker. That is, the marker information is stored in the marker information accumulation unit 361, and thus the marker is registered in the integrated terminal device 301.

The marker recognition unit 362 performs processing related to marker recognition. For example, the marker recognition unit 362 acquires, from the graphics display processing unit 352, a captured image obtained by imaging a marker displayed on the display surface as input information, detects a feature point of the marker included in the captured image, and searches for and recognizes a marker corresponding to the detected feature point with reference to marker information (marker information registered in advance) accumulated in the marker information accumulation unit 361. Furthermore, the marker recognition unit 362 recognizes the individual terminal device 302 associated with the recognized marker on the basis of the marker information. Then, the marker recognition unit 362 supplies information regarding the individual terminal device 302 to the communication information generation unit 363 as a marker recognition result.

The communication information generation unit 363 performs processing related to generation of communication information to be supplied to the individual terminal devices 302. The content of the communication information is optional. For example, the communication information may include a content image to be drawn by the individual terminal devices 302, and control information regarding drawing of the content image.

For example, the communication information generation unit 363 acquires information regarding the individual terminal devices 302 supplied from the marker recognition unit 362, specifies the individual terminal device 302 corresponding to a marker recognized by the marker recognition unit 362 on the basis of the information, and generates communication information to be supplied to the individual terminal device 302.

Furthermore, the communication information generation unit 363 can detect the position, orientation, movement, and the like of the marker (or the individual terminal device 302 corresponding to the marker) recognized by the marker recognition unit 362 on the basis of a captured image or the like supplied from the graphics display processing unit 352. Moreover, the communication information generation unit 363 can obtain various types of information such as hardware performance of the individual terminal device 302, a surrounding environment (e.g., brightness), a situation in an application, a user's instruction, and the like on the basis of other information and the like supplied from the graphics display processing unit 352, the marker recognition unit 362, the communication processing unit 364, and the like. The communication information generation unit 363 generates communication information on the basis of these pieces of information. For example, the communication information generation unit 363 can generate a content image to be drawn by the individual terminal device 302, communication information for controlling a method of drawing the content image, and the like on the basis of the position, orientation, movement, or the like of the marker (individual terminal device 302), the hardware performance of the individual terminal device 302, the surrounding environment, a situation in the application, a user's instruction, and the like.

The communication information generation unit 363 supplies the generated communication information to the communication processing unit 364.

The communication processing unit 364 performs processing related to communication via the communication unit 354. For example, the communication processing unit 364 acquires the communication information supplied from the communication information generation unit 363, supplies the communication information to the communication unit 354, and causes the communication information to be transmitted to the individual terminal device 302.

Furthermore, for example, the communication processing unit 364 can supply information regarding the integrated terminal device 301 (e.g., information regarding hardware performance of the integrated terminal device 301) to the communication unit 354 and provide the information to the individual terminal device 302.

Furthermore, the communication processing unit 364 can also acquire information received by the communication unit 354 and perform processing on the basis of the information. For example, the communication processing unit 364 can acquire information regarding the individual terminal device 302 transmitted from the individual terminal device 302 (e.g., information regarding the hardware performance of the individual terminal device 302) via the communication unit 354, and supply the information to the communication information generation unit 363.

The drawing information generation unit 365 performs processing related to generation of drawing information, which is information regarding an image to be output by the output unit 353. The content of the drawing information is optional. For example, the drawing information generation unit 365 acquires various types of information acquired by the communication information generation unit 363 (e.g., the position, orientation, movement, or the like of the marker (individual terminal device 302), the hardware performance of the individual terminal device 302, the surrounding environment, a situation in the application, a user's instruction, and the like), and generates a display image related to a content image to be drawn by the output unit 353 on the basis of these pieces of information. The drawing information generation unit 365 supplies it to the graphics display processing unit 352 as drawing information.

Note that these processing units have optional configurations. For example, each processing unit may be constituted by a logic circuit that implements the above-described processing. Furthermore, each processing unit may include, for example, a CPU, a ROM, and a RAM and use them to execute a program, thereby implementing the above-described processing. As a matter of course, each processing unit may have both configurations, in which a part of the above-described processing is implemented by a logic circuit, and the rest is implemented by execution of a program. The processing units may have configurations that are independent from each other. For example, some processing units may implement a part of the above-described processing by a logic circuit, some other processing units may implement the above-described processing by executing a program, and other processing units may implement the above-described processing by both a logic circuit and execution of a program.

<3-3: Individual Terminal Device>

Configuration Example

The individual terminal device 302 is constituted by an optional display device that draws (displays) an image. The individual terminal device 302 may be a device including a display serving as a display surface, such as a so-called smartphone, a tablet terminal device, or an electronic paper, or may be a device that projects an image on the display surface, such as a so-called projector.

Figure 31:
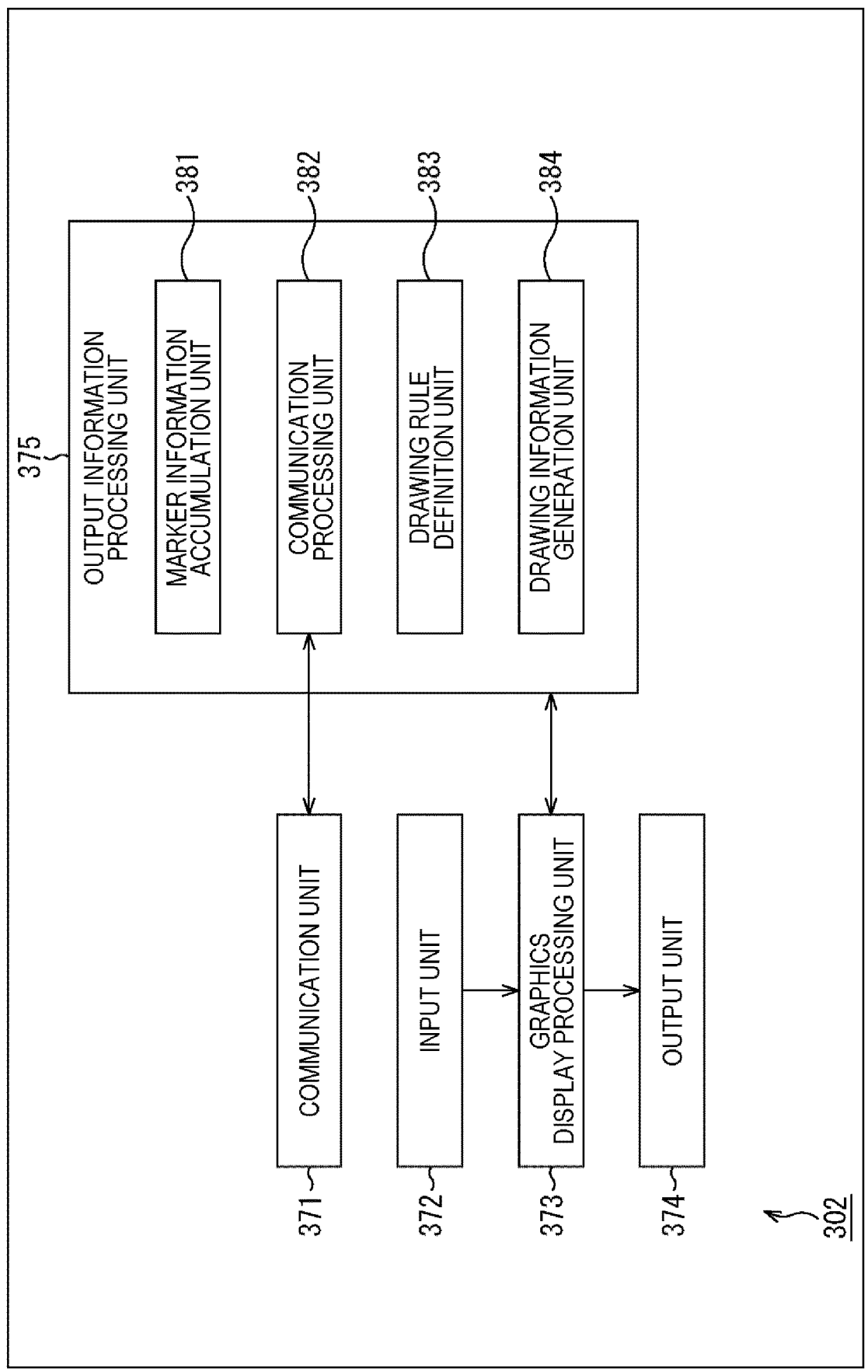
FIG. 31 is a block diagram illustrating an example of a main configuration of an individual terminal device.

FIG. 31 is a block diagram illustrating an example of a main configuration of the individual terminal device 302. The individual terminal device 302 includes a communication unit 371, an input unit 372, a graphics display processing unit 373, an output unit 374, and an output information processing unit 375.

The communication unit 371 has a communication interface, and communicates with another device (e.g., the integrated terminal device 301) via the communication interface. The communication method (standard) is optional, and may be wireless communication, wired communication, or both. For example, the communication unit 371 transmits information supplied from a communication processing unit 382 to be described later to the integrated terminal device 301 via the network 303. Furthermore, the communication unit 371 receives information transmitted from the integrated terminal device 301 via the network 303, and supplies the information to the communication processing unit 382.

The input unit 372 has an optional input device (detection device), and accepts an input of optional information via the input device. The input device may be, for example, an acceleration sensor or a gyro sensor. Furthermore, the input device may include, for example, an image sensor, a depth sensor, a touch sensor, a brightness sensor, a microphone, a device that is physically operated by a user such as a keyboard or a mouse, an external input terminal that acquires information supplied from another device, and a drive that reads information from a storage medium.

Furthermore, the number of input devices included in the input unit 372 is optional. For example, the input unit 372 may include a plurality of input devices, each input device detecting different information. The input unit 372 supplies the accepted information to the graphics display processing unit 373.

The graphics display processing unit 373 performs processing related to graphics display for a user. For example, the graphics display processing unit 373 performs processing of a control layer of a general operating system (OS) such as drawing control of multiple content such as a window for displaying an application, and distribution of events such as touching for each piece of content.

For example, the graphics display processing unit 373 acquires information supplied from the input unit 372. Furthermore, for example, the graphics display processing unit 373 acquires drawing information supplied by a drawing information generation unit 384 to be described later. The graphics display processing unit 373 generates an image (display image) to be output by the output unit 374 on the basis of these pieces of information. The graphics display processing unit 373 supplies the generated display image to the output unit 374.

Furthermore, the graphics display processing unit 373 can supply optional information such as information supplied from the input unit 372 to the output information processing unit 375 (a drawing rule definition unit 383, the drawing information generation unit 384, and the like).

The output unit 374 has an optional output device, and presents visual information to a user via the output device. For example, the output unit 374 acquires the display image supplied from the graphics display processing unit 373, and causes the output device to display the display image. The output device may be, for example, a display such as an LCD or an GELD that displays an image, a projector or the like that projects an image, or may not be those device. Furthermore, the number of output devices included in the output unit 374 is optional, and may be one, or may be two or more. For example, the output unit 374 may include a plurality of types of output devices such as an LCD and a projector. Furthermore, for example, the input device and the output device may be united as in a display with a touch panel.

The output information processing unit 375 performs processing related to output information in cooperation with processing units such as the graphics display processing unit 373 and the communication unit 371. For example, the output information processing unit 375 acquires, from the graphics display processing unit 373, input information input in the input unit 372, and generates information (drawing information) to be output by the output unit 374 or the like on the basis of the input information. The output information processing unit 375 supplies the generated drawing information to the graphics display processing unit 373.

Furthermore, the output information processing unit 375 can generate information to be transmitted to the integrated terminal device 301 or the like and supply the information to the communication unit 371.

The output information processing unit 375 includes a marker information accumulation unit 381, the communication processing unit 382, the drawing rule definition unit 383, and the drawing information generation unit 384.

The marker information accumulation unit 381 accumulates marker information related to the marker associated with the individual terminal device 302. The marker information is supplied to and registered in the integrated terminal device 301 via the communication unit 371.

The communication processing unit 382 performs processing related to communication via the communication unit 371. For example, the communication processing unit 382 acquires, via the communication unit 371, information regarding the integrated terminal device 301 (e.g., communication information or information regarding hardware performance of the integrated terminal device 301) transmitted from the integrated terminal device 301, and supplies the information to the drawing rule definition unit 383, the drawing information generation unit 384, and the like.

Furthermore, the communication processing unit 382 can also transmit information to the integrated terminal device 301 or the like via the communication unit 371. For example, the communication processing unit 382 acquires marker information accumulated in the marker information accumulation unit 381, supplies the marker information to the communication unit 371, and causes the marker information to be transmitted to the integrated terminal device 301. Furthermore, the communication processing unit 382 supplies the information regarding the hardware performance of the individual terminal device 302 to the communication unit 371, and causes the information to be transmitted to the integrated terminal device 301.

The drawing rule definition unit 383 defines a rule for drawing a marker or a content image. For example, the drawing rule definition unit 383 acquires various types of information (communication information, the position, orientation, and movement of the individual terminal device 302, hardware performance of the individual terminal device 302 and the integrated terminal device 301, the surrounding environment, a situation in the application, a user's instruction, and the like) from the communication processing unit 382, the graphics display processing unit 373, or the like, and sets a marker or a content image to be drawn, a drawing method thereof, and the like on the basis of these pieces of information. The drawing rule definition unit 383 supplies the drawing information generation unit 384 with information necessary for drawing, such as a marker or a content image to be drawn and designation of a drawing method thereof.

The drawing information generation unit 384 performs processing related to generation of drawing information, which is information regarding an image to be output by the output unit 374. The content of the drawing information is optional. For example, the drawing information may include an image (display image) to be drawn by the output unit 374.

For example, the drawing information generation unit 384 acquires information necessary for drawing, such as a marker or a content image, and designation of a drawing method thereof, supplied from the drawing rule definition unit 383, generates a display image related to the content image or the marker on the basis of these pieces of information, and supplies the display image to the graphics display processing unit 373 as the drawing information.

Note that these processing units have optional configurations. For example, each processing unit may be constituted by a logic circuit that implements the above-described processing. Furthermore, each processing unit may include, for example, a CPU, a ROM, and a RAM and use them to execute a program, thereby implementing the above-described processing. As a matter of course, each processing unit may have both configurations, in which a part of the above-described processing is implemented by a logic circuit, and the rest is implemented by execution of a program. The processing units may have configurations that are independent from each other. For example, some processing units may implement a part of the above-described processing by a logic circuit, some other processing units may implement the above-described processing by executing a program, and other processing units may implement the above-described processing by both a logic circuit and execution of a program.

<Drawing Rule Definition Unit>

Figure 32:
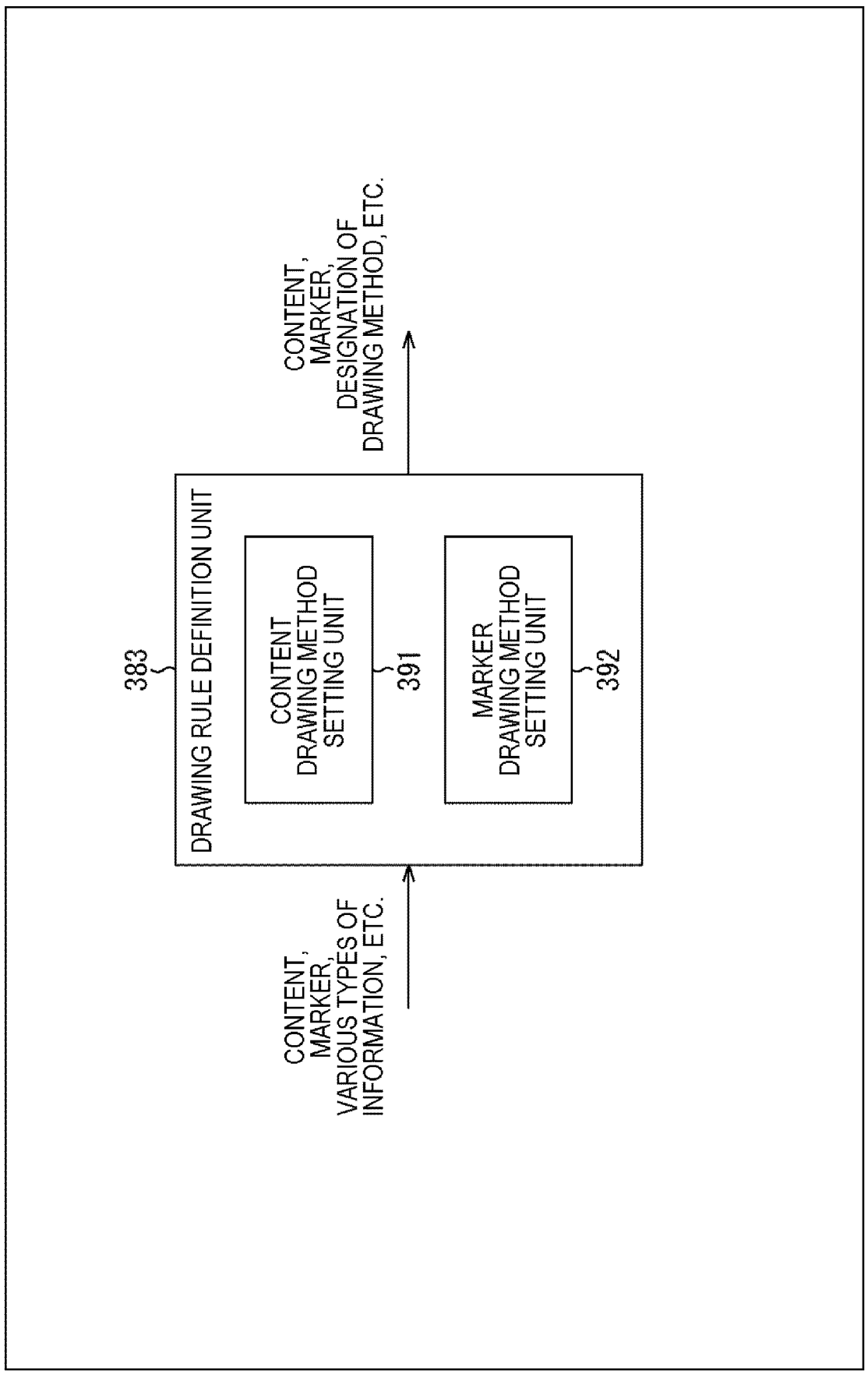
FIG. 32 is a block diagram illustrating an example of a main configuration of a drawing rule definition unit.

FIG. 32 is a block diagram illustrating an example of a main configuration of the drawing rule definition unit 383. As illustrated in FIG. 32, the drawing rule definition unit 383 includes a content drawing method setting unit 391 and a marker drawing method setting unit 392. The content drawing method setting unit 391 acquires a content image, other various types of information, and the like supplied to the drawing rule definition unit 383, and sets a method of drawing the content image on the basis of these pieces of information. The setting of the method of drawing the content image will be described later. After setting the drawing method, the content drawing method setting unit 391 supplies the drawing information generation unit 384 with the content image and information designating the method of drawing the content image.

The marker drawing method setting unit 392 acquires a marker, other various types of information, and the like supplied to the drawing rule definition unit 383, and sets a method of drawing the marker on the basis of these pieces of information. The setting of the method of drawing the marker will be described later. After setting the drawing method, the marker drawing method setting unit 392 supplies the drawing information generation unit 384 with the marker and information designating the method of drawing the marker.

<Drawing Information Generation Unit>

FIG. 33 is a block diagram illustrating an example of a main configuration of the drawing information generation unit 384. As illustrated in FIG. 33, the drawing information generation unit 384 includes a drawing control unit 393 and a drawing processing unit 394.

The drawing control unit 393 sets how a content image or a marker is to be drawn on the basis of designation of the content image or the marker, a drawing method thereof, and the like supplied from the drawing rule definition unit 383. Then, the drawing control unit 393 generates drawing control information for controlling how the content image or the marker is to be drawn, and supplies the drawing control information to the drawing processing unit 394 together with the content image or the marker.

The drawing processing unit 394 acquires these pieces of information supplied from the drawing control unit 393. The drawing processing unit 394 generates a display image related to the content image or the marker on the basis of these pieces of information that have been acquired. The drawing processing unit 394 supplies the generated display image as drawing information to the graphics display processing unit 373.

The individual terminal device 302 uses the drawing control unit 101 in FIG. 2 as the drawing control unit 393. That is, the drawing control unit 393 performs this processing by applying the present technology described above in <1. Device identification using marker> or <2. First embodiment>. Thus, the individual terminal device 302 can prevent a decrease in marker recognition rate.

For example, it is assumed that there are a plurality of the individual terminal devices 302 that display marker images and content images. In this case, the drawing control unit 393 can set a method of drawing a content image that moves between the individual terminal devices 302 (between the displays thereof). For example, the drawing control unit 393 can acquire information regarding the position, orientation, and movement of each of the individual terminal devices 302 from a result of detection of a marker image displayed on the display of each of the individual terminal devices 302. Furthermore, the drawing control unit 393 can obtain the position, orientation, movement, and the like of the display of each of the individual terminal devices 302 on the basis of the information. Moreover, the drawing control unit 393 can set a method of drawing how the content image moves between displays (that is, a series of motion the content image makes to move between the displays) on the basis of the information.

Furthermore, it is assumed that there is a projection plane of the individual terminal devices 302 and the integrated terminal device 301 (projector) that display a marker image, and that the individual terminal devices 302 are in a projection range of the integrated terminal device 301. In this case, the drawing control unit 393 can set a method of drawing a content image that moves between the projection plane of the integrated terminal device 301 and the displays of the individual terminal devices 302. For example, on the basis of the projection range of the integrated terminal device 301 and a captured image obtained by imaging the individual terminal devices 302 in the projection range, the drawing control unit 393 can detect the positions, orientations, movements, and the like of the individual terminal devices 302 on the projection plane of the integrated terminal device 301. Furthermore, on the basis of the information (the positions, orientations, movements, and the like of the individual terminal devices 302 on the projection plane of the integrated terminal device 301), the drawing control unit 393 can set a method of drawing how the content image moves between the projection plane of the integrated terminal device 301 and the displays of the individual terminal devices 302 (that is, a series of motion the content image makes to move between the projection plane of the integrated terminal device 301 and the displays of the individual terminal devices 302).

<3-4: Setting of Drawing Method>

Then, the drawing rule definition unit 383 may designate any one of the methods of drawing a content image or a marker described above in <1. Device identification using marker> or <2. First embodiment>.

<Setting of Method of Drawing Content Image>

For example, the content drawing method setting unit 391 of the drawing rule definition unit 383 may select the display form of the content image to be controlled from the size, the transparency, the movement, or the intermittent display of the content image, and the drawing control unit 393 of the drawing information generation unit 384 (the content drawing control unit 111 of the drawing control unit 101) may control the item of the display form of the content image selected by the content drawing method setting unit 391. That is, the content drawing method setting unit 391 selects whether to apply any one of the above-described control methods including reduction, transparency, movement, combination, and time division, and the drawing control unit 393 (the content drawing control unit 111) controls the display form of the content image by the method selected by the content drawing method setting unit 391.

This makes it possible to apply a wider variety of methods, and prevent a decrease in marker recognition rate in a wider variety of situations.

Furthermore, the content drawing method setting unit 391 may select the content image on the basis of a situation of an application (software) that uses the content image, a hardware specification of a device that executes the application, that is, the integrated terminal device 301 or the individual terminal device 302, or the like. That is, the content drawing method setting unit 391 determines, on the basis of these pieces of information, the characteristics the content image has as content, how the content image should be displayed, what is required, and the like, and selects a drawing method determined to be more appropriate on the basis of these items as conditions.

This allows the content drawing method setting unit 391 to select a more appropriate method of drawing the content image in accordance with various situations.

For example, a description will be given using an application for virtual "goldfish scooping". In this application, the display surface of the integrated terminal device 301 is used as a virtual fish tank, and the individual terminal device 302 is used as a paper scoop, so that a virtual image of goldfish in the fish tank can be virtually scooped. That is, a content image on the display surface of the integrated terminal device 301 can be moved to the display surface of the individual terminal device 302. Furthermore, in this application, the image of the goldfish virtually scooped can be returned to the virtual fish tank. That is, a content image on the display surface of the individual terminal device 302 can be moved to the display surface of the integrated terminal device 301.

In such an application, since the goldfish as the content image is a character, there is no problem with the goldfish always moving, and the goldfish can be operated regardless of a user's intention at a destination of the movement. Furthermore, while the individual terminal device 302 is in the display surface of the integrated terminal device 301, it is necessary to perform seamless drawing between both terminal devices at all times. Therefore, the content image (goldfish) cannot be displayed in a "reduced" state.

Furthermore, goldfishes have different patterns that produce individual differences. It is therefore not possible to apply "transparent" display that makes the pattern difficult to see. Furthermore, a line-of-sight of a user who is experiencing the application is directed to the goldfish at all times, and a hand of the user is operating the individual terminal device 302 at all times. It is therefore not possible to apply "time division" display.

Thus, in this case, the content drawing method setting unit 391 selects "movement" as a method of displaying the content image.

For example, the content drawing method setting unit 391 has a table as illustrated in FIG. 34A, and selects a method of drawing the content image in accordance with a value of the content image for a condition shown on the left of the table. In the case of FIG. 34A, for example, conditions prepared include "Content does not allow position of presentation to be changed regardless of user's intention", "Content is seamlessly drawn between individual terminal and integrated terminal at all times", and "Content in individual terminal needs to be gazed at and operated at all times". Furthermore, values (e.g., "1" if true, and "0" if false) for these conditions for each of the methods, "reduction", "transparent", "movement", and "time division" are set in advance.

As described above, on the basis of a situation of an application (software) that uses a content image, a hardware specification of a device that executes the application, and the like, the content drawing method setting unit 391 determines values the content image (e.g., an image of a "goldfish") has for these conditions, and selects a drawing method that matches the values for the corresponding conditions of the content image.

This allows the content drawing method setting unit 391 to more easily select a more appropriate drawing method.

Note that each condition in the table illustrated in FIG. 34A is an example. The conditions for selecting a method of drawing a content image are optional, and are not limited to this example. Furthermore, the number of conditions is also optional, and is not limited to this example. Moreover, the value of each drawing method for each condition is also not limited to this example.

<Setting of Marker>

Furthermore, for example, the marker drawing method setting unit 392 of the drawing rule definition unit 383 may select which of the above-described markers is to be displayed, and the drawing control unit 393 of the drawing information generation unit 384 (the marker drawing control unit 112 of the drawing control unit 101) may perform control to display the selected marker.

For example, the marker drawing method setting unit 392 selects any one of a full screen marker, an outside marker, a half screen marker, a movable marker, or a multiple marker. The drawing control unit 393 (the marker drawing control unit 112) performs control to display the marker selected by the marker drawing method setting unit 392.

This allows the drawing control unit 393 to display a wider variety of markers, and more appropriate markers can be displayed in a wider variety of situations. It is therefore possible to prevent a decrease in marker recognition rate.

Furthermore, the marker drawing method setting unit 392 may select a marker on the basis of a situation of an application (software) that uses a content image, a hardware specification of the integrated terminal device 301 or the individual terminal device 302 that executes the application, a situation of the surrounding environment of the integrated terminal device 301 or the individual terminal device 302, or the like.

That is, the marker drawing method setting unit 392 determines, on the basis of these pieces of information, the characteristics the content image has as content, how the content image is to be displayed on the hardware, the situation of the surroundings, and the like, and selects a marker determined to be more appropriate on the basis of these items as conditions.

This allows the marker drawing method setting unit 392 to select a more appropriate marker in accordance with various situations.

A description will be given in which the above-described application for "goldfish scooping" is taken as an example. As described above, in this application, while the individual terminal device 302 is located in the display surface (in the virtual fish tank) of the integrated terminal device 301, it is necessary to seamlessly draw the content image between both terminal devices at all times. It is therefore not possible to use an "outside marker" and a "half screen marker", which do not allow a content image to be drawn on a boundary surface between the individual terminal device 302 and the integrated terminal device 301. Furthermore, since a portable device such as a smartphone is assumed as the individual terminal device 302, the size of the display surface of the individual terminal device 302 is assumed to be relatively small. A "multiple marker", an "outside marker", a "half screen marker", and a "movable marker" cannot be used because the size with which the marker can be displayed becomes smaller than the size of the display surface, which may result in a decrease in recognition rate.

Thus, in this case, the marker drawing method setting unit 392 selects a "full screen marker" as the marker.

Furthermore, for example, in a case of an application for selecting a "texture design of furniture", it is not necessary to seamlessly draw a content image. Furthermore, since content images drawn on the individual terminal device 302 are only textures, it is possible to draw a content image in a size that is sufficiently small with respect to the size of the display surface.

Thus, in this case, the marker drawing method setting unit 392 selects an "outside marker" as the marker.

For example, the marker drawing method setting unit 392 has a table as illustrated in FIG. 34B, and selects a marker to be drawn in accordance with a value of the marker for a condition shown on the left of the table. In the case of FIG. 34B, for example, conditions prepared include "Content is seamlessly drawn between individual terminal and integrated terminal at all times", "Individual terminal that is small in image size is used", "Terminal luminance and outside light cannot be adjusted", and "Size of content is sufficiently small with respect to screen size of individual terminal". Furthermore, values (e.g., "1" if true, and "0" if false) for these conditions for each of markers, "full screen (marker)", "outside (marker)", "half screen (marker)", "movable (marker)", and "multiple (markers)" are set in advance.

As described above, on the basis of a situation of an application (software) that uses a content image, a hardware specification of a device that executes the application, a situation of the surrounding environment of the device, and the like, the marker drawing method setting unit 392 determines values the obtained marker has for these conditions, and selects a marker that matches the values for the corresponding conditions of the marker.

This allows the marker drawing method setting unit 392 to more easily select a more appropriate drawing method.

Note that each condition in the table illustrated in FIG. 34B is an example. The conditions for selecting a marker are optional, and are not limited to this example. Furthermore, the number of conditions is also optional, and is not limited to this example. Moreover, the value of each marker for each condition is also not limited to this example.

Note that, since markers and content images differ in size, movement amount, color shading, and the like depending on the acquired information, the above-described display control (that is, the contents of the conditions in each table in FIGS. 34A and 34B) may be appropriately switched (updated) in accordance with the characteristics of the markers and the content images.

<3-5: Flow of Processing>
<Flow of Processing of Entire System>

Figure 35:
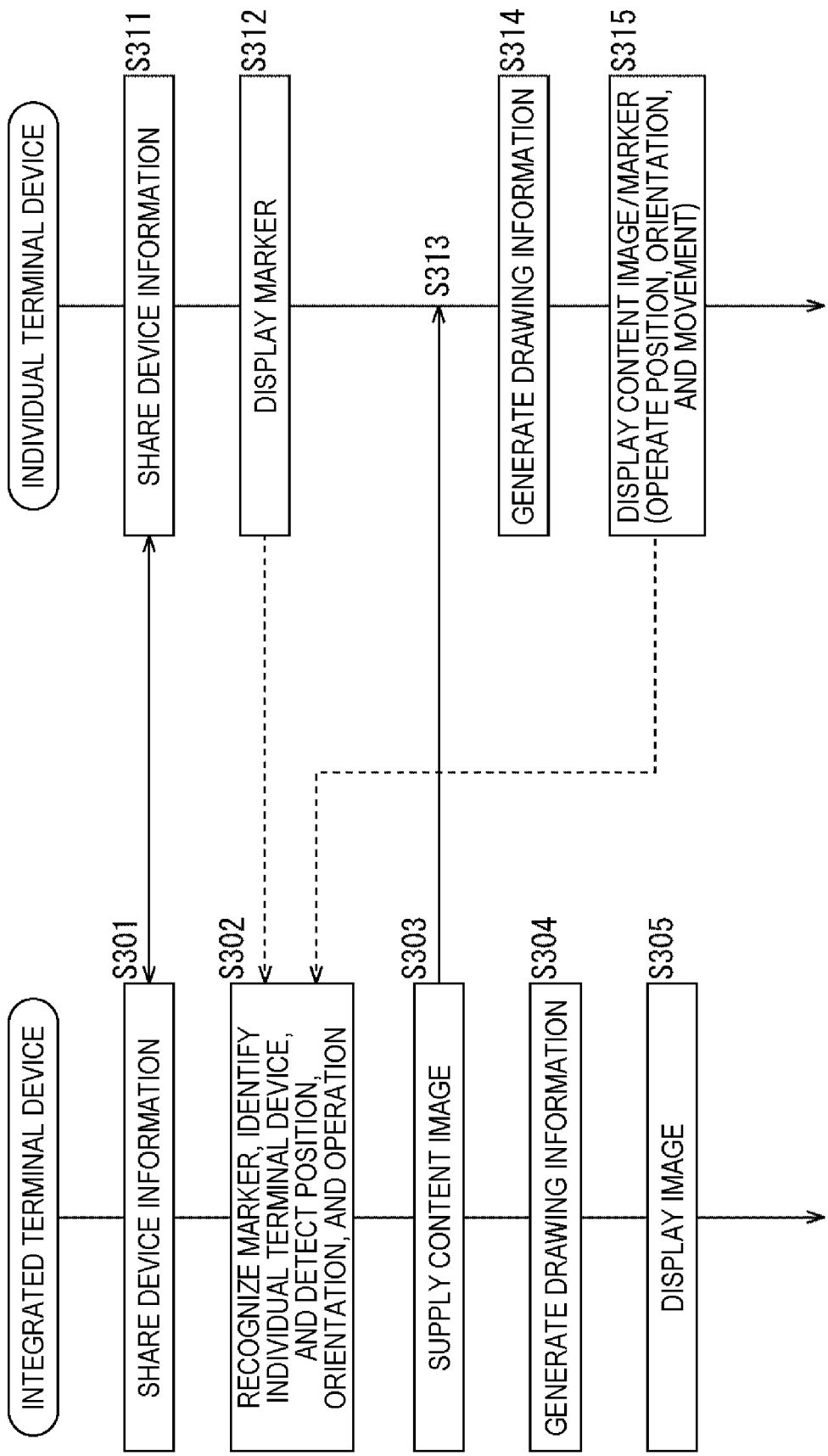
FIG. 35 is a flowchart illustrating an example of a flow of system processing.

Next, processing executed by the devices in the information processing system 300 will be described. First, an example of a flow of processing of the entire system will be described with reference to a flowchart in FIG. 35.

First, device information (information regarding the hardware performance of the integrated terminal device 301 and the individual terminal device 302, and the like) is mutually shared. For example, an application programming interface (API) is read and exchanged so that device information can be easily shared.

In step S301, the communication processing unit 364 of the integrated terminal device 301 communicates with the individual terminal device 302 via the communication unit 354 to transmit information regarding the integrated terminal device 301 to the individual terminal device 302 and receive information regarding the individual terminal device 302. In step S311, the communication processing unit 382 of the individual terminal device 302 communicates with the integrated terminal device 301 via the communication unit 371 to transmit the information regarding the individual terminal device 302 to the integrated terminal device 301 and receive the information regarding the integrated terminal device 301.

When the device information has been mutually supplied, the output unit 374 of the individual terminal device 302 displays a marker associated with itself in step S312. In step S302, the input unit 351 of the integrated terminal device 301 captures an image of the displayed marker. The marker recognition unit 362 detects and recognizes the marker from the captured image. Then, the marker recognition unit 362 identifies the individual terminal device 302 associated with the marker. Moreover, the communication information generation unit 363 detects the position, orientation, movement, and the like of the marker (the individual terminal device 302) recognized by the marker recognition unit 362 on the basis of the captured image and the like, and generates communication information.

In step S303, the communication processing unit 364 of the integrated terminal device 301 transmits, to the individual terminal device 302 via the communication unit 354, a content image to be displayed on the identified individual terminal device 302 as communication information. In step S313, the communication processing unit 382 of the individual terminal device 302 receives the communication information (the content image and the like) via the communication unit 371.

In the integrated terminal device 301, in step S304, the drawing information generation unit 365 generates drawing information. Then, in step S305, the output unit 353 displays a display image including the drawing information.

On the other hand, in the individual terminal device 302, in step S314, the drawing rule definition unit 383 selects a drawing method, and the drawing information generation unit 384 uses the drawing method to generate drawing information including the content image or the marker that has been supplied. Then, in step S315, the output unit 374 displays the display image including the content image or the marker.

This image displayed on the individual terminal device 302 is captured by the integrated terminal device 301 in the processing of step S302, and detection of the marker and detection of the position, orientation, operation, or the like are performed. Then, each piece of the subsequent processing described above is similarly performed.

In this manner, the integrated terminal device 301 and the individual terminal device 302 exchange various types of information as necessary, thereby cooperating to execute each piece of processing of the application.

<Flow of Integrated Terminal Processing>

Figure 36:
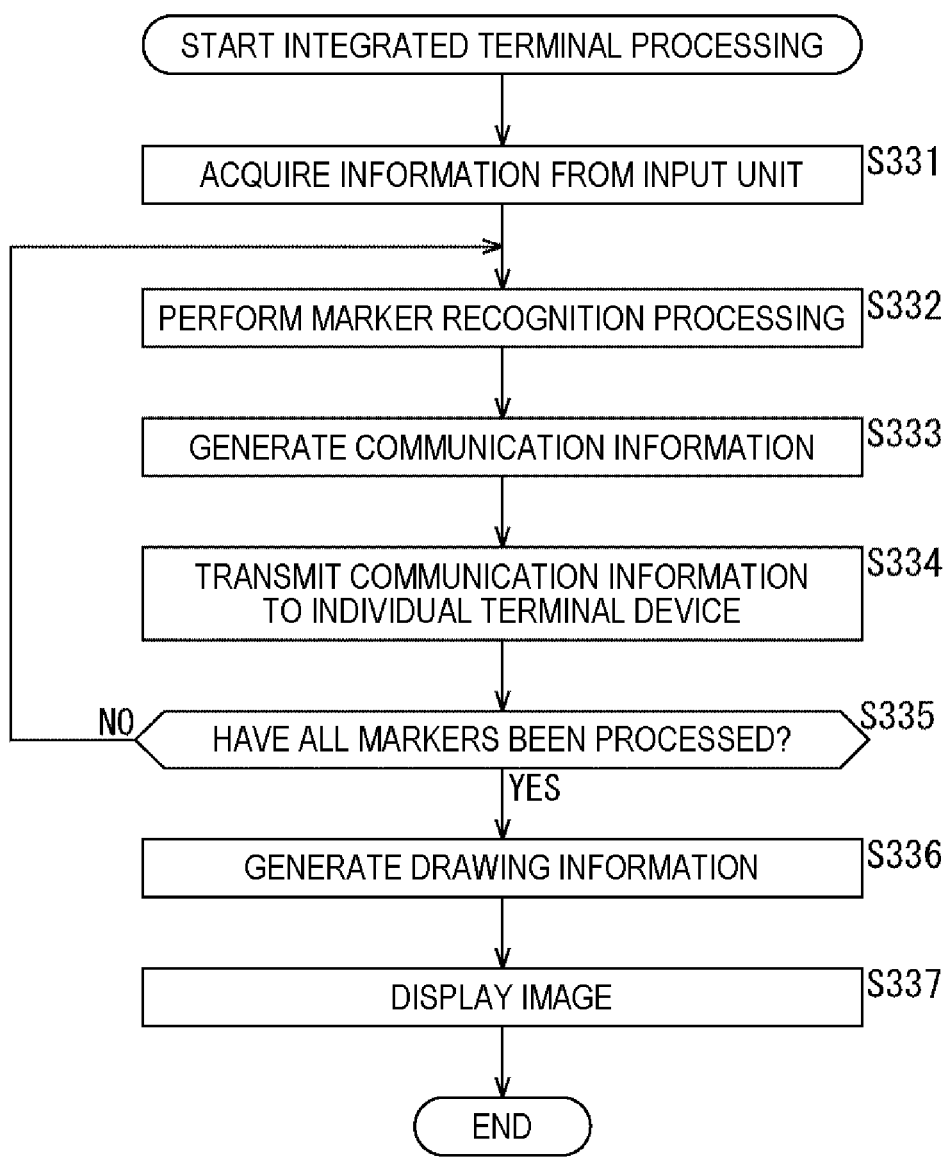
FIG. 36 is a flowchart illustrating an example of a flow of integrated terminal processing.

Next, an example of a flow of integrated terminal processing executed by the integrated terminal device 301 will be described with reference to a flowchart in FIG. 36.

When the integrated terminal processing is started, the input unit 351 of the integrated terminal device 301 acquires various types of information in step S331. For example, the input unit 351 captures an image of a displayed marker, and generates a captured image. Furthermore, the communication processing unit 364 collects information of the individual terminal device 302.

In step S332, the marker recognition unit 362 performs marker recognition processing by using the information such as the captured image acquired in step S331, recognizes the marker included in the captured image, and identifies the individual terminal device 302 corresponding to the marker.

In step S333, the communication information generation unit 363 generates communication information including a content image or the like to be displayed on the individual terminal device 302 on the basis of a recognition result of step S332 or the like.

In step S334, the communication processing unit 364 transmits the communication information generated in step S333 to the individual terminal device 302 identified in step S332 via the communication unit 354.

In step S335, the marker recognition unit 362 determines whether or not all markers included in the captured image have been processed. If it is determined that there is an unprocessed marker, the processing returns to step S332. That is, each piece of processing of step S332 to step S335 is executed for each marker included in the captured image. Then, if it is determined in step S335 that the processing has been performed for all the markers, the processing proceeds to step S336.

In step S336, the drawing information generation unit 365 generates drawing information.

In step S337, the output unit 353 displays a display image including the drawing information generated in step S336.

When each piece of processing of step S337 ends, the integrated terminal processing ends.

By executing each piece of processing in this manner, the integrated terminal device 301 can more easily recognize the markers. That is, a decrease in marker recognition rate can be prevented.

<Flow of Individual Terminal Processing>

Next, an example of a flow of individual terminal processing executed by the individual terminal device 302 will be described with reference to a flowchart in FIG. 37.

When the individual terminal processing is started, in step S351, the input unit 372 collects various types of information such as the surrounding environment and the position, orientation, and movement of a device, for example. Furthermore, the communication processing unit 382 collects information regarding the integrated terminal device 301.

In step S352, the communication processing unit 382 receives communication information supplied from the integrated terminal device 301 via the communication unit 371.

In step S353, the drawing rule definition unit 383 uses the communication information received in step S352 to execute drawing method setting processing to which the present technology is applied, and sets a method of drawing a content image or a marker. The drawing method setting processing will be described later.

In step S354, the drawing control unit 393 of the drawing information generation unit 384 uses the present technology to control drawing of the content image or the marker by using the drawing method set in step S353.

In step S355, in accordance with the control, the drawing processing unit 394 of the drawing information generation unit 384 generates drawing information including a display image of the content image or the marker.

In step S356, the output unit 374 displays the display image including the drawing information generated in step S355.

When the processing of step S356 ends, the individual terminal processing ends.

By executing each piece of processing as described above, the individual terminal device 302 can prevent a decrease in marker recognition rate.

<Flow of Drawing Method Setting Processing>

Next, an example of a flow of the drawing method setting processing executed in step S353 in FIG. 37 will be described with reference to a flowchart in FIG. 38.

When the drawing method setting processing is started, in step S361, the content drawing method setting unit 391 sets a method of drawing the content image by applying the above-described present technology.

In step S362, the marker drawing method setting unit 392 sets a method of drawing the marker by applying the above-described present technology.

Figure 37:
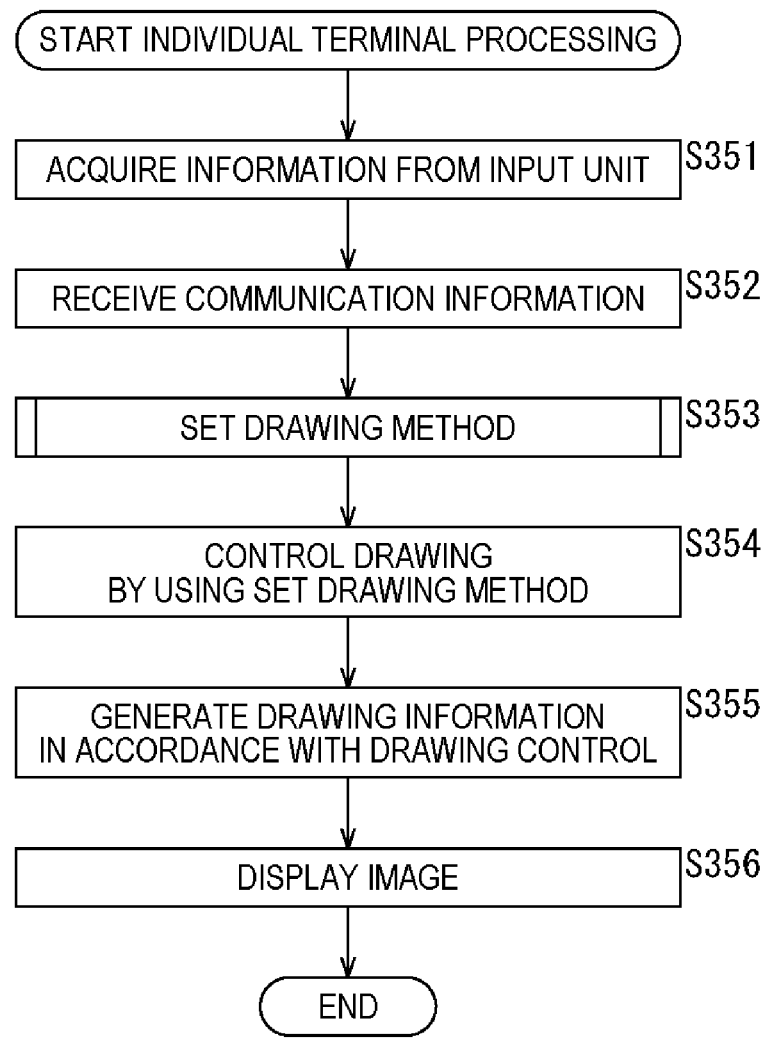
FIG. 37 is a flowchart illustrating an example of a flow of individual terminal processing.
Figure 38:
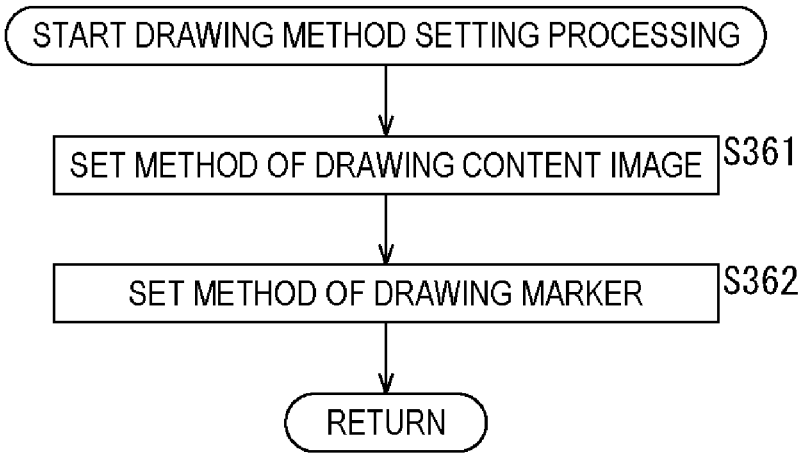
FIG. 38 is a flowchart illustrating an example of a flow of drawing method setting processing.

When the processing of step S362 ends, the drawing method setting processing ends, and the processing returns to FIG. 37.

By executing each piece of processing in this manner, the drawing rule definition unit 383 can prevent a decrease in marker recognition rate.

<3-6: Flow of Position/Orientation Instruction Processing>

Figure 39:
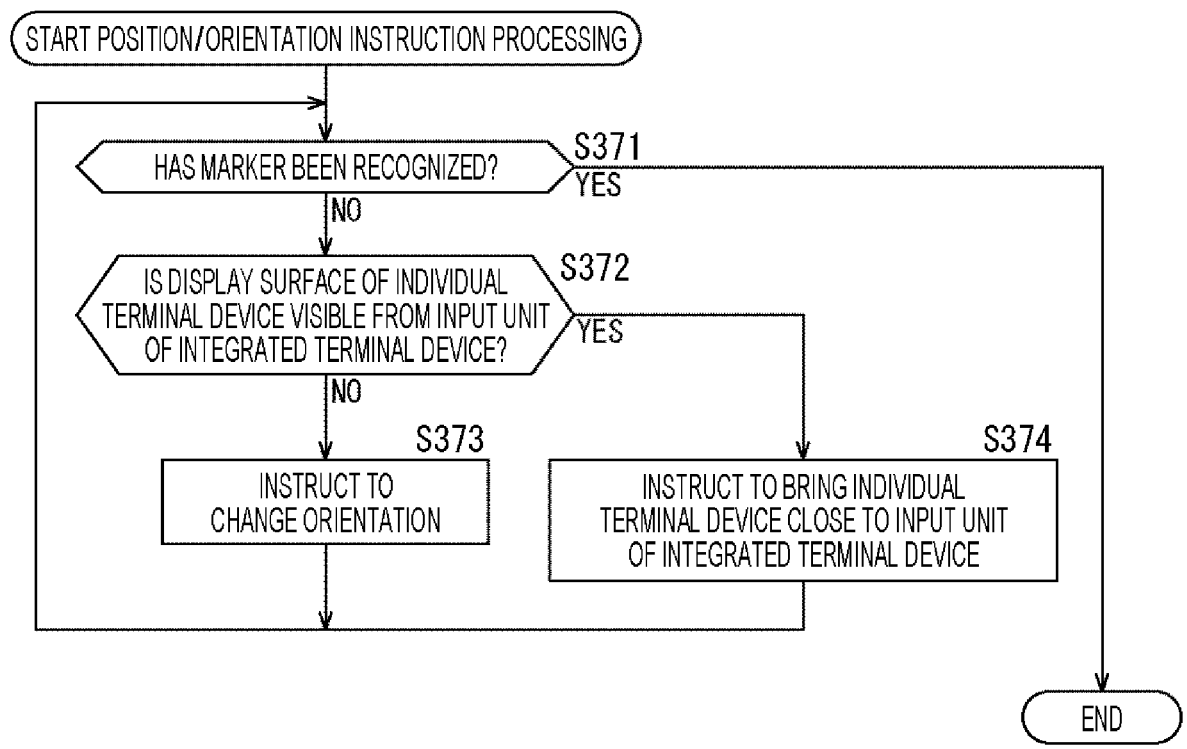
FIG. 39 is a flowchart illustrating an example of a flow of position/orientation instruction processing.

Note that, in a case where no registered marker is found, a notification may be displayed for prompting (the user of) the individual terminal device 302 having a marker that has not been detected to change the orientation or the like. For example, the integrated terminal device 301 performs position/orientation instruction processing to make this notification. An example of a flow of the position/orientation instruction processing will be described with reference to a flowchart in FIG. 39.

When the position/orientation instruction processing is started, in step S371, the drawing information generation unit 365 of the integrated terminal device 301 determines whether or not a marker has been recognized by the marker recognition unit 362. If it is determined that a marker has not been recognized, the processing proceeds to step S372.

In step S372, the drawing information generation unit 365 analyzes a captured image, for example, and determines whether or not the display surface of the individual terminal device 302 is visible from the input unit 351 of the integrated terminal device 301. If it is determined that the display surface is not visible, the processing proceeds to step S373.

In this case, it is presumed that the marker has not been recognized because the orientation of the individual terminal device 302 is not appropriate. Thus, in step S373, the drawing information generation unit 365 generates drawing information including a notification for instructing the user to change the orientation of the individual terminal device 302, thereby causing the output unit 353 to display the notification.

When the processing of step S373 ends, the processing returns to step S371.

Furthermore, if it is determined in step S372 that the display surface of the individual terminal device 302 is visible from the input unit 351 of the integrated terminal device 301, the processing proceeds to step S374.

In this case, it is presumed that the marker has not been recognized because the individual terminal device 302 is too far from the input unit 351 (camera or the like) of the integrated terminal device 301 (or the marker is displayed too small). Thus, in step S374, the drawing information generation unit 365 generates drawing information including a notification for instructing the user to bring the individual terminal device 302 close to the input unit 351 of the integrated terminal device 301, thereby causing the output unit 353 to display the notification.

When the processing of step S374 ends, the processing returns to step S371.

Then, if it is determined in step S371 that the marker has been recognized, the position/orientation instruction processing ends.

By performing a notification in this manner, the user can easily notice that the marker has not been recognized, and can take an appropriate measure. With this arrangement, it possible to prevent a decrease in marker recognition rate.

Note that this notification may be displayed at any location, and may be displayed at a location other than the display surface of the integrated terminal device 301. For example, this notification may be displayed on the display surface of the individual terminal device 302. Furthermore, this notification may be displayed on both of the display surfaces of the integrated terminal device 301 and the individual terminal device 302. Moreover, this notification may be displayed at a location other than both of the display surfaces of the integrated terminal device 301 and the individual terminal device 302.

Furthermore, in step S372, the orientation of the individual terminal device may be recognized, and whether or not the display surface is visible from the input unit 351 of the integrated terminal device 301 may be determined on the basis of the recognized orientation. In that case, information of a sensor loaded onto the individual terminal device 302 may be used for recognition of the orientation of the individual terminal device 302.

Moreover, the above-described position/orientation instruction processing can be executed by any device. For example, the individual terminal device 302 may execute this position/orientation instruction processing. For example, in a case where it is difficult to recognize the marker, (the drawing control unit 393 of) the drawing information generation unit 384 of the individual terminal device 302 may issue a notification for prompting control of the position and orientation of the device that displays the marker.

Furthermore, the integrated terminal device 301 and the individual terminal device 302 may cooperate to execute the position/orientation instruction processing, or a device other than the integrated terminal device 301 and the individual terminal device 302 may execute the position/orientation instruction processing.

<3-7: Luminance Adjustment>

Furthermore, (the drawing control unit 393 of) the drawing information generation unit 384 of the individual terminal device 302 may control luminance of the display surface on the basis of brightness around the display surface. This makes it possible to appropriately control brightness of the display surface in accordance with surrounding brightness. With this control, the display surface becomes easier to see. That is, since marker detection becomes easier, a decrease in marker recognition rate can be prevented.

<3-8: Others>

By applying the present technology as described above, it is possible to recognize a plurality of individual terminal devices by using markers. Furthermore, the individual terminal device 302 can be recognized without dependence on the types of sensors loaded onto the integrated terminal device 301 and the individual terminal device 302. Furthermore, it is possible to increase the number of the individual terminal devices 302 that can be used at the same time, shorten the time to find the individual terminal devices 302, and improve stability of recognition. Furthermore, it is possible to achieve both original use and identification of the individual terminal device 302. Furthermore, intuitive operation with a low learning cost, seamless drawing between the individual terminal device 302 and the integrated terminal device 301, and independent operation in the individual terminal device 302 and common operation in the integrated terminal device 301 become possible.

4. Examples of Application

<4-1: Goldfish Scooping>

Next, an example of an application executed with the use of the information processing system 300 as described above will be described.

First, an application for "goldfish scooping" will be described. In this application, the display surface of the integrated terminal device 301 is set as a virtual fish tank, and an image of goldfish is displayed. Like real goldfish, this image of goldfish basically moves regardless of a user's intention. The user can use the individual terminal device 302 such as a smartphone as a paper scoop to experience scooping the goldfish from the fish tank.

For example, as illustrated in FIG. 40, an image is projected from a tee 401 of the integrated terminal device 301 onto the top surface 311 of the table. That is, a display surface 410 of the integrated terminal device 301 is formed on the top surface 311. The tee 401 includes the input unit 313 and the output unit 314 (the input unit 351 and the output unit 353). That is, the tee 401 includes a projector that projects an image onto the top surface 311 (the display surface 410) and a camera that captures an image of the top surface 311 (the display surface 410) or the like.

Thus, the tee 401 projects an image of the virtual fish tank onto the display surface 410, and captures an image of the display surface 410. Since the marker recognition unit 362 of the integrated terminal device 301 recognizes markers on the basis of the captured image, the individual terminal device 302-1 and the individual terminal device 302-2 located on the display surface 410 can be recognized with the use of the markers. The integrated terminal device 301 and the individual terminal device 302 perform processing related to this application on the basis of such information.

In this application, when the individual terminal device 302 (e.g., a smartphone) is held over the display surface 410, it is necessary to perform drawing seamlessly at all times so that the goldfish located below the individual terminal device 302 is drawn also on the display of the individual terminal device 302. Therefore, for example, the drawing information generation unit 384 as a control unit controls a movement of a content image (goldfish) on the display of the individual terminal device 302 and the display surface 410 on the basis of the position and orientation of the individual terminal device 302 that is above the display surface 410. For example, the drawing information generation unit 384 controls the movement of the goldfish so that the goldfish moves in accordance with the position and orientation of the individual terminal device 302.

Figure 41B:
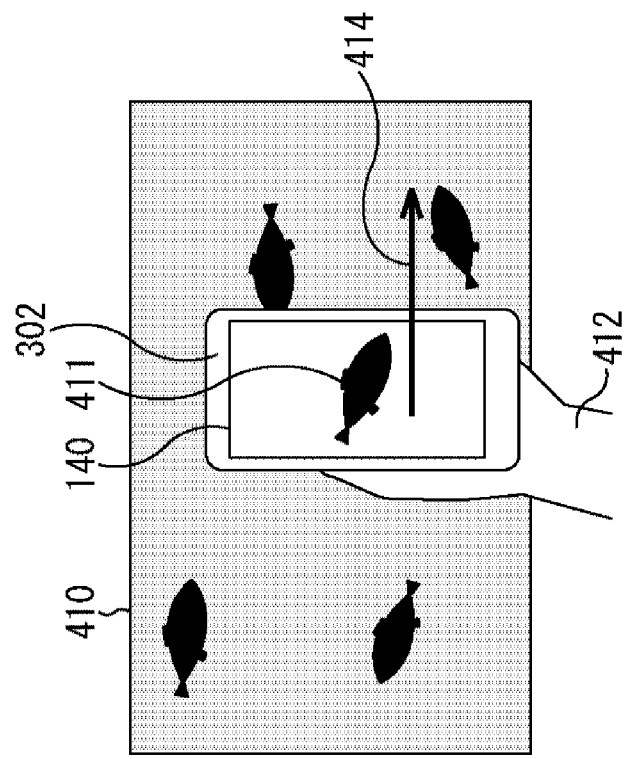
FIGS. 41A and 41B are diagrams illustrating an example of the application software.
Figure 41A:
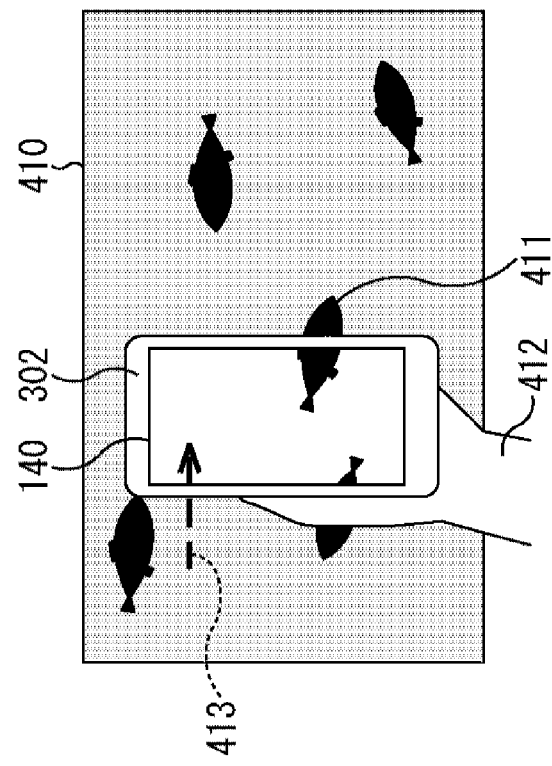

For example, as illustrated in FIG. 41A, when a user 412 stops the individual terminal device 302 or slowly moves the individual terminal device 302 as indicated by a dotted arrow 413 on the display surface 410, a goldfish image 411 can move seamlessly between the display surface 410 of the integrated terminal device 301 and a display surface 140 of the individual terminal device 302. That is, a state in which a paper scoop is submerged in water (under goldfish) in real goldfish scooping is virtually reproduced.

In a case of "scooping the goldfish", for example, as illustrated in FIG. 41B, in a state where the goldfish image 411 is drawn on the display surface 140 of the individual terminal device 302, the user 412 quickly moves the individual terminal device 302 as indicated by an arrow 414. In this way, the goldfish image 411 is caught in the individual terminal device 302. That is, the movement of the goldfish image 411 is restricted within the display surface 140 (the goldfish image 411 can no longer move to the display surface 410). That is, a state in which the goldfish is scooped on the paper scoop in real goldfish scooping is virtually reproduced.

Figure 42:
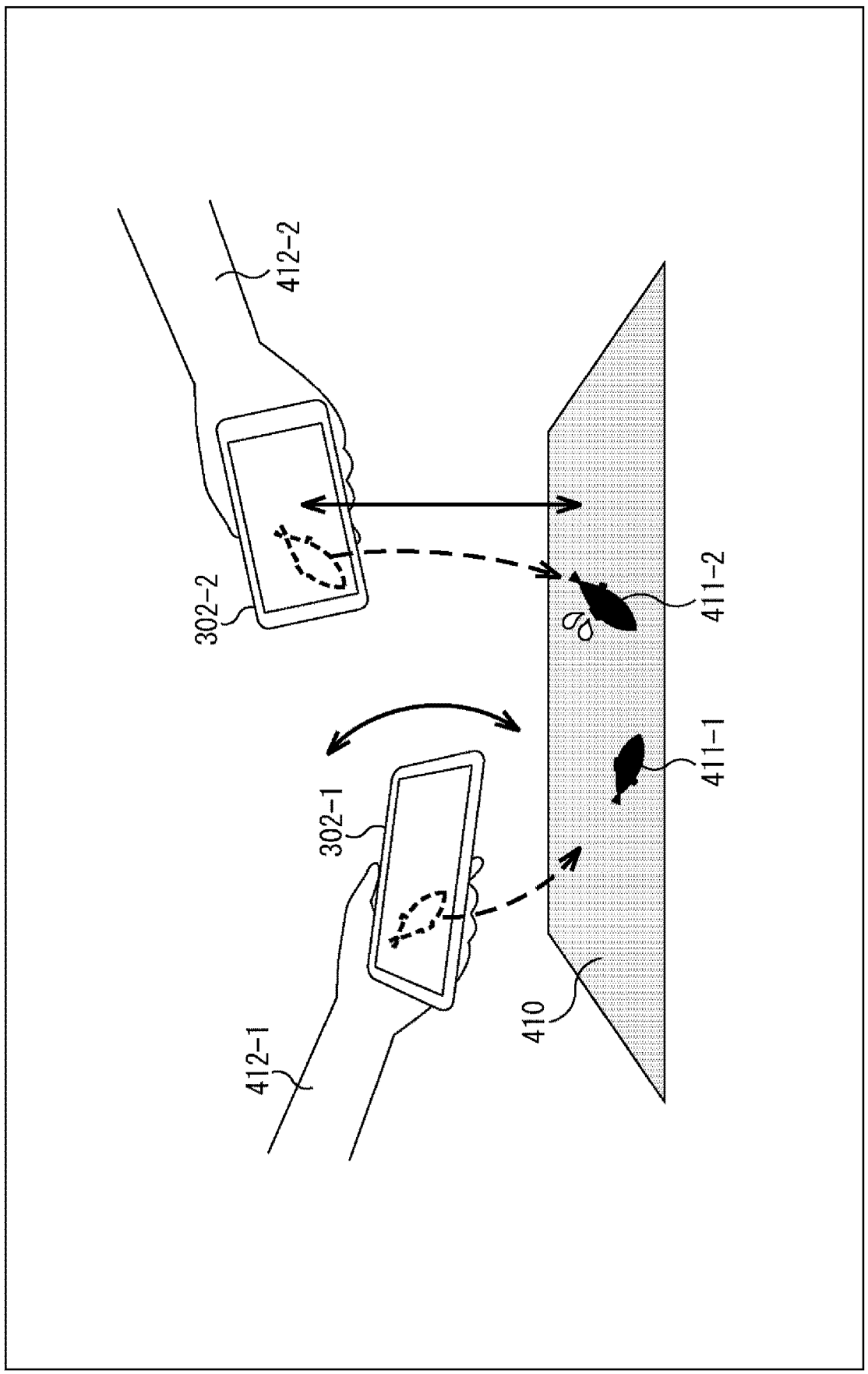
FIG. 42 is a diagram illustrating an example of the application software.

In a case of returning the scooped goldfish to the fish tank, for example, as illustrated in FIG. 42, the user 412 tilts (the display surface 140 of) the individual terminal device 302. In this way, the goldfish image 411 on the display surface 140 moves to the fish tank. That is, the goldfish image 411 moves from the display surface 140 of the individual terminal device 302 to the display surface 410 of the integrated terminal device 301. That is, a state in which the goldfish is returned from the paper scoop to the fish tank in real goldfish scooping is virtually reproduced.

Note that, at that time, as illustrated in FIG. 42, performance in which the goldfish image returns to the fish tank changes in accordance with the tilt and height of the individual terminal device 302. For example, when a user 412-1 gently tilts the individual terminal device 302 at a position close to the display surface 410 (that is, a low position), the goldfish image 411 slowly returns to the fish tank (slowly moves to the display surface 410). On the other hand, for example, when a user 412-2 greatly tilts the individual terminal device 302 at a position far from the display surface 410 (that is, a high position), the goldfish image 411 quickly falls into the fish tank (moves to the display surface 410 at high speed). Furthermore, when the goldfish image 411 returns to the display surface 410, performance such as water splashing is also added.

In a case of such a content image (an image of goldfish), the drawing rule definition unit 383 selects "movement" as the method of drawing the content, and selects "full screen marker" as the marker.

This allows for interaction by an intuitive operation such as scooping and tilting. Furthermore, this allows for seamless drawing between the display surface 410 of the integrated terminal device 301 and the display surface 140 of the individual terminal device 302. Thus, the user can experience the application as described above. Furthermore, a plurality of users can use their individual terminal devices 302 and simultaneously experience this application.

<4-2: Character Raising Game>

Figure 43:
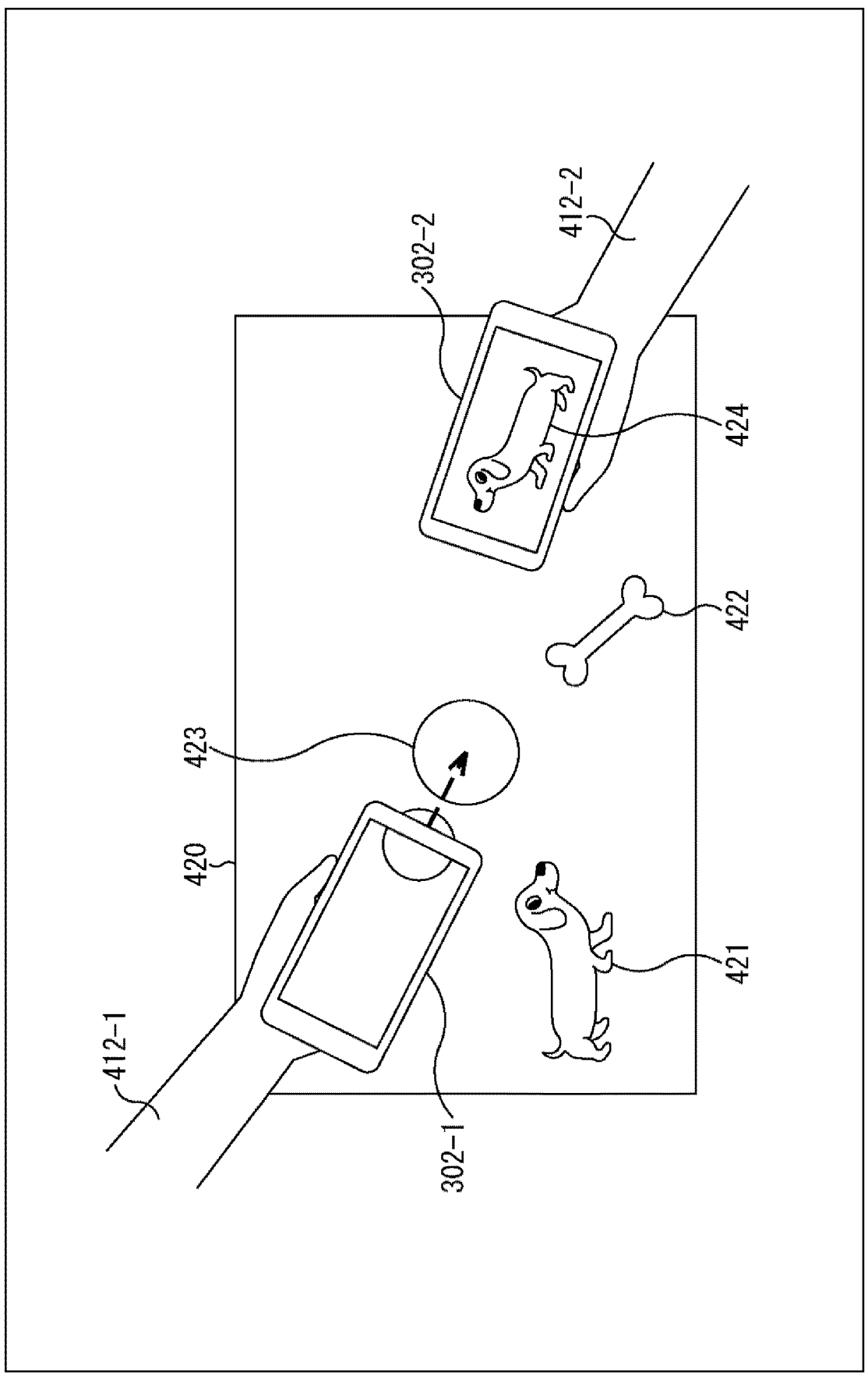
FIG. 43 is a diagram illustrating an example of application software.

Next, an application for a "character raising game" will be described. As illustrated in FIG. 43, this application is a game played by multiple people in which a character is raised, and a character 421 and an item 422 are displayed on a display surface 420 of the integrated terminal device 301.

In this application, content edition such as customization of an item can be performed in each of the individual terminal devices 302. Furthermore, an item or a character on the individual terminal device 302 can be moved to the display surface 420, or an item or a character on the display surface 420 can be moved to the individual terminal device 302.

A user can bring the individual terminal device 302 close to a desired position on the display surface of the integrated terminal device 301, and, in this state, swipe an image of an item or a character displayed on the display surface of the individual terminal device 302 toward the display surface of the integrated terminal device 301, thereby easily inputting (moving) the item or the character to the position on the display surface of the integrated terminal device 301.

For example, in FIG. 43, the user 412-1 moves an item 423 from the user's individual terminal device 302-1 to the display surface 420. Furthermore, the user 412-2 tries to move a character 424 from the user's individual terminal device 302-2 to the display surface 420.

In the case of this application, a content image is reduced only at the time of such a movement between the display surfaces, and seamless drawing is performed between the display surface of the individual terminal device 302 and the display surface 420 of the integrated terminal device 301.

Such a content image of a character or an item may be larger in size than the display surface of the individual terminal device 302. Thus, there may be a case where the content image cannot be displayed on the individual terminal device 302 in its original size, or a case where a marker displayed on the individual terminal device 302 cannot be recognized.

Thus, in a case of such a content image (an image of a character or an item), the drawing rule definition unit 383 selects "reduction" as the method of drawing the content, and selects "full screen marker" as the marker.

This makes it possible to input, to the display surface 420 of the integrated terminal device 301, a character or an item that is large with respect to the display surface of the individual terminal device 302, and restore, to the display surface of the individual terminal device 302, the character or the item on the display surface 420 of the integrated terminal device 301. Thus, the user can experience the application as described above. Furthermore, a plurality of users can use their individual terminal devices 302 and simultaneously experience this application.

<4-3: Support for Brainstorming>

Figure 44:
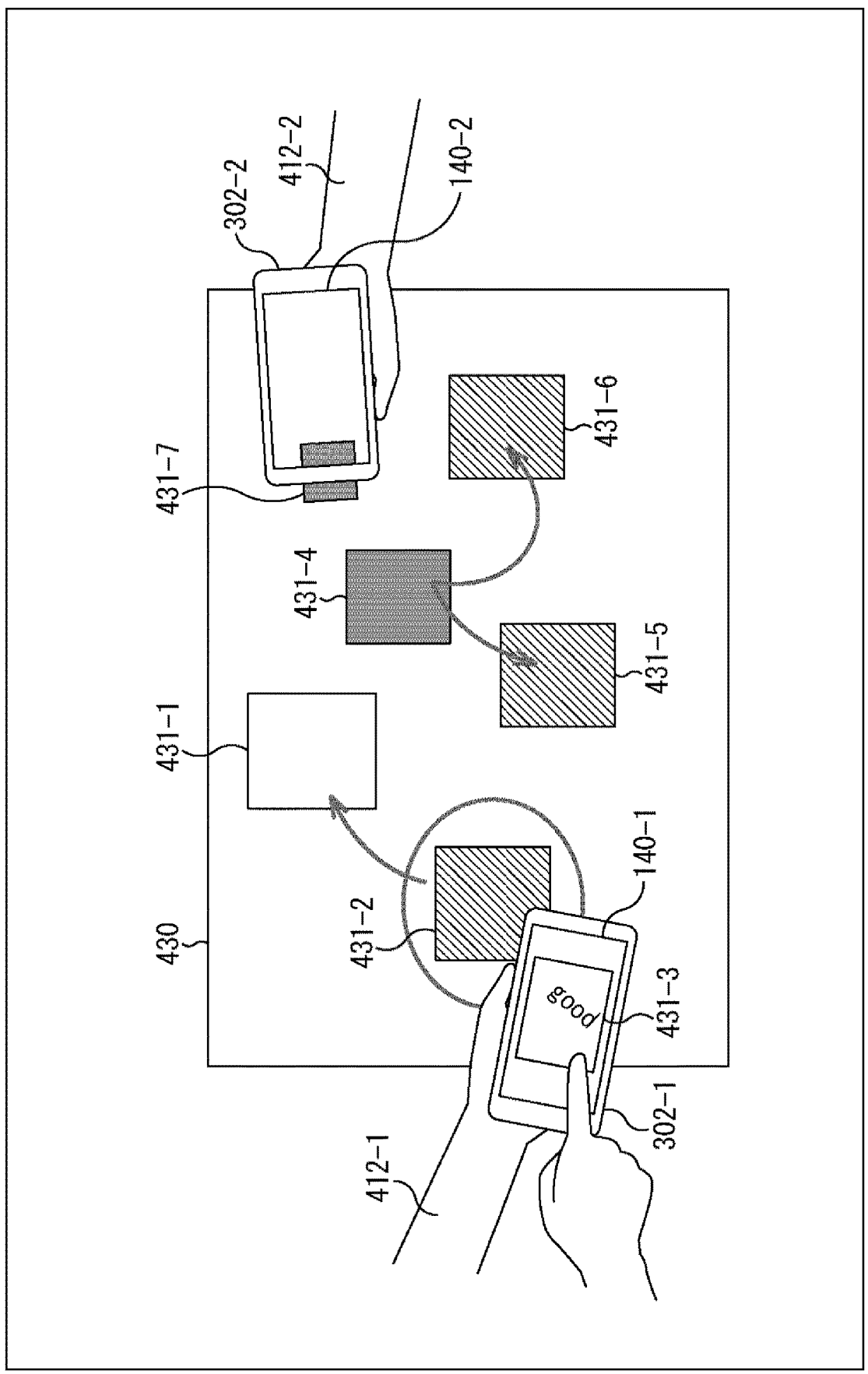
FIG. 44 is a diagram illustrating an example of application software.

Next, an application for "support for brainstorming" will be described. As illustrated in FIG. 44, this application is for supporting brainstorming for sharing a sticky note image on the display surface of the integrated terminal device 301.

In this application, a digital sticky note (on which a memo is written) is created on the individual terminal device 302 such as a smartphone or a tablet, and is moved to the display surface of the integrated terminal device 301 to be shared by a plurality of users.

For example, when presenting, on the display surface of the integrated terminal device 301, a sticky note displayed on the display surface of the individual terminal device 302, a user brings the individual terminal device 302 close to a desired position on the display surface of the integrated terminal device 301, and, in this state, swipes the sticky note displayed on the display surface of the individual terminal device 302 toward the display surface of the integrated terminal device 301. This allows a user to more easily display and share a sticky note at a desired position.

For example, in the case of the example in FIG. 44, the user 412-1 operates the individual terminal device 302-1 to move a sticky note 431-3 displayed on a display surface 140-1 to a display surface 430 of the integrated terminal device 301. Similarly, the user 412-2 operates the individual terminal device 302-2 to move a sticky note 431-7 displayed on a display surface 140-2 to the display surface 430 of the integrated terminal device 301.

On the display surface 430, a sticky note 431-1, a sticky note 431-2, a sticky note 431-4, a sticky note 431-5, and a sticky note 431-6 input by the corresponding users in this manner are displayed. As a matter of course, the sticky notes can be moved or edited on the display surface 430. It is therefore possible to more easily perform, for example, organization of ideas of the corresponding users.

Note that editing work such as writing to a sticky note is performed in the individual terminal device 302. At that time, it can be said that clarity of drawing of a sticky note itself does not affect the operability or usability as long as characters written by a user are clearly displayed.

Thus, in a case of such a content image (an image of a sticky note), the drawing rule definition unit 383 selects "transparent" as the method of drawing the content, and selects "full screen marker" as the marker.

This allows a user to experience an application as described above. Furthermore, a plurality of users can use their individual terminal devices 302 and simultaneously experience this application.

<4-4: Material Sharing>

Figure 45:
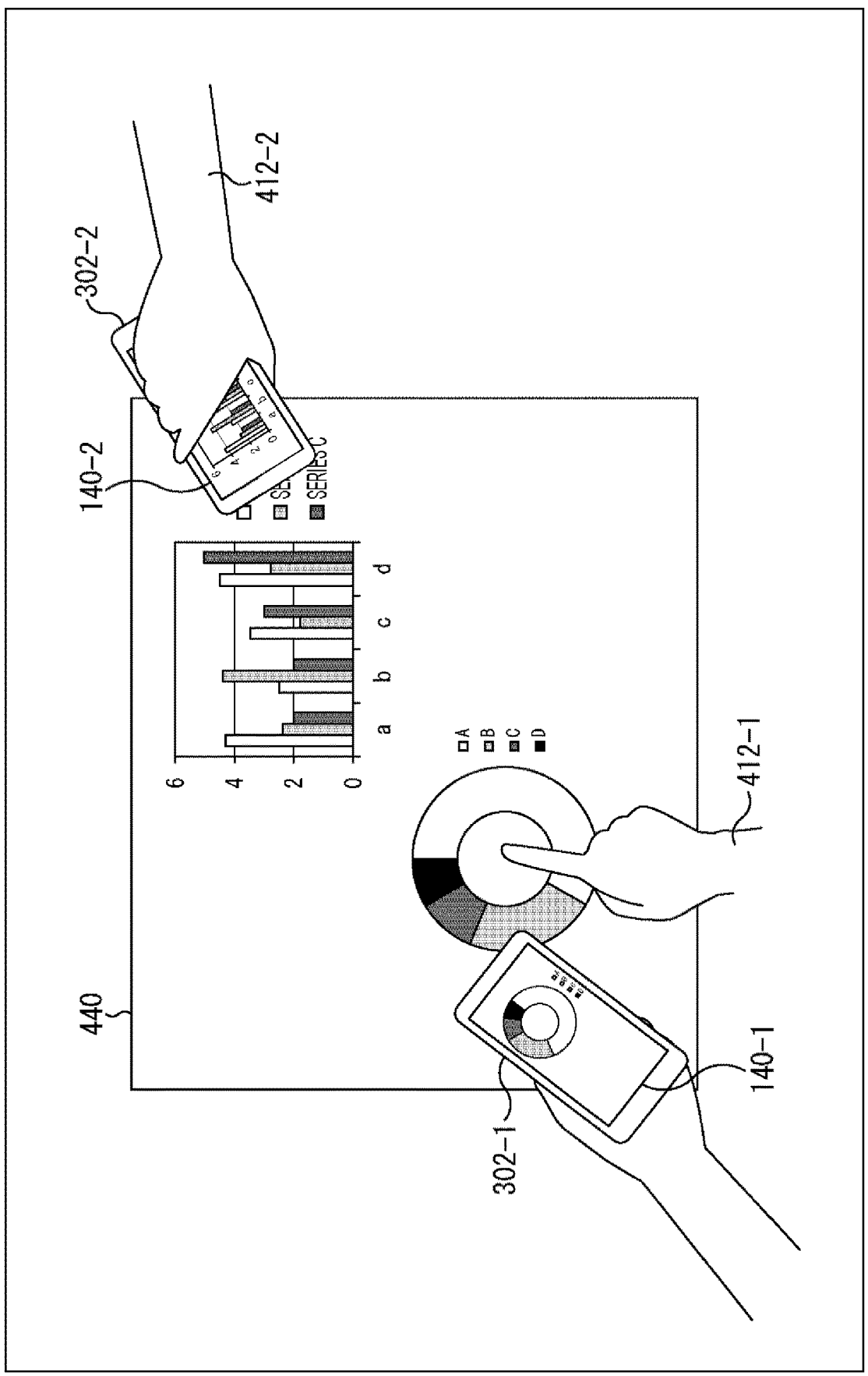
FIG. 45 is a diagram illustrating an example of application software.

Next, an application for "material sharing" will be described. As illustrated in FIG. 45, this application is for sharing, on a display surface 440 of the integrated terminal device 301, a material displayed on the display surface 140 of the individual terminal device 302.

In this application, when a user presents, on the display surface 440 of the integrated terminal device 301, a material on the display surface 140 of the individual terminal device 302, the user brings the individual terminal device 302 close to a desired position on the display surface 440, and, in this state, performs a predetermined operation such as swiping the material toward the display surface 440, so that the material can be easily displayed at the desired position on the display surface 440. Furthermore, when a user performs a predetermined operation such as swiping a material on the display surface 440 toward the individual terminal device 302, the material moves to the display surface of the individual terminal device 302. In this way, it is possible to select a terminal to be a movement destination by an intuitive operation. Moreover, multiple people can use their individual terminals and simultaneously experience an application.

For example, in the case of FIG. 45, the user 412-1 swipes a material (pie chart) displayed on the display surface 440 of the integrated terminal device 301, thereby moving the material to the display surface 140-1 of the individual terminal device 302-1. Furthermore, the user 412-2 tilts the individual terminal device 302-2, thereby moving a material (bar chart) displayed on the display surface 140-2 of the individual terminal device 302-2 to the display surface 440.

In this application, edition of a material is not performed in the individual terminal device 302. Thus, in a case of such a content image (an image of a material), the drawing rule definition unit 383 selects "time division" as the method of drawing the content, and selects "full screen marker" as the marker.

This allows a user to experience an application as described above. Furthermore, a plurality of users can use their individual terminal devices 302 and simultaneously experience this application.

Furthermore, in a case where it is necessary to recognize the individual terminal device 302 only when data is shared between the individual terminal device 302 and the integrated terminal device 301 in this manner, drawing of a marker or a content image may be controlled in accordance with interaction of data sharing. Specific examples thereof include the following.

"Drag"

Content is dragged so that data is moved between terminal devices.

When dragging of the content has been sensed by touch sensor information of the individual terminal device 302, a marker is displayed or the content blinks.

"Drop (Tilt)"

An operation of tilting the individual terminal device 302 above the display surface of the integrated terminal device 1 moves the content so as to drop onto the side of the integrated terminal device 301.

When it has been recognized by gyro sensor or acceleration sensor information of the individual terminal device 302 that the individual terminal device 302 has been tilted, a marker is displayed or the content blinks.

"Shaking"

When the individual terminal device 302 is shaken above the display surface of the integrated terminal device 301, the content moves. When it has been sensed by acceleration sensor information of the individual terminal device 302 that the individual terminal device 302 has been shaken, a marker is displayed or the content blinks.

Note that the method of displaying the marker or the content image may be optionally changed in accordance with the situation of the application or the like. For example, the marker may not be always displayed, and may be displayed only when necessary.

<4-5: Texture Design of Furniture>

Figure 46:
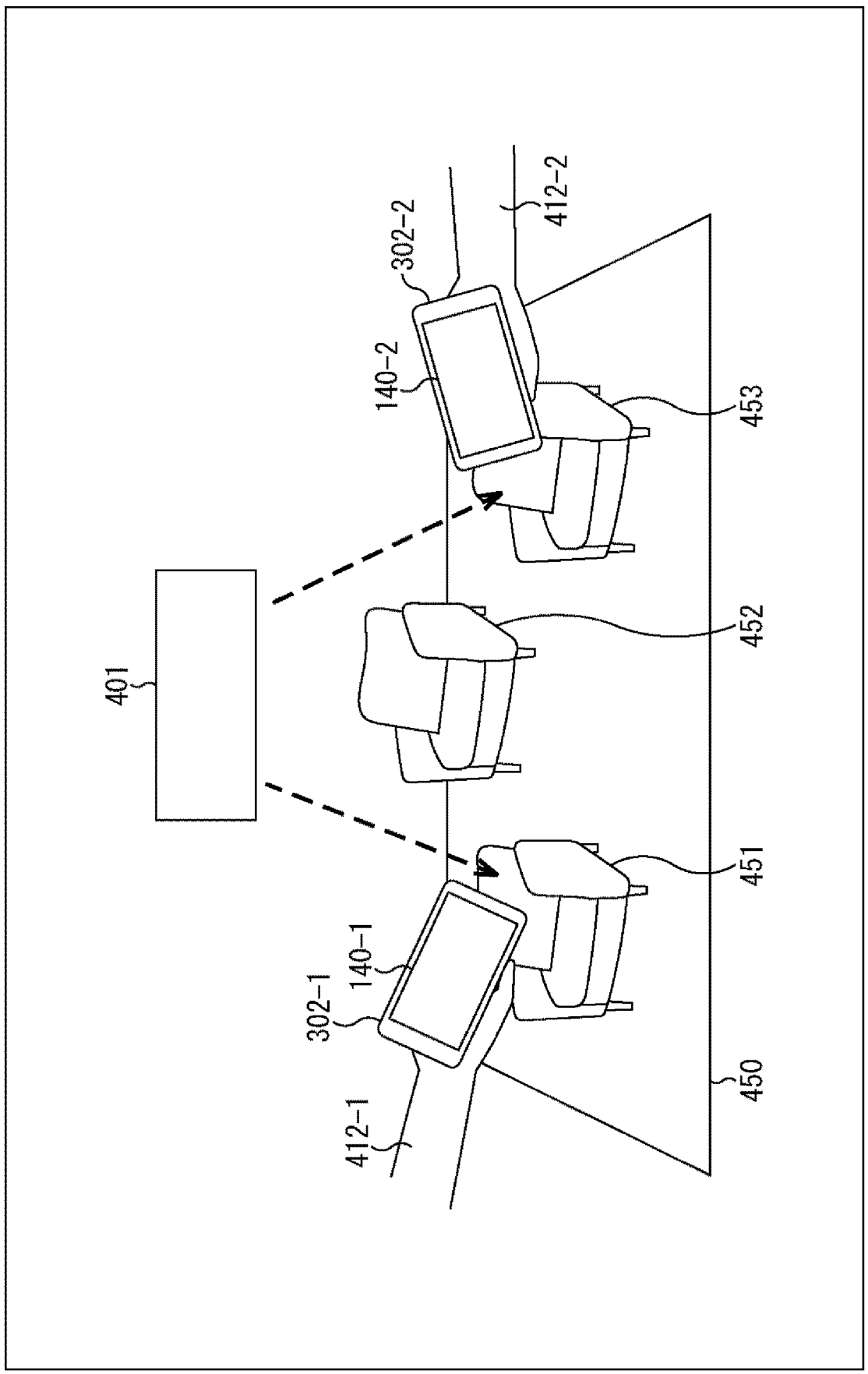
FIG. 46 is a diagram illustrating an example of application software.

Next, an application for "texture design of furniture" will be described. In this application, as illustrated in FIG. 46, furniture models 451 to 453 are installed on a display surface 450 of the integrated terminal device 301, and the tee 401 projects an image of a texture designated by a user or the like thereon for simulation of a texture design of furniture.

In this application, a user selects a texture on the individual terminal device 302, and the tee 401 projects an image of the selected texture on the model. For example, in the case of FIG. 46, when the user 412-1 displays and selects a texture on the display surface 140-1 of the individual terminal device 302-1 in the vicinity of the model 451 on the display surface 450, the tee 401 of the integrated terminal device 301 projects the selected texture toward the model 451. Furthermore, when the user 412-2 displays and selects a texture on the display surface 140-2 of the individual terminal device 302-2 in the vicinity of the model 453 on the display surface 450, the tee 401 of the integrated terminal device 301 projects the selected texture toward the model 453.

This makes it possible to project a texture image designated by a user onto a model designated by the user. With this arrangement, the user can simulate the texture. It is therefore possible for a user to use such an application to more easily select a color or a pattern, for example.

In such an application, only selection of a texture is performed, and edition of a texture is not performed in the individual terminal device 302. Furthermore, since a user performs touching to apply a change in texture, seamless drawing is not required. In addition, models of furniture to which textures have been applied and display of a texture in the individual terminal device 302 cannot be moved regardless of a user's intention.

Thus, in a case of such a content image (an image of a material), the drawing rule definition unit 383 selects "reduction" as the method of drawing the content, and selects "outside marker" as the marker.

This allows a user to experience an application as described above. Furthermore, a plurality of users can use their individual terminal devices 302 and simultaneously experience this application.

5. Other Configuration Examples

The present technology can be applied to any system, apparatus, device, or the like that implements augmented reality (AR), and the configuration thereof is not limited to the above-described examples.

Furthermore, in the above description, processing to which the present technology is applied, such as control of drawing of a content image or a marker and selection of a method of drawing a content image or a marker, is performed in the individual terminal device 302. Alternatively, these pieces of processing can be performed in any device.

For example, the integrated terminal device 301 may perform control of drawing of a content image or a marker, may perform selection of a method of drawing a content image or a marker, or may perform both. Furthermore, each of control of drawing of a content image and control of drawing of a marker may be performed in a different device. Similarly, each of selection of a method of drawing a content image and selection of a method of drawing a marker may be performed in a different device. Furthermore, a plurality of devices may cooperate to perform some or all of these pieces of processing.

Figure 47:
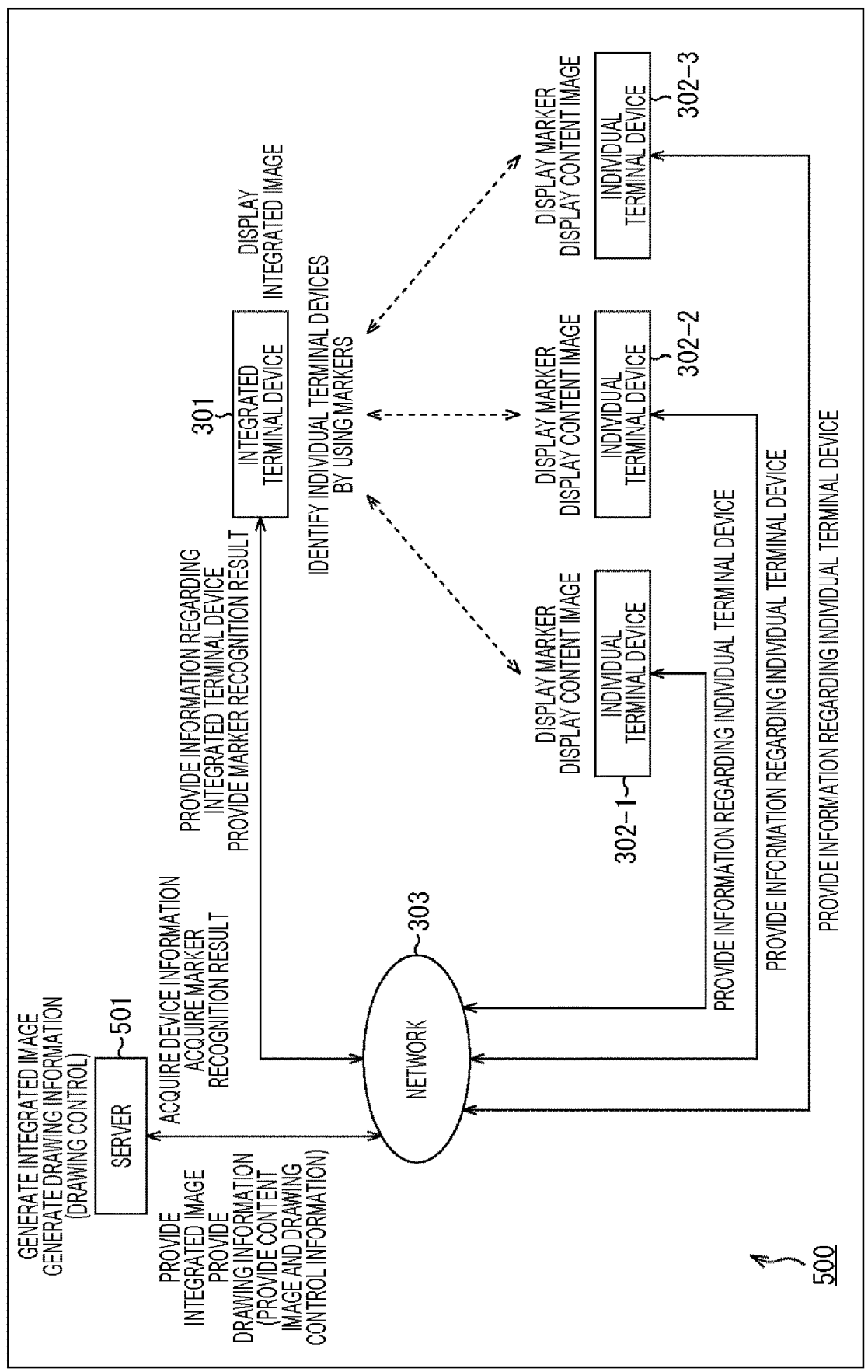
FIG. 47 is a diagram illustrating an example of a main configuration of an information processing system.

Moreover, for example, these pieces of processing may be performed by a device other than the integrated terminal device 301 and the individual terminal device 302. For example, as in an information processing system 500 illustrated in FIG. 47, a server 501 may be provided in addition to the integrated terminal device 301 and the individual terminal device 302, and the server 501 may perform some or all of these pieces of processing.

The server 501 is communicably connected to the devices (the integrated terminal device 301 and the individual terminal device 302) via the network 303, and can acquire information necessary for processing from these devices and supply processing results to these devices.

This makes it possible to prevent an increase in load on the integrated terminal device 301 and the individual terminal device 302.

6. Notes

<Computer>

The series of pieces of processing described above can be executed not only by hardware but also by software. In a case where the series of pieces of processing is executed by software, a program constituting the software is installed on a computer. Here, the computer includes a computer incorporated in dedicated hardware, or a general-purpose personal computer capable of executing various functions with various programs installed therein, for example.

Figure 48:
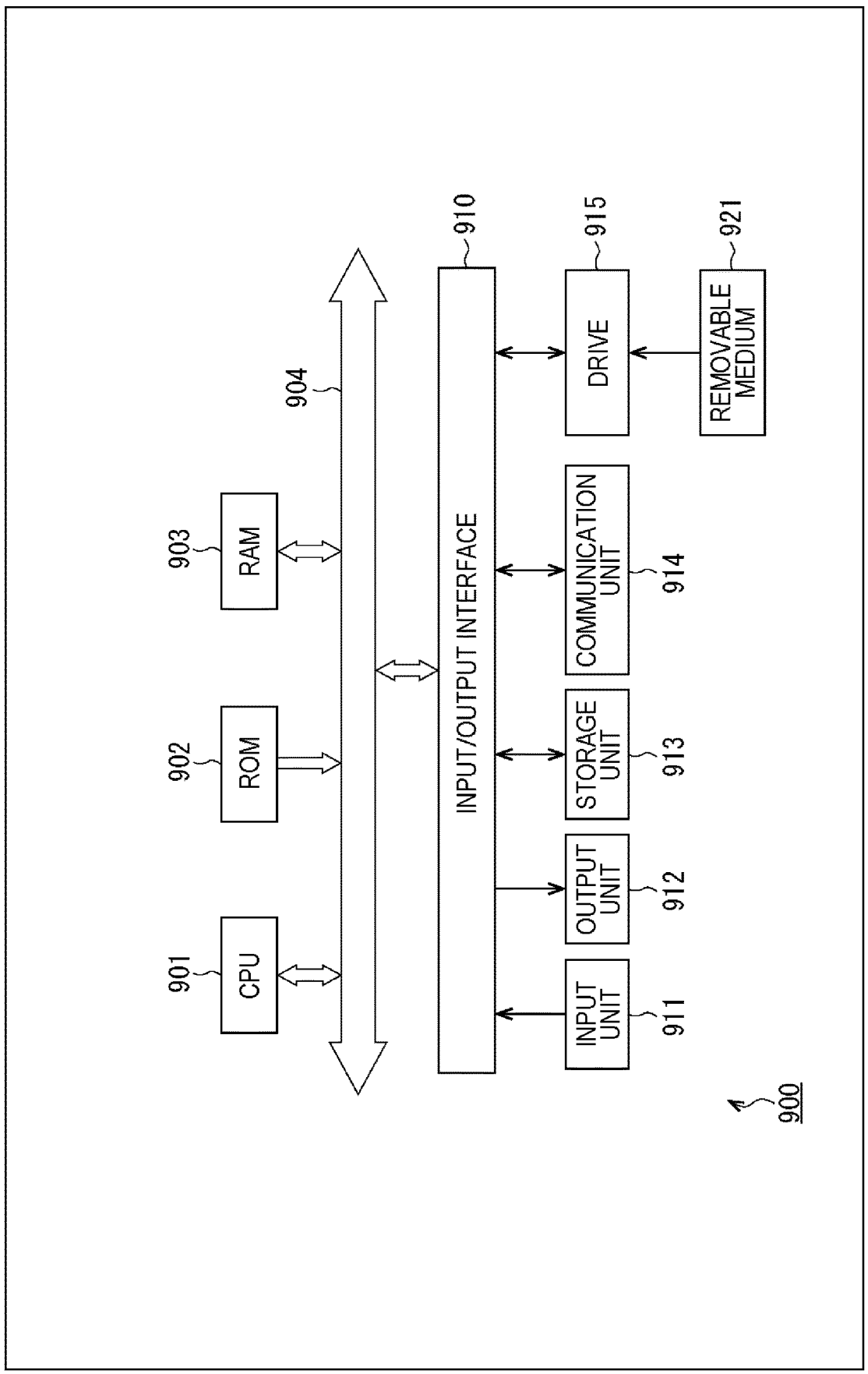
FIG. 48 is a block diagram illustrating an example of a main configuration of a computer.

FIG. 48 is a block diagram illustrating a configuration example of hardware of a computer that executes the series of pieces of processing described above in accordance with a program.

In a computer 900 illustrated in FIG. 48, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, or an input terminal. The output unit 912 includes, for example, a display, a speaker, or an output terminal. The storage unit 913 includes, for example, a hard disk, a RAM disk, or a nonvolatile memory. The communication unit 914 includes, for example, a network interface. The drive 915 drives a removable medium 921 such as a magnetic disk, an optical disk, a magneto-optical disk, or a semiconductor memory.

To perform the series of pieces of processing described above, the computer configured as described above causes the CPU 901 to, for example, load a program stored in the storage unit 913 into the RAM 903 via the input/output interface 910 and the bus 904 and then execute the program. The RAM 903 also stores, as appropriate, data or the like necessary for the CPU 901 to execute various types of processing.

The program to be executed by the computer can be provided by, for example, being recorded on the removable medium 921 as a package medium or the like. In that case, inserting the removable medium 921 into the drive 915 allows the program to be installed into the storage unit 913 via the input/output interface 910.

Furthermore, the program can also be provided via a wired or wireless transmission medium such as a local area network, the Internet, or digital satellite broadcasting. In that case, the program can be received by the communication unit 914 and installed into the storage unit 913.

In addition, the program can also be installed in advance in the ROM 902 or the storage unit 913.

<Applicable Targets of Present Technology>

Furthermore, the present technology can be applied to any configuration. For example, the present technology can also be carried out as a configuration of a part of a device such as a processor (e.g., a video processor) as a system large scale integration (LSI) or the like, a module (e.g., a video module) using a plurality of processors or the like, a unit (e.g., a video unit) using a plurality of modules or the like, or a set (e.g., a video set) in which other functions have been added to a unit.

Furthermore, for example, the present technology can also be applied to a network system constituted by a plurality of devices. For example, the present technology may be carried out as cloud computing in which a plurality of devices shares and jointly performs processing via a network. For example, the present technology may be carried out in a cloud service that provides services related to images (moving images) to an optional terminal such as a computer, an audio visual (AV) device, a portable information processing terminal, or an Internet of Things (IoT) device.

Note that, in the present specification, a system means a set of a plurality of components (devices, modules (parts), and the like), and it does not matter whether or not all components are in the same housing. Thus, a plurality of devices housed in separate housings and connected via a network, and one device having a plurality of modules housed in one housing are both systems.

<Fields and Uses to which Present Technology can be Applied>

Systems, devices, processing units, and the like to which the present technology is applied can be used in any field such as transportation, medical care, crime prevention, agriculture, livestock industry, mining, beauty, factories, home appliances, weather, or nature monitoring. Furthermore, they can be used for any intended use.

<Others>

Embodiments of the present technology are not limited to the embodiments described above but can be modified in various ways within a scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, as a matter of course, a configuration other than those described above may be added to the configurations of the devices (or the processing units). Moreover, as long as the configuration and operation of the entire system remain substantially the same, a part of the configuration of a certain device (or processing unit) may be included in the configuration of another device (or another processing unit).

Furthermore, for example, the program described above may be executed by any device. In that case, the device is only required to have necessary functions (functional blocks and the like) and be able to obtain necessary information.

Furthermore, for example, the steps of one flowchart may be executed by one device, or may be shared and executed by a plurality of devices. Moreover, in a case where a plurality of pieces of processing is included in one step, the plurality of pieces of processing may be executed by one device, or may be shared and executed by a plurality of devices. In other words, a plurality of pieces of processing included in one step may be processed as a plurality of steps. Conversely, processing described as a plurality of steps may be collectively executed as one step.

Furthermore, for example, the program to be executed by the computer may be configured so that the steps described are processed in chronological order as described in the present specification, or the steps are processed in parallel or processed individually when needed, for example, when a call is made. That is, as long as no contradiction arises, the steps may be processed in an order different from the order described above. Moreover, the program may be configured so that the steps described are processed in parallel with processing of another program, or may be executed in combination with processing of another program.

Furthermore, for example, a plurality of technologies related to the present technology can each be carried out independently and individually as long as no contradiction arises. As a matter of course, any two or more technologies related to the present technology may be used together and carried out. For example, some or all of the technologies related to the present technology described in any one of the embodiments may be carried out in combination with some or all of the technologies related to the present technology described in another embodiment. Furthermore, some or all of any of the technologies related to the present technology described above may be carried out in combination with another technology that is not described above.

Note that the present technology can also be configured as described below.

(1) An information processing apparatus including:
a control unit that controls display of a content image that moves in a first display surface on which a marker image is displayed in a display form in which at least a part of the marker image is not shielded on the basis of first information regarding feature points of the marker image displayed on the first display surface of a terminal device; and
a detection unit that acquires second information regarding the feature points of the marker image on the first display surface in the display form from image data of a captured image obtained by imaging the first display surface, and detects a position and an orientation of the terminal device on the basis of the image data.

(2) The information processing apparatus according to (1), in which
the control unit controls display of the content image on the basis of density of the feature points.

(3) The information processing apparatus according to (1) or (2), in which
the control unit controls a size of the content image on the first display surface in such a way that the content image on the first display surface and the feature points do not overlap with each other.

(4) The information processing apparatus according to any one of (1) to (3), in which
the control unit controls a transparency of the content image in accordance with the number of the feature points that overlap with the content image on the first display surface.

(5) The information processing apparatus according to any one of (1) to (4), in which
the control unit controls a movement of the content image on the first display surface on the basis of positions of the feature points on the first display surface.

(6) The information processing apparatus according to (5), in which
the control unit controls a movement route of the content image on the basis of the positions of the feature points on the first display surface.

(7) The information processing apparatus according to (5) or (6), in which
the control unit controls a moving speed of the content image in a case where the content image passes over the feature points on the first display surface.

(8) The information processing apparatus according to any one of (5) to (7), in which
the control unit further controls at least one of size or transparency of the content image.

(9) The information processing apparatus according to any one of (1) to (8), in which
the control unit causes the content image to be intermittently displayed.

(10) The information processing apparatus according to (9), in which
the control unit controls a display time of the content image in accordance with a line-of-sight of a user, an operation by the user, or a recognition situation of the marker image.

(11) The information processing apparatus according to any one of (1) to (10), further including:
a selection unit that selects at least one display form from size, transparency, movement, or intermittent display of the content image,
in which the control unit controls the display form of the content image selected by the selection unit.

(12) The information processing apparatus according to (11), in which
the selection unit selects the display form on the basis of a situation of software that uses the content image and a hardware specification of a device that executes the software.

(13) The information processing apparatus according to (11) or (12), in which
the selection unit further selects which identification image to display, from among a full screen identification image to be displayed on the entire first display surface, an external identification image having feature points only outside a predetermined range at a center, a half screen identification image to be displayed in half of a region of the first display surface, a movable identification image that is movable in the first display surface, and a plurality of identification images each having the same identification information, and
the control unit further causes the identification image selected by the selection unit to be displayed.

(14) The information processing apparatus according to (13), in which
the selection unit performs selection on the basis of a situation of software that uses the content image, a hardware specification of a device that executes the software, and a situation of a surrounding environment of the device.

(15) The information processing apparatus according to any one of (1) to (14), in which
the control unit controls a movement of the content image on the first display surface and a second display surface on the basis of the position and the orientation of the terminal device that is above the second display surface.

(16) The information processing apparatus according to (15), in which
the control unit controls the movement of the content image in such a way as to achieve a movement in accordance with the position and the orientation of the terminal device.

(17) The information processing apparatus according to any one of (1) to (16), in which
the control unit further causes a notification to be displayed on the first display surface for prompting control of a position and an orientation of a device that displays the marker image in a case where it is difficult to recognize the marker image.

(18) The information processing apparatus according to any one of (1) to (17), in which
the control unit further controls luminance of the first display surface on the basis of brightness around the first display surface.

(19) An information processing method including:
controlling display of a content image that moves in a first display surface on which a marker image is displayed in a display form in which at least a part of the marker image is not shielded on the basis of first information regarding feature points of the marker image displayed on the first display surface of a terminal device; and
acquiring second information regarding the feature points of the marker image on the first display surface in the display form from image data of a captured image obtained by imaging the first display surface, and detecting a position and an orientation of the terminal device on the basis of the image data.

(20) A program for causing a computer to function as:
a control unit that controls display of a content image that moves in a first display surface on which a marker image is displayed in a display form in which at least a part of the marker image is not shielded on the basis of first information regarding feature points of the marker image displayed on the first display surface of a terminal device; and
a detection unit that acquires second information regarding the feature points of the marker image on the first display surface in the display form from image data of a captured image obtained by imaging the first display surface, and detects a position and an orientation of the terminal device on the basis of the image data.

REFERENCE SIGNS LIST

100 Drawing control device
101 Drawing control unit
111 Content drawing control unit
112 Marker drawing control unit
121 Marker
131 and 132 Feature point
140 Display surface
141 Content image
300 Information processing system
301 Integrated terminal device
302 Individual terminal device
303 Network
361 Marker information accumulation unit
362 Marker recognition unit
363 Communication information generation unit
364 Communication processing unit
365 Drawing information generation unit
381 Marker information accumulation unit
382 Communication processing unit
383 Drawing rule definition unit
384 Drawing information generation unit
391 Content drawing method setting unit
392 Marker drawing method setting unit
393 Drawing control unit
394 Drawing processing unit
500 Information processing system
501 Server

The invention claimed is:

1. An information processing apparatus, comprising:
a detection unit configured to acquire information associated with a plurality of feature points of a marker image from image data of a captured image obtained by imaging a first display surface of a terminal device, wherein
the marker image is displayed on the first display surface, and
the information includes position of at least one feature point of the plurality of feature points on the first display surface; and
detect a position and an orientation of the terminal device based on a image data; and
a control unit configured to control a movement of a content image, which moves on the first display surface in a display form, within the first display surface such that at least a part of the marker image is not shielded by the content image,
wherein the movement of the content image on the first display surface is controlled based on the position of the at least one feature point of the plurality of feature points of the marker image.

2. The information processing apparatus according to claim 1, wherein the control unit is further configured to control display of the content image based on density of the plurality of feature points.

3. The information processing apparatus according to claim 1, wherein the control unit is further configured to control a size of the content image on the first display surface in such a way that the content image do not overlap with the plurality of feature points.

4. The information processing apparatus according to claim 1, wherein the control unit is further configured to control a transparency of the content image based on a number of the plurality of feature points that overlap with the content image on the first display surface.

5. The information processing apparatus according to claim 1, wherein the control unit is further configured to control a movement route of the movement of the content image based on the position of the at least one feature point of the plurality of feature points on the first display surface.

6. The information processing apparatus according to claim 1, wherein the control unit is further configured to control a moving speed of the content image in a case where the content image passes over the plurality of feature points on the first display surface.

7. The information processing apparatus according to claim 1, wherein the control unit is further configured to control at least one of a size or a transparency of the content image.

8. The information processing apparatus according to claim 1, wherein the control unit is further configured to control a display of the content image such that the content image is intermittently displayed.

9. The information processing apparatus according to claim 8, wherein the control unit is further configured to control a display time of the content image based on at least one of a line-of-sight of a user, an operation by the user, or a recognition situation of the marker image.

10. The information processing apparatus according to claim 1, further comprising:
a selection unit configured to select the display form of the content image from at least one of a size, a transparency, the movement, or intermittent display of the content image, wherein the control unit is further configured to control the display form of the content image selected by the selection unit.

11. The information processing apparatus according to claim 10, wherein the selection unit is further configured to select the display form based on a situation of a software that uses the content image and a hardware specification of a device that executes the software.

12. The information processing apparatus according to claim 10, wherein
the selection unit is further configured to select an identification image from at least one of a full screen identification image to be displayed on the entire first display surface, an external identification image having feature points only outside a specific range from a center of the content image, a half screen identification image to be displayed in half of a region of the first display surface, a movable identification image that is movable in the first display surface, or a plurality of identification images each having same identification information, and
the control unit is further configured to control a display of the identification image selected by the selection unit.

13. The information processing apparatus according to claim 12, wherein the selection unit is further configured to select the identification image based on at least one of a basis of a situation of software that uses the content image, a hardware specification of a device that executes the software, or a situation of a surrounding environment of the device.

14. The information processing apparatus according to claim 1, wherein the control unit is further configured to control the movement of the content image on the first display surface and a second display surface based on the position and the orientation of the terminal device which is above the second display surface.

15. The information processing apparatus according to claim 14, wherein the control unit is further configured to control the movement of the content image based on the position and the orientation of the terminal device.

16. The information processing apparatus according to claim 1, wherein the control unit is further configured to control a display of a notification on the first display surface to prompt control of a position and an orientation of a device that displays the marker image in a case where it is difficult to recognize the marker image.

17. The information processing apparatus according to claim 1, wherein the control unit is further configured to control luminance of the first display surface based on brightness around the first display surface.

18. An information processing method, comprising:
acquiring information associated with a plurality of feature points of a marker image from image data of a captured image obtained by imaging a first display surface of a terminal device, wherein
the marker image is displayed on the first display surface, and
the information includes position of at least one feature point of the plurality of feature points on the first display surface;
detecting a position and an orientation of the terminal device based on the image data; and
controlling a movement of a content image, which moves on the first display surface in a display form, within the first display surface such that at least a part of the marker image is not shielded by the content image, wherein the movement of the content image on the first display surface is controlled based on the position of the at least one feature point of the plurality of feature points of the marker image.

19. A non-transitory computer-readable medium having stored thereon, computer-executable instructions that when executed by a processor of a system, causes the processor to execute operations, the operations comprising:
acquiring information associated with a plurality of feature points of a marker image form from image data of a captured image obtained by imaging a first display surface of a terminal device, wherein
the marker image is displayed on the first display surface, and
the information includes position of at least one feature point of the plurality of feature points on the first display surface;
detecting a position and an orientation of the terminal device based on the image data; and
controlling a movement of a content image, which moves on the first display surface in a display form, within the first display surface such that at least a part of the marker image is not shielded by the content image, wherein the movement of the content image on the first display surface is controlled based on the position of the at least one feature point of the plurality of feature points of the marker image.

* * * * *